United States Patent [19]
Seto et al.

[11] Patent Number: 5,760,811
[45] Date of Patent: Jun. 2, 1998

[54] HALFTONE IMAGE RECORDING APPARATUS AND METHOD BASED ON FIRST AND SECOND TIMING SIGNALS CHOSEN FROM A PLURALITY OF SYNCHRONIZED CLOCKS

[75] Inventors: Kaoru Seto, Chigasaki; Takashi Kawana, Yokohama; Shinichiro Maekawa, Kawasaki, all of Japan

[73] Assignee: Canon Kabushiki Kaisha, Tokyo, Japan

[21] Appl. No.: 21,851

[22] Filed: Feb. 24, 1993

[30] Foreign Application Priority Data

Feb. 27, 1992 [JP] Japan ................... 4-041032

[51] Int. Cl.$^6$ ................... B41J 2/385; B41J 2/47; G03G 13/04
[52] U.S. Cl. ................... 347/131; 347/254; 358/298
[58] Field of Search ................... 358/296, 298, 358/456, 457, 458, 459, 460, 461, 534, 455, 462, 448, 518; 347/240, 251, 131, 254; 395/109, 112, 101

[56] References Cited

U.S. PATENT DOCUMENTS

| 4,214,157 | 7/1980 | Check, Jr. et al. | 250/236 |
| 4,729,038 | 3/1988 | Miura et al. | 358/298 |
| 4,864,326 | 9/1989 | Kawamura et al. | 347/240 |
| 4,873,570 | 10/1989 | Suzuki et al. | 358/518 |
| 4,977,458 | 12/1990 | Granger et al. | 358/456 |
| 5,014,137 | 5/1991 | Shimada | 358/296 |
| 5,206,719 | 4/1993 | Ikeda et al. | 358/518 |

FOREIGN PATENT DOCUMENTS

| 0359463 | 3/1990 | European Pat. Off. . |
| 359463 | 3/1990 | European Pat. Off. . |
| 62-236204 | 10/1987 | Japan . |
| 2-155669 | 6/1990 | Japan . |

*Primary Examiner*—Benjamin R. Fuller
*Assistant Examiner*—Raquel Yvette Gordon
*Attorney, Agent, or Firm*—Fitzpatrick, Cella, Harper & Scinto

[57] ABSTRACT

A half-tone image recorder in which input digital data is represented by a plurality of bit data for each pixel. A data conversion device outputs digital data indicative of a recording-start position and a recording-end position, based on the input digital data. A recording device such as a laser printer records an image in accordance with the output digital data from the data conversion device. The data conversion device controls a first value of the digital data indicative of the recording-start position and a second value of the digital data indicative of the recording-end position so as to change a black-area growing direction within one pixel in the recorded image. This results in the recordation of a high-quality half-tone image without conspicuous vertical stripes and without conspicuous white stripes in the main-scanning direction of the recording device due to pitch irregularity.

11 Claims, 54 Drawing Sheets

FIG. 12

| SAMPLED DATA | | | | | | | | GENERATED CODE | | | CLOCK SELECTED | | | | |
|---|---|---|---|---|---|---|---|---|---|---|---|---|---|---|---|
| S8' | S11' | S16' | S18' | S22' | S25' | S29' | S32' | H0 | H1 | H2 | (K4) | K3 | K2 | K1 | K0 |
| | | | | | | | | L | L | L | S8 | S6 | S4 | S2 | S0 |
| | | | | | | | | L | L | H | S11 | S9 | S6 | S3 | S0 |
| | | | | | | | | L | H | L | S15 | S11 | S7 | S4 | S0 |
| | | | | | | | | L | H | H | S18 | S14 | S9 | S5 | S0 |
| L | – | H | L | L | L | | | H | L | L | S22 | S16 | S11 | S5 | S0 |
| L | L | – | H | H | H | L | L | H | L | H | S25 | S19 | S13 | S6 | S0 |
| | | | | | | | | H | H | L | S29 | S21 | S14 | S7 | S0 |
| | | | | | | | | H | H | H | S32 | S24 | S16 | S8 | S0 |

1201
1202

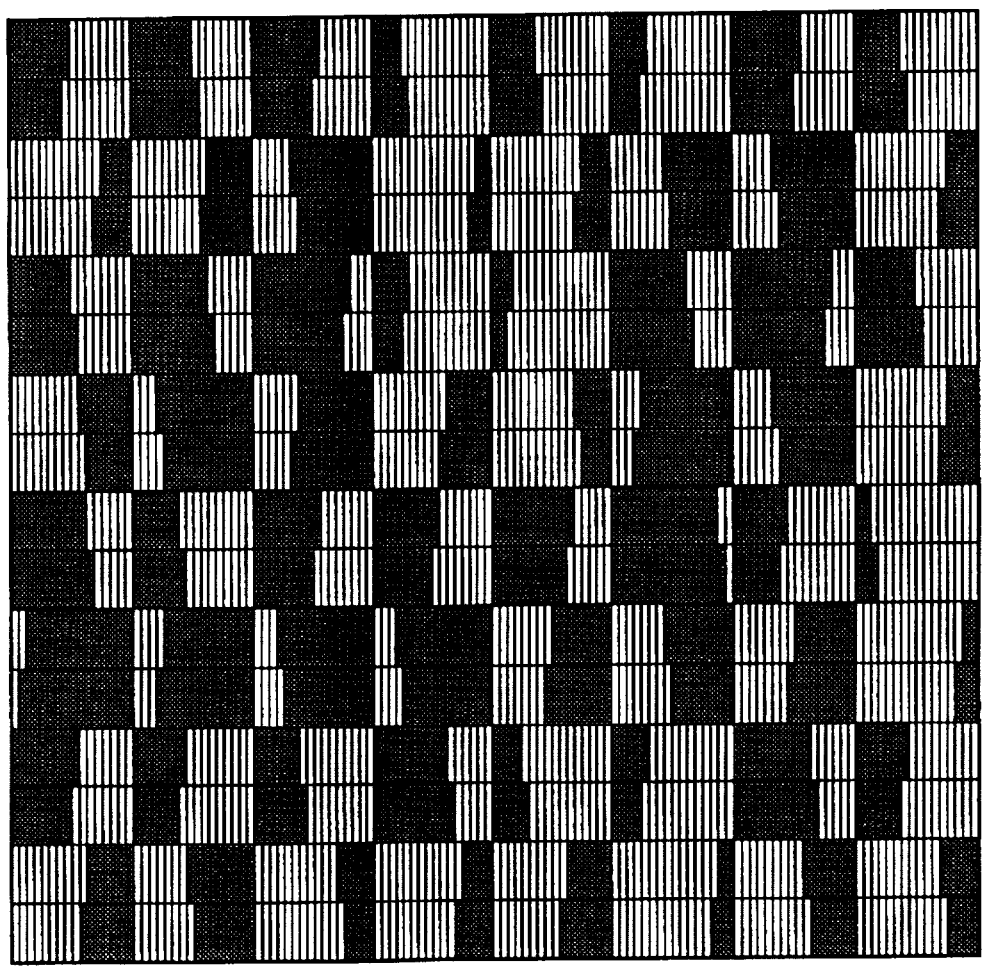
F I G. 31

FIG. 36A

| 1a ● | 1b ● | 1c ● | 1d ● | 1e ● |
|---|---|---|---|---|
| 2a ● | 2b ● | 2c ● | 2d ● | 2e ● |
| 3a ● | 3b ● | 3c ● | 3d ● | 3e ● |
| 4a ● | 4b ● | 4c ● | 4d ● | 4e ● |
| 5a ● | 5b ● | 5c ● | 5d ● | 5e ● |

FIG. 36B

| 1A ● | 1B ● | 1C ● | 1D ● | 1E ● |
|---|---|---|---|---|
| 2A ● | 2B ● | 2C ● | 2D ● | 2E ● |
| 3A ● | 3B ● | 3C ● | 3D ● | 3E ● |
| 4A ● | 4B ● | 4C ● | 4D ● | 4E ● |
| 5A ● | 5B ● | 5C ● | 5D ● | 5E ● |

FIG. 38A

| 1a ● | 1b ● | 1c ● |
|---|---|---|
| 2a ● | 2b ● | 2c ● |
| 3a ● | 3b ● | 3c ● |

FIG. 38B

| 1A ● | 1B ● | 1C ● |
|---|---|---|
| 2A ● | 2B ● | 2C ● |
| 3A ● | 3B ● | 3C ● |

HALFTONE IMAGE RECORDING APPARATUS AND METHOD BASED ON FIRST AND SECOND TIMING SIGNALS CHOSEN FROM A PLURALITY OF SYNCHRONIZED CLOCKS

BACKGROUND OF THE INVENTION

1. Field of the Invention

This invention relates an image recording apparatus and method, particularly an apparatus and method for recording half-tone images.

2. Description of the Related Art

Laser-beam printers (hereinafter referred to as an "LBP") using electrophotographic technology are utilized in computer output devices, facsimile output units and, digital copying machines, etc. The LBP's used in these apparatus generally have a resolution on the order of 300 dpi (dots/inch) and record half-tone images using the well-known dither method or methods relying upon density patterns.

However, certain problems arise in the prior art described above. Specifically, in order to express densities in, say, 64 tones using the dither method or density-pattern method, the resolution of a half-tone image will be 300/8=37.5 pixels/inch (hereinafter pixel/inch will be referred to as a "line"), if the resolution of the LBP is 300 dpi, to obtain half-tone pixels in which a dot matrix of 8×8 pixels serves as the basic unit. As a consequence, a satisfactory picture quality cannot be obtained.

In other words, with an LBP having a resolution of 300 dpi, the density that can be expressed when resolution is made 150 lines using the dither method or density-pattern method has four tones, and the density that can be expressed when resolution is made 75 lines has 16 tones. Thus, resolution and density that can be expressed are reciprocally related.

If resolution is greater than 200 lines and expression of density in 64 tones or more is possible, a high-quality half-tone image can be obtained.

In order to avoid this problem, the following two methods are available as methods of obtaining a high-quality half-tone image:

The first method involves comparing the voltage levels of an analog image signal, which is obtained by converting a digital multivalued image signal, and a separately generated triangular or sawtooth waveform, thereby producing a pulse-width modulated binarized image signal, driving a laser by the binarized image signal and recording the resulting half-tone image.

With this method, however, use of costly circuit elements is necessary in order to deal with a high-speed analog image signal. In addition, the pulses of the binarized image signal are influenced by changes in the environment, such as variations in temperature.

The second method, which is disclosed in the specification of Japanese Patent Application No. 62-236204, involves setting a counter to a count value in conformity with an entered digital multivalued image signal, and digitally obtaining a binary image signal subjected to pulse-width modulation in dependence upon the count value. This method is preferable over the first method in that the pulse width of the binary image signal is stable with respect to the aforementioned changes in environment, such as the temperature variation. However, since this method employs a counter, the minimum pulse width obtained is dependent upon the operating boundary frequency of the digital circuit.

For example, in order to reproduce a half-tone image of 300 lines and 64 tones using a 300 dpi LBP, it is necessary for the counter to count a clock having a frequency of 115.2 MHz, which is obtained by equally dividing the image clock (1.8 MHz) that corresponds to 300 dpi by 64. It is difficult to construct the circuitry of ordinary logic, such as TTL or CMOS logic, and the method necessitates costly ECL logic.

Even if sufficient tones of a half-tone image are obtained in the prior art, improvements need to be made in terms of performing high-quality printing. This will now be described.

FIGS. 47 through 50 are patterns showing the state of printing based upon a conventional method of recording half-tone images. For example, these diagrams show the result of printing using the first method, which employs a triangular waveform, and an LBP having a resolution of 300 dpi. As illustrated in FIGS. 47 through 50, density growth of half-tone pixels is regular from the center of half-tone pixels toward both ends thereof. As a consequence, vertical stripes become conspicuous in the printed image and are an obstacle to higher picture quality.

Furthermore, the patterns shown in FIGS. 47 through 50 are for a case in which there is no pitch error (hereinafter referred to as "pitch irregularity") in the sub-scanning direction. In actuality, however, owing to variance, in the sub-scanning direction, in surface deflection of the reflecting surface of a polygon mirror that performs sub-scanning of the laser beam, pitch irregularity in the sub-scanning direction occurs, as illustrated in FIGS. 51 through 54. The photosensitive drum also experiences pitch irregularity owing to a cleaning blade that contacts the drum and a fluctuation in the load of the developing devices.

In FIG. 51, reference numerals 5101, 5103, 5105, 5107 denote white stripes due to pitch irregularity, and 5102, 5104, 5106 denote portions where upper and lower lines overlap each other due to pitch irregularity. Similarly, in FIG. 52, 5201, 5203, 5205, 5206 denote white stripes due to pitch irregularity, and 5202, 5204, 5207 denote portions where upper and lower lines overlap each other due to pitch irregularity. In FIG. 53, reference numerals 5301, 5303, 5305, 5307 denote white stripes due to pitch irregularity, and 5302, 5304, 5306 denote portions where upper and lower lines overlap each other due to pitch irregularity. Likewise, in FIG. 54, reference numerals 5401, 5403, 5405, 5406 denote white stripes due to pitch irregularity, and 5402, 5404, 5407 denote portions where upper and lower lines overlap each other due to pitch irregularity. The intervals between these white stripes and overlapping portions are not constant but widen and narrow irregularly.

For these reasons, therefore, latent images formed on a rotary drum exhibit pitch irregularity in the subscanning direction. In the conventional method of recording half-tone images, the beam-spot size of the laser beam is decided in such a manner that the latent images overlap. Even if there is some pitch irregularity in the sub-scanning direction, therefore, the pitch irregularity is not a problem in terms of picture quality after development of the latent image.

However, in a case where individual dots are subjected to modulation of luminous intensity or individual dots are finely subdivided in the mainscanning direction to record a half-tone image, the latent images cannot be made to overlap as in the prior art and pitch irregularity becomes an obstacle to higher picture quality.

A known technique for improving upon pitch irregularity is disclosed in U.S. Pat. No. 4,214,157 (Pitney Bowes). In this disclosed technique, the amount of surface deflection of the polygon mirror is detected and scanning position in the sub-scanning direction is corrected by an A/O modulator in dependence upon the amount of surface deflection detected.

With this technique, however, the use of the costly A/O modulator is necessary. Furthermore, even if pitch irregularity caused by a variance in surface deflection of the polygon mirror is capable of being corrected, this does not lead to an improvement upon pitch irregularity attributable to the photosensitive drum.

SUMMARY OF THE INVENTION

An object of the present invention is to provide an image recording apparatus and method in which the aforementioned problems of the prior art at solved.

Another object of the present invention is to provide an image recording apparatus and method through which it is possible to record a high-quality image in which vertical stripes are not conspicuous.

A further object of the present invention is to provide an image recording apparatus in which ordinary logic such as TTL or CMOS logic is used to construct circuitry for realizing the aforementioned second method through which high-quality half-tone images are obtained, namely circuitry for setting a counter to a count value in conformity with an entered digital multivalued image signal and digitally obtaining a binary image signal subjected to pulse-width modulation in dependence upon the count value.

Still another object of the present invention is to provide an image recording method for reducing a deterioration in picture quality caused by pitch irregularity ascribable to a polygon mirror or photosensitive drum.

According to the present invention, the foregoing objects are attained by providing the image recording apparatus and method described below.

Specifically, according to the invention, there is provided an image recording method for recording halftone images in which direction of growth of a black area of pixels forming a half-tone image is changed over alternately every recording line.

Further, the invention provides an image recording apparatus for recording half-tone images, comprising memory means for outputting one of plural items of stored data in dependence upon an image signal synchronized to a first clock and a recording line, generating means for generating a plurality of second clocks, in synchronism with the first clock, wherein the second clocks have a frequency higher than that of the first clock and phases successively shifted by a predetermined value, and timing means for outputting a first timing signal and a second timing signal in dependence upon the data output by the memory means and the plurality of second clocks generated by the generating means, a half-tone image being recorded based upon the first timing signal and the second timing signal output by the timing means.

In a preferred embodiment, the generating means includes delay means for generating a plurality of delayed clocks by delaying a third clock, which is synchronized to the first clock, by predetermined times, detecting means for detecting phases of the plurality of delayed clocks generated by the delay means, and selecting means for selecting the plurality of second clocks, from the plurality of delayed clocks generated by the delay means, in dependence upon results of detection performed by the detecting means.

In a preferred embodiment, the timing means includes first counting means for selecting one of the plurality of second clocks based upon first selection information contained in the data output by the memory means, counting the selected second clock based upon first count information contained in the data, and thereafter outputting the first timing signal, and second counting means for selecting one of the plurality of second clocks based upon second selection information contained in the data output by the memory means, counting the selected second clock based upon second count information contained in the data, and thereafter outputting the second timing signal.

Further, there is provided an image recording method for recording half-tone images, comprising a step of converting data of a plurality of pixels, which include a pixel of interest forming a half-tone image, in such a manner that a difference between a total sum of data of the plurality of pixels after conversion and a sum total of data of the plurality of pixels before conversion attains a predetermined value, and thereafter recording data of the pixel of interest after conversion.

In the above-described half-tone image recording apparatus and method through which a black area of a pixel is caused to grow in proportion to image density, the direction of growth of the black area is changed over alternately every recording line so that the growth direction of the density of each pixel forming the half-tone image is made irregular or random, whereby a half-tone image having excellent picture quality can be recorded without conspicuous vertical stripes and without conspicuous white stripes being formed in the main-scanning direction owing to pitch irregularity.

In the above-described arrangement, one of a plurality of second clocks, the frequency of which is N times that of the first clock and the phases of which are successively shifted by 90°, and which are in synchronism with a first clock that is for transferring the image signal, is selected. The selected second clock is counted in dependence upon the image density to obtain start and end timings of formation of the black area of a pixel forming the half-tone image. As a result, the circuitry of the image recording apparatus for recording high-quality half-tone images can be constructed from ordinary logic such as TTL or CMOS logic.

Further, in the above-described arrangement, the data of a plurality of pixels that include a pixel of interest forming a half-tone image is converted in such a manner that the total sums of the data of the plurality of pixels will coincide before and after the conversion, after which the data of the pixel of interest after conversion is recorded so that the density of each pixel forming the half-tone image will be rendered irregular. As a result, it becomes possible to record a high-quality half-tone image without conspicuous white stripes being caused in the mainscanning direction by pitch irregularity.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a diagram showing the relationship among sampling data, signals H0–H2 and selected clocks in FIG. 9;

FIG. 31 is a diagram showing an example of the results of outputting a half-tone image according to the second embodiment;

FIG. 36A is a diagram schematically illustrating each item of pixel data stored in registers in FIG. 35, and FIG. 36B is a diagram for describing the operation of a data generating circuit;

FIG. 38 is a diagram showing the constitution of window areas in the third embodiment;

DESCRIPTION OF THE PREFERRED EMBODIMENTS

Embodiments according to the present invention will now be described with reference to the drawings. In the description that follows, the technical expressions "pitch irregularity" and "improvement upon pitch irregularity" are used. "Pitch irregularity" includes the meaning of a deterioration in picture quality due to pitch irregularity, and "improvement in pitch irregularity" includes the meaning of an improvement upon a deterioration in picture quality due to pitch irregularity.

First Embodiment

An embodiment will now be described in which a recording method according to the present invention is applied to the engine of an LBP having an output density of 300 dpi and an output speed of eight pages/min (in A4 or letter size).

Configuration

Figure 1:
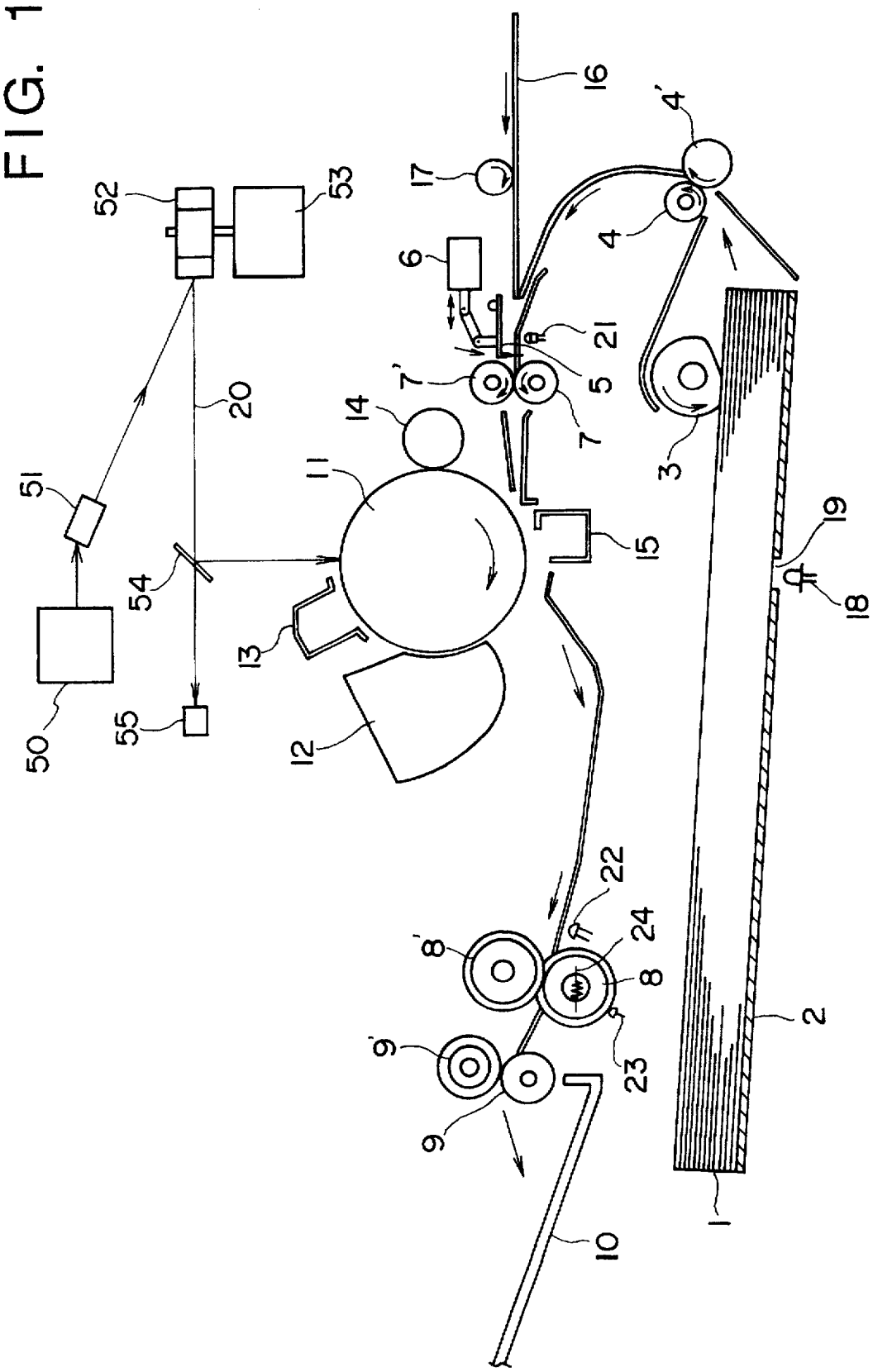
FIG. 1 is a block diagram showing the configuration of an LBP of an embodiment according to the present invention.

FIG. 1 is a diagram showing the configuration of the engine of an LBP according to the first embodiment.

In FIG. 1, numeral 1 denotes recording paper contained in a paper cassette 2. The uppermost sheet of recording paper 1 contained in the paper cassette 2 is separated from the underlying sheet by a paper feeding cam 3 and the leading edge of the separated sheet of recording paper 1 is conveyed to paper feeding rollers 4, 4' by drive means (not shown). The paper feeding cam 3 is rotated intermittently sheet by sheet so that one sheet of the recording paper 1 is fed by one revolution of the cam.

A reflection-type photosensor 18 detects the presence of the recording paper 1 by light reflected from the paper through a hole 19 provided in the bottom of the paper cassette 2.

When the recording paper 1 has been conveyed to the rollers of the paper feeding rollers 4, 4' by the cam 3, the paper feeding rollers 4, 4' rotate while lightly pressuring the recording paper 1 between them, thereby conveying the recording paper. When the leading edge thereof has been conveyed to the position of a resisting shutter 5, the conveyance of the recording paper 1 is halted by the shutter 5 but the paper feeding rollers 4, 4' continue rotating and produce a conveyance torque while slipping on the recording paper 1. In this case, a resisting solenoid 6 is driven into operation to release the shutter 5 by moving it in the upward direction, thereby allowing the recording paper 1 to be fed to conveyance rollers 7, 7'. The actuation of the resisting shutter 5 is synchronized to the transmission timing of an image formed by imaging a laser beam 20 on a photosensitive drum 11. A photosensor 21 detects whether the recording paper is present at the position of the resisting shutter 5.

A polygon mirror 52 is driven by a motor 53. A laser driver 50 drives a semiconductor laser 51 in conformity with a pulse-width control signal sent from a half-tone signal processing circuit, described later.

Figure 2:
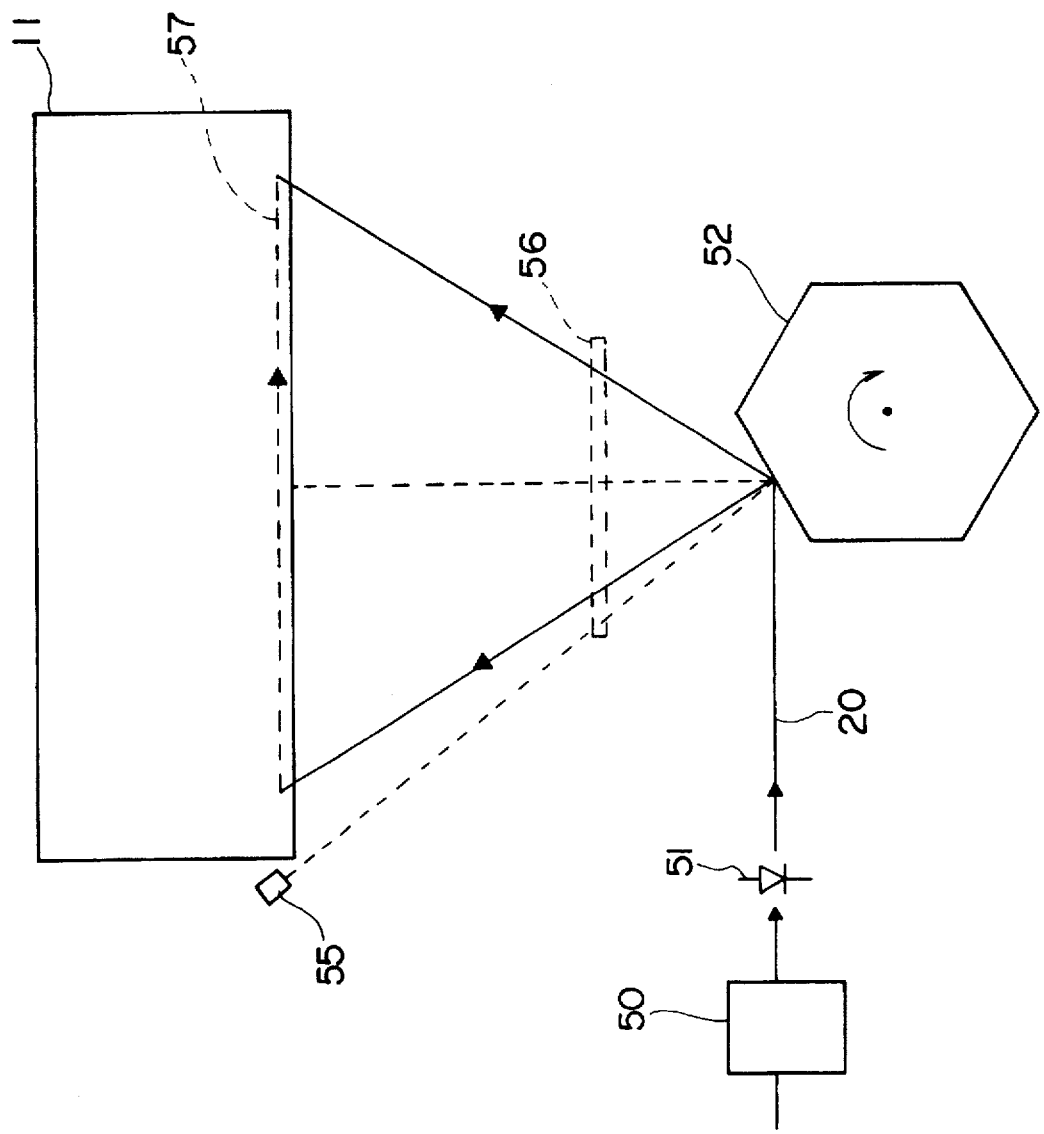
FIG. 2 is a diagram showing scanning of a laser beam in FIG. 1.

FIG. 2 is a diagram illustrating the scanning of the laser beam 20.

As shown in FIG. 2, the laser beam 20 from the semiconductor laser 51, which is driven by the laser driver 50, is made to scan in the main-scanning direction by the polygon mirror 52 and is made to impinge upon the photosensitive drum 11 via reflecting mirror 54 through an f-Θ lens 56 interposed between the polygon mirror 52 and reflecting mirror 54. As a result, the laser beam is imaged on the photosensitive drum 11. Furthermore, owing to being scanned in the main-scanning direction, the laser beam 20 forms a latent image on a main-scanning line 57. In this case, if the LBP has an output density of 300 dpi and an output speed of eight pages/min (in A4 or letter size), the laser firing time for recording one dot is approximately 540 ns. In this case, if the LBP has an output density of 600 dpi and an output speed of eight pages/min, the laser firing time for recording one dot is approximately 135 ns.

Numeral 55 denotes a beam detector disposed at the scanning starting position of the laser beam 20 in order to detect the laser beam 20, whereby a synchronizing signal BD is output to decide image starting timing in the main-scanning direction.

With reference again to FIG. 1, the recording paper 1 next receives transmission torque from the conveyance rollers 7, 7' in place of the paper feeding rollers 4, 4' and is sent to the photosensitive drum 11. Here a latent image is formed on the surface of the photosensitive drum 11, which has been charged by a charging device 13, by exposure to the laser beam 20. The latent image is developed as a toner image by a developing device 14, after which the toner image is transferred to the surface of the recording paper 1 by a transfer charging device 15. A cleaner 12 cleans the surface of the photosensitive drum 11 after the toner image has been transferred to the recording paper 1.

The recording paper 1 to which the toner image has been transferred is fed to fixing rollers 8, 8' so that the toner image is fixed. The recording paper 1 is then ejected into a tray 10 by discharge rollers 9, 9'. The fixing roller 8 houses a fixing heater 24. The surface temperature of the fixing roller 8 is controlled to attain a predetermined temperature based upon a temperature sensed by a thermister 23 in slipping contact with the surface of the fixing roller 8. Numeral 22 denotes a photosensor for sensing whether the recording paper 1 is present at the position of the fixing rollers 8, 8'.

Numeral 16 denotes a paper feeding platform that makes it possible to feed in recording paper not only from the paper cassette 2 but also from the platform one sheet at a time. The recording paper, which has been supplied to a paper feeding roller 17 located above the platform 16, is pressured lightly by the roller 17 so that the recording paper is conveyed until its leading edge arrives at the resisting shutter 5 in the same manner as described above in connection with the paper feeding rollers 4, 4'. The ensuing conveyance secuence is the same as in the case where the paper was fed from the paper cassette 2.

Interface

Figure 3:
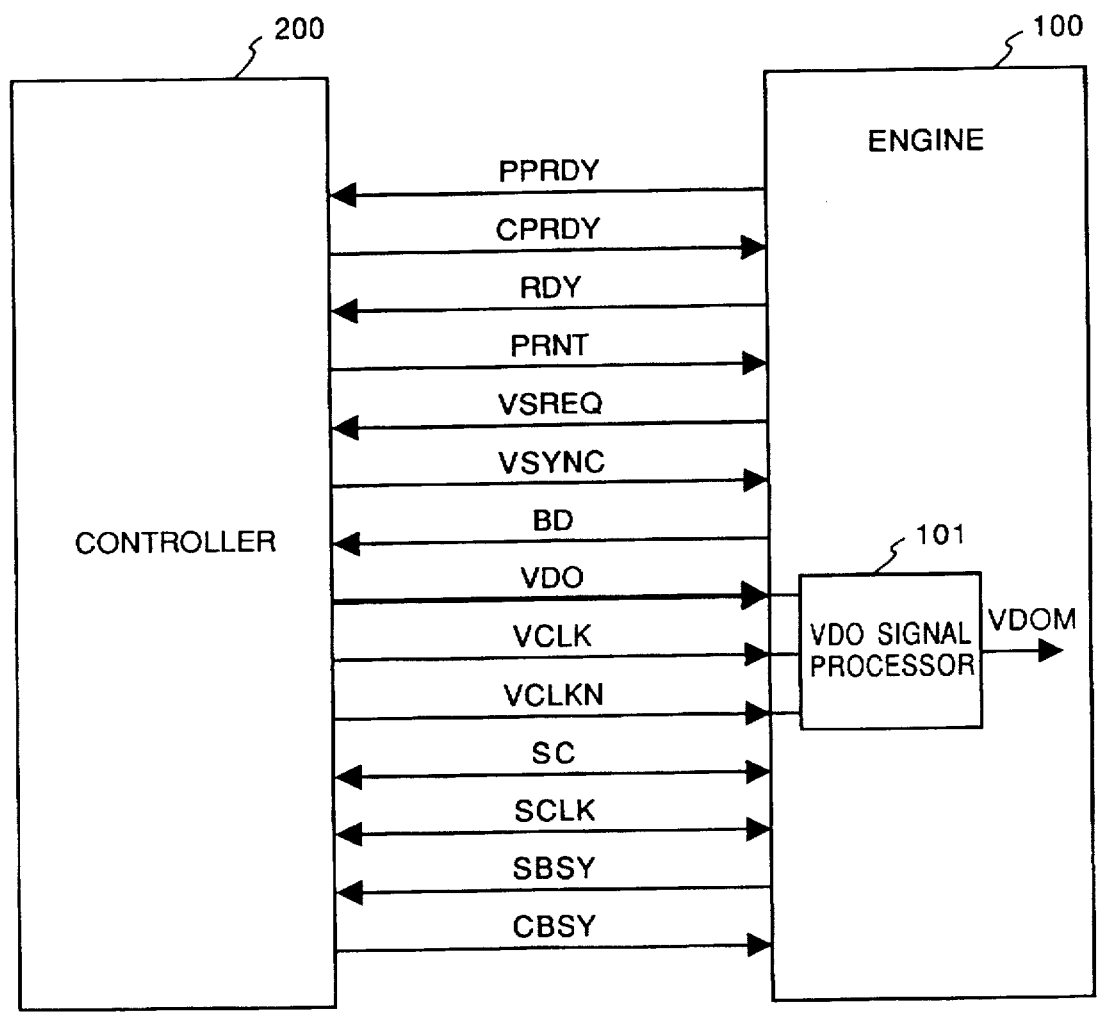
FIG. 3 is a diagram showing interface signals between the engine and a controller of the LBP depicted in FIG. 1.

FIG. 3 is a diagram illustrating interface signals between the engine and controller of the LBP according to this embodiment.

In FIG. 3, numeral 100 denotes an engine, 101 a VDO signal processor and 200 a controller.

The engine 100 is connected to the controller 200 via an interface (hereinafter referred to as an "I/F"). The engine 100 executes an output sequence upon receiving an output command and an image signal from the controller 200. The various I/F signals shown in FIG. 3 will now be described.

PPRDY: This is a signal sent from the engine 100 to the controller 200 and informs the controller 200 of the fact that the engine 100 is in an operable state.

CPRDY: This is a signal sent from the controller 200 to the engine 100 and informs the engine of the fact that the controller 200 is in an operable state.

RDY: This is a signal sent from the engine 100 to the controller 200 and indicates that the engine 100 is capable of starting an output operation at any time, or of continuing an output operation, if a PRNT signal, described below, has been received. For example, if execution of the output operation has become impossible, as when the paper cassette 2 is empty, the signal RDY becomes "false".

PRNT: This is a signal sent from the controller 200 to the engine 100 and commands start or continuation of the output operation. The engine 100 starts the output operation when the signal PRNT is received.

VSREQ: This is a signal sent from the engine 100 to the controller 200 and indicates that the engine 100 is capable of receiving image data after it has been commanded to start the output operation in response to the signal PRNT from the controller 200 having been made "true" when the signal RDY sent from the engine 100 is "true". When the engine 100 is in a state in which it can receive the image data, the engine is capable of receiving a signal VSYNC, described next.

Figure 4A:
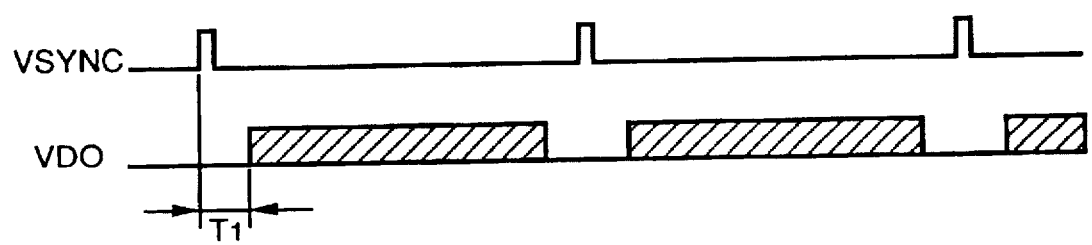
FIG. 4 is a timing chart illustrating interface signals shown in FIG. 3.

VSYNC: This is a signal sent from the controller 200 to the engine 100. This serves as a synchronizing signal for timing the transmission of the image data in the sub-scanning direction. By establishing synchronization with the signal VSYNC, the toner image that has been formed on the photosensitive drum 11 is transferred to the recording paper 1 in synchronization with the sub-scanning direction. An example of this relationship is shown in FIG. 4A, in which transmission of a signal VDO (described below) starts in synchronization with a signal BD (described next) upon passage of a time period T1 from the leading edge of the signal VSYNC.

Figure 4B:
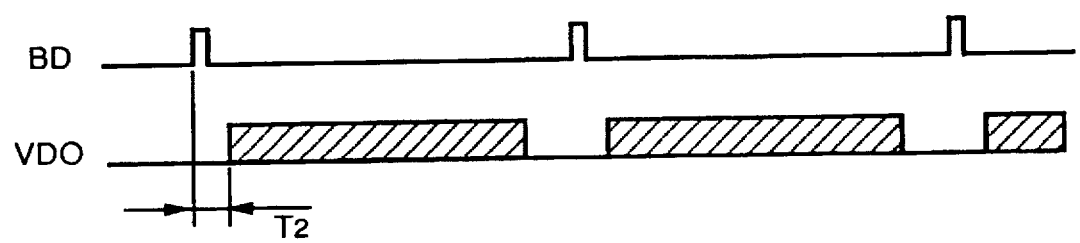

BD: This is a signal sent from the engine 100 to the controller 200. This serves as a synchronizing signal for timing the transmission of the image data in the main-scanning direction. By establishing synchronization with the signal BD, the toner image that has been formed on the photosensitive drum 11 is transferred to the recording paper 1 in synchronization with the main-scanning direction. The signal BD indicates that laser beam is at the starting point of the main scan. An example of this relationship is shown in FIG. 4B, in which transmission of a signal VDO (described next) starts upon passage of a time period T2 from the leading edge of the signal BD.

VDO: This is a signal sent from the controller 200 to the engine 100 and represents the image data to be outputted. The signal VDO is transmitted in synchronization with a signal VCLK, described next. The controller 200 receives code data such as a page-printer control code sent from a host (not shown) and generates a character bit code using a character generator (constituted by a ROM or RAM, etc.) that generates a character corresponding to the code data. In another possible arrangement, the controller 200 receives vector data such as a postscript code sent from the host and generates graphic bit data by executing processing with respect to the vector data. In still another possible arrangement, the controller 200 generates multivalued data corresponding to image data from a memory in which the image data has been stored by being read in from an image scanner or the like. The controller 200 sends these items of data to the engine 200 as the signal VDO, which is composed of six bits VDO0–VDO5. The engine 100 executes an output by controlling the laser in accordance with the signal VDO. Though the signal VDO here is composed of six bits, this does not impose a limitation upon the embodiment. The signal VDO may comprise eight bits or ten bits, by way of example.

VCLK: This is a signal sent from the controller 200 to the engine 100 and serves as a synchronizing signal for transmission/reception of the signal VDO.

VCLKN: This is a signal sent from the controller 200 to the engine 100. This signal is synchronized to the signal VCLK and has a frequency N times that of the signal VCLK, where N is an integer equal to two or more.

SC: This is a bidirectional serial signal for bidirectionally transmitting/receiving a "command", which is a signal sent from the controller 200 to the engine 100, and "status", which is a signal transmitted from the engine 100 to the controller 200. A signal SCLK (described below) is used as a synchronizing signal when the signal SC is transmitted or received, and signals SBSY, CBSY (described below) are used as signals that control the direction of transmission of the bidirectional signal. Here "command" is a serial signal of, say, eight bits and serves as command information through which the controller 200 instructs the engine 100 of whether the paper feeding mode for feeding the recording paper 1 is a mode for feeding the paper from the paper cassette 2 or a mode for feeding paper from the paper feeding platform 16. "Status'" is a serial signal of, say, eight bits and serves as information through which the engine 100 informs the controller 200 of various states of the engine 100, such as whether the engine 100 is in a standby state, in which the temperature of the fixing rollers 8, 8' of the engine 100 has not yet attained a temperature at which fixing is possible, a state in which the recording paper has jammed or a state in which the paper cassette 2 is empty.

SCLK: This is a synchronizing pulse signal in accordance with which the engine 100 accepts the "command" or the controller 200 accepts "status".

SBSY: This is a signal that allows the engine 100 to take possession of the signal SC and the signal SCLK before "status" is transmitted. CBSY: This is a signal that allows the controller 200 to take possession of the signal SC and the signal SCLK before the "command" is transmitted.

The signal VDO which has entered the engine 100 along with the signal VCLK is processed by the VDO signal processor 101, which executes signal processing that is a characterizing feature of this embodiment, disposed within the engine 100. The VDO signal processor 101 converts the signal VDO into a signal VDOM by processing, described below, and sends the signal VDO to the laser driver 50 to drive the semiconductor laser 51.

The operation of the I/F will now be described in detail.

When a power supply switch is closed, the engine 100 has its internal components initialized, after which the engine sends the "true" signal PPRDY to the controller 200. The controller 200 similarly has its internal components initialized and sends the "true" signal CPRDY to the engine 100. As a result, the engine 100 and the controller 200 verify that each other's power supply has been turned on.

Next, the engine 100 sends current to the fixing heater 24 housed within the fixing rollers 8, 8'. When the surface temperature of the fixing rollers 8, 8' attains a temperature at which fixing is possible, the engine 100 renders the signal RDY "true". After verifying that the signal RDY is "true", the controller 200 sends the "true" signal PRNT to the engine 100 if there is image data to be output. Upon verifying that the signal PRNT is "true", the engine 100 rotates the photosensitive drum 11 to uniformly initialize the potential of the surface of photosensitive drum 11 and, at the same time, drives the paper feeding cam 3 when the cassette feeding mode is in effect so as to convey the leading edge of the recording paper 1 to the position of the resisting shutter 5. When the mode for manual insertion of recording paper is in effect, the recording paper is conveyed from the paper feeding platform 16 to the position of the resisting shutter 15 by the paper feeding roller 17.

Thereafter, upon attaining a state in which the signal VDO is capable of being accepted, the engine 100 makes the signal VSREQ "true". Upon verifying that the signal VSREQ is "true", the controller 200 makes the signal VSYNC "true" and, at the same time, successively transmits the signal VDO in synchronism with the signal BD.

After verifying that the signal VSYNC is "true", the engine 100 drives the resisting solenoid 6 in synchronism therewith so as to release the resisting shutter 5. As a result, the recording paper 1 is conveyed to the photosensitive drum 11. In conformity with the signal VDO, the engine 100 fires the laser beam when a black image is output and extinguishes the laser beam when a white image is output, thereby forming a latent image on the photosensitive drum 11. Next, the engine 100 causes the developing device 14 to apply toner to the latent image to form a toner image, after which the toner image on the photosensitive drum 11 is transferred to the recording paper 1 by the transfer charging device 15. The transferred toner image is then fixed by the fixing rollers 8, 8', after which the recording paper 1 is ejected into the discharge tray 10.

Figure 5:
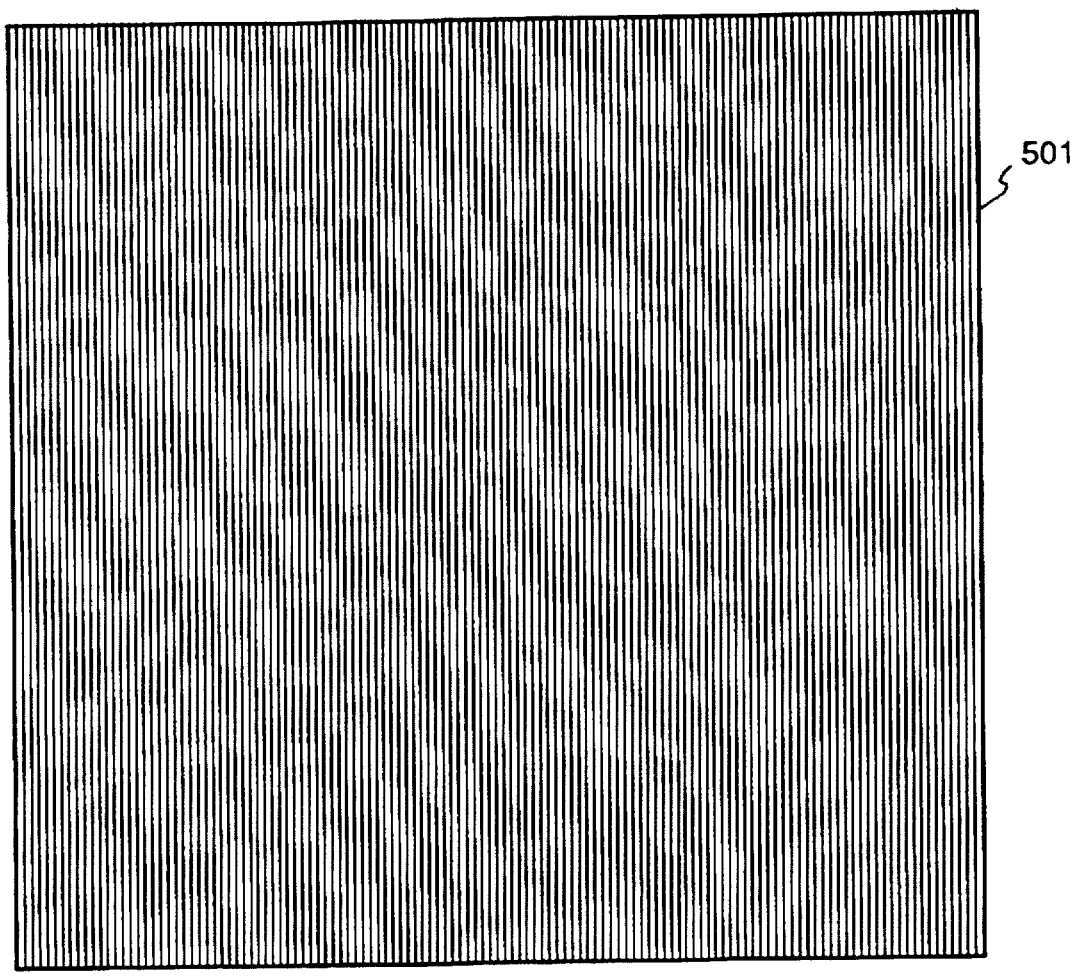
FIG. 5 is a diagram showing the subdivided state of a pixel according to this embodiment.

Formation of Half-Tone Image In this embodiment, subdivisions obtained by subdividing one pixel 501 of 300 dpi into 128 parts in the main-scanning direction are provided, as shown in FIG. 5. A half-tone image of 300 lines and 128 steps is obtained by outputting or not outputting each of these subdivisions. Though it is mentioned here that a pixel of 300 dpi is subdivided into 128 parts, this does not impose a limitation upon the embodiment; one pixel can be subdivided into any number of subdivisions.

Figure 6:
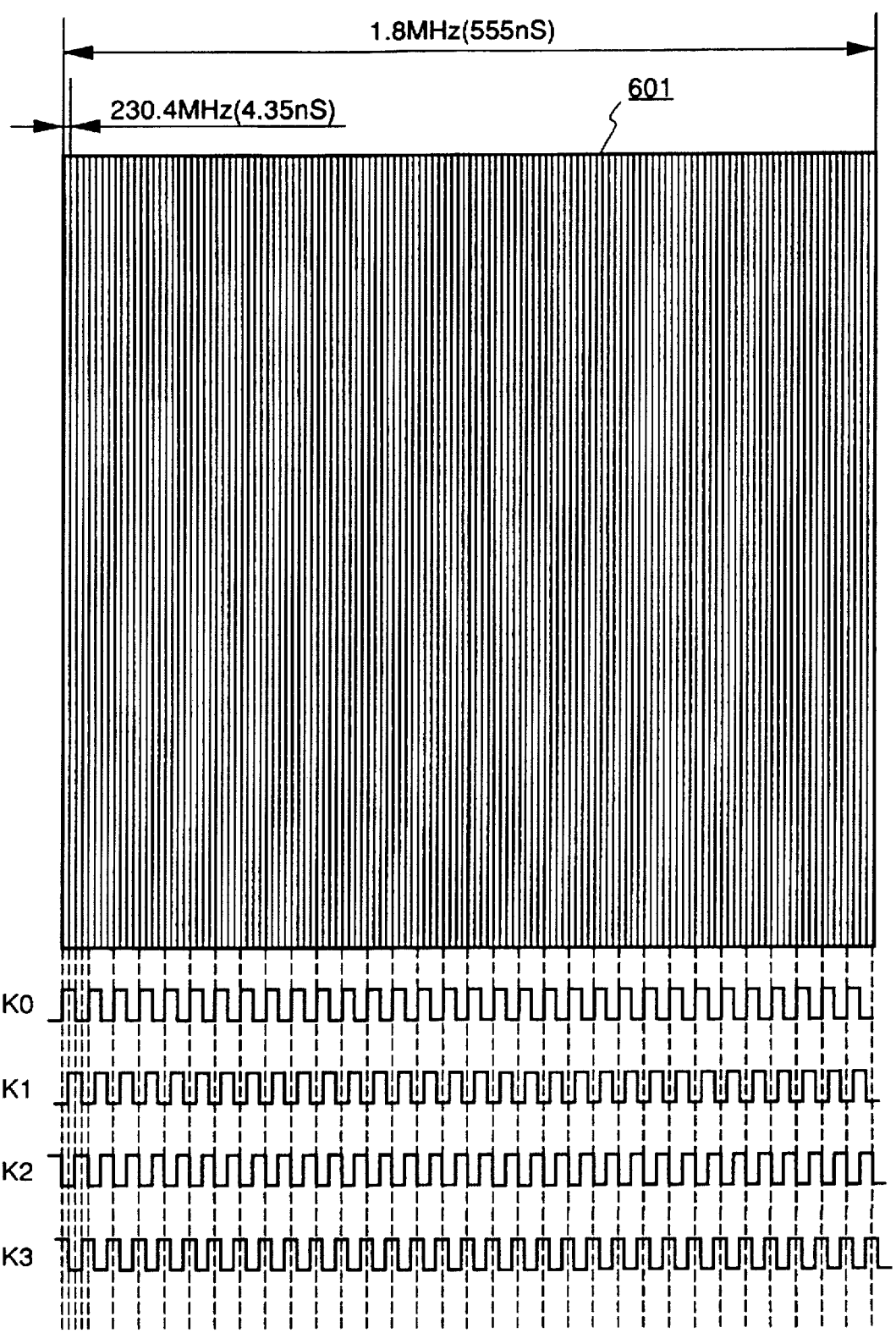
FIG. 6 is a diagram for describing the concept according to which a half-tone image is formed according to this embodiment.

FIG. 6 is a diagram for describing the concept according to which a half-tone image is formed according to this embodiment.

When a pixel 601 of 300 dpi is subdivided into 128 parts, the clock frequency will be 1.8×128=230.4 MHz even if the conventional digital counting method is employed. Consequently, the counter cannot be constructed using TTL or CMOS logic.

Accordingly, in this embodiment, a clock K0 having a frequency of 57.6 MHz, which is one-fourth of 230.4 MHz, is provided, and so are clocks K1, K2, K3 exhibiting the same frequency as K0 but having phases each successively delayed by 90°. The digital counting method is made possible by suitably selecting and counting these four clocks. As a result, the clock frequency counted is 57.6 MHz, and pulse width can be controlled by a frequency counted by a counter composed of TTL or CMOS logic and at a resolution of one-fourth of the clock period. The digital counting method according to this embodiment manifests its effectiveness at a frequency greater than that (40 MHz) generally said to be the operating limit of TTL or CMOS logic.

Figure 7:
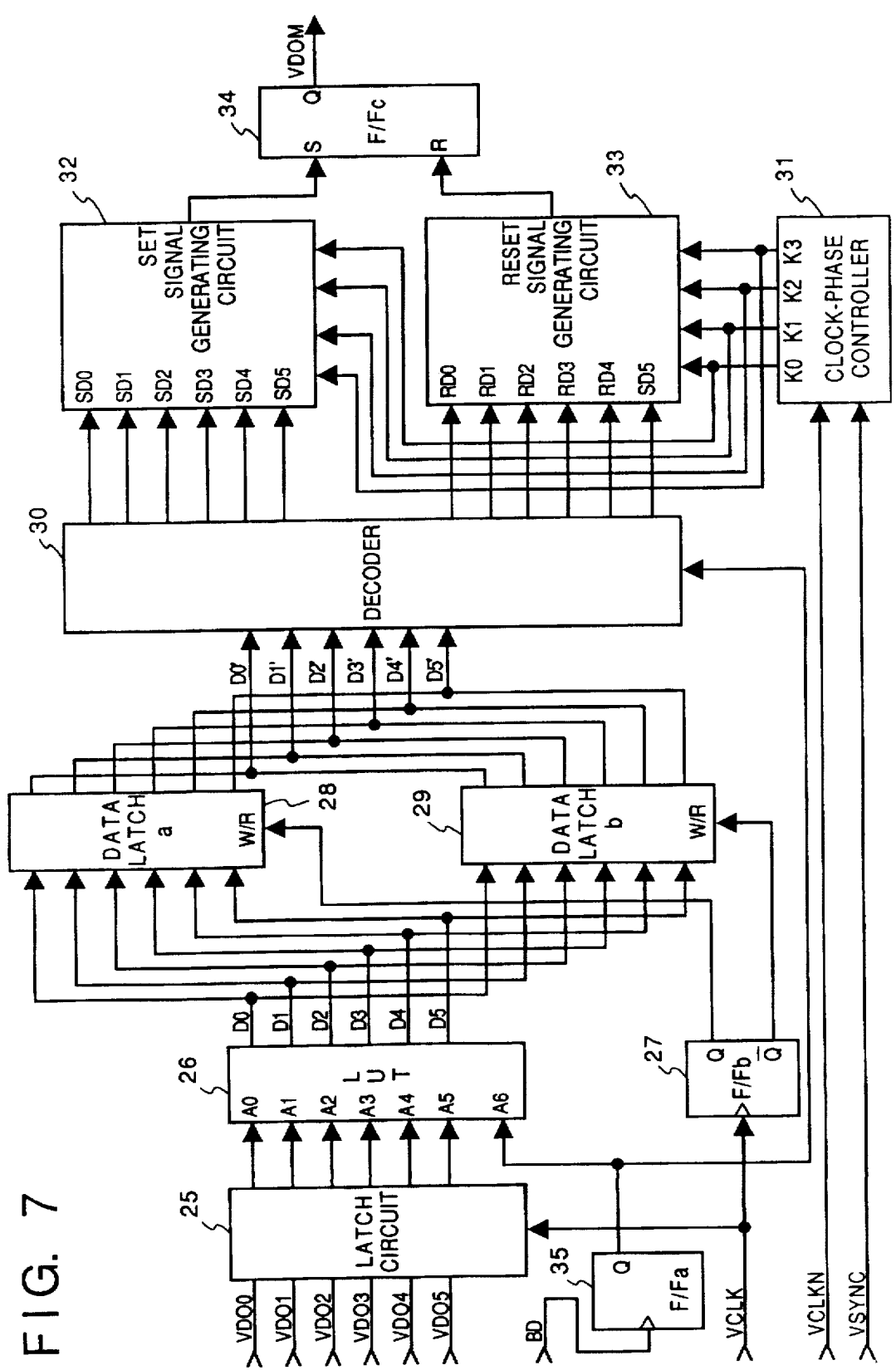
FIG. 7 is a block diagram showing the construction of a VDO signal processor in FIG. 3.

VDO Signal Processor FIG. 7 is a block diagram showing the construction of the VDO signal processor 101.

Figure 8A:
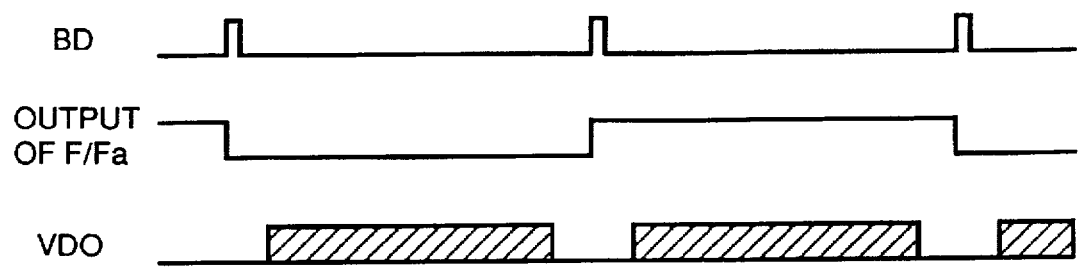
FIG. 8 shows the relationship between a signal BD and an image signal VDO, as well as a timing chart associated with a clock-phase controller in FIG. 7.

As shown in FIG. 7, the VDO signal processor 101 includes a latch circuit 25 which, in synchronism with the signal VCLK, latches the image signals VDO0~VDO5 of six bits input thereto. The image data latched by the latch circuit 25 enters address terminals A0~A5 of a look-up table (LUT) 26, constituted by a ROM. A flipflop (F/Fa) 35 frequency-divides the input signal BD by two and outputs the result to a terminal A6 of the LUT 26. FIG. 8A is a diagram illustrating the relationship between the signal BD and the output of the F/Fa 35, as well as the relationship between the signal BD and the image signal VDO. A flip-flop (F/Fb) 27 frequency-divides the input signal VCK by two and delivers its Q output to a terminal W/R of a data latch 28 and its Q̄ output to a terminal W/R of a data latch 29. It should be noted that the output Q̄ of the F/Fb 27 is the inverse of the output Q of this flip-flop.

Outputs D0~D5 of the LUT 26 enter both of the data latches 28 and 29. If the input to the W/R terminal of the data latch 28 is "L", the data latch 28 is placed in the write state and its output is placed at a high impedance. At such time the data latch 29 is in the read state and a data input thereto is inhibited. If the input to the W/R terminal of the data latch 28 is "H", the data latch 28 is placed in the read state and a data input thereto is inhibited. At such time the data latch 29 is in the write state and its output is placed at a high impedance. Thus, the data latch 28 and data latch 29 construct a double buffer with respect to the signal VCLK.

Since the data latch 28 and data latch 29 alternately output data in the manner described above, a decoder 30 alternately receives the outputs of the data latch 28 and data latch 29 as data inputs D0'~D5'. The decoder 30 outputs data SD0~SD5 and data RD0~RD5 in accordance with the input data D0'~D5'. The items of data SD0~SD5 and data RD0~RD5 output by the decoder 30 enter a set signal generating circuit 32 and a reset signal generating circuit 33, respectively.

Figure 8B:
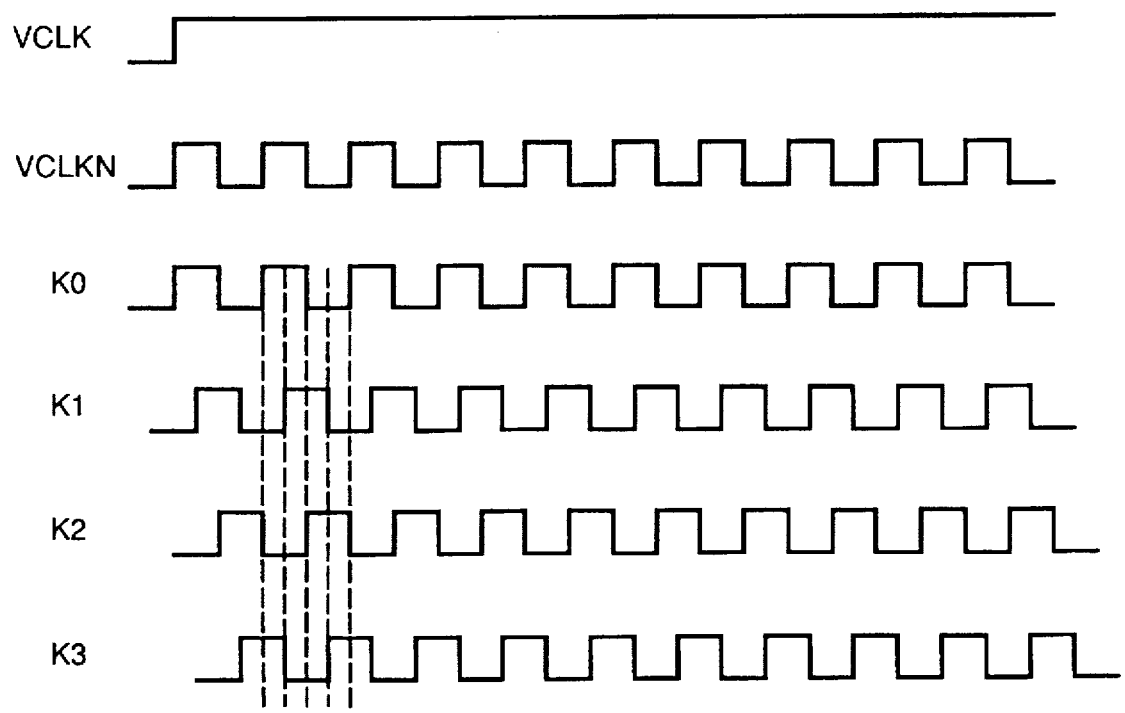

A clock-phase controller 31 receives the signal VCLKN as an input, generates the clock K0 having the same phase as VCLKN, generates the clocks K1, K2, K3 whose phases are each successively delayed by 90°from the phase of K0, and sends these clock signals K0~K3 to the set signal generating circuit 32 and reset signal generating circuit 33. FIG. 8B is a timing chart associated with the clock phase controller 31.

Figure 9:
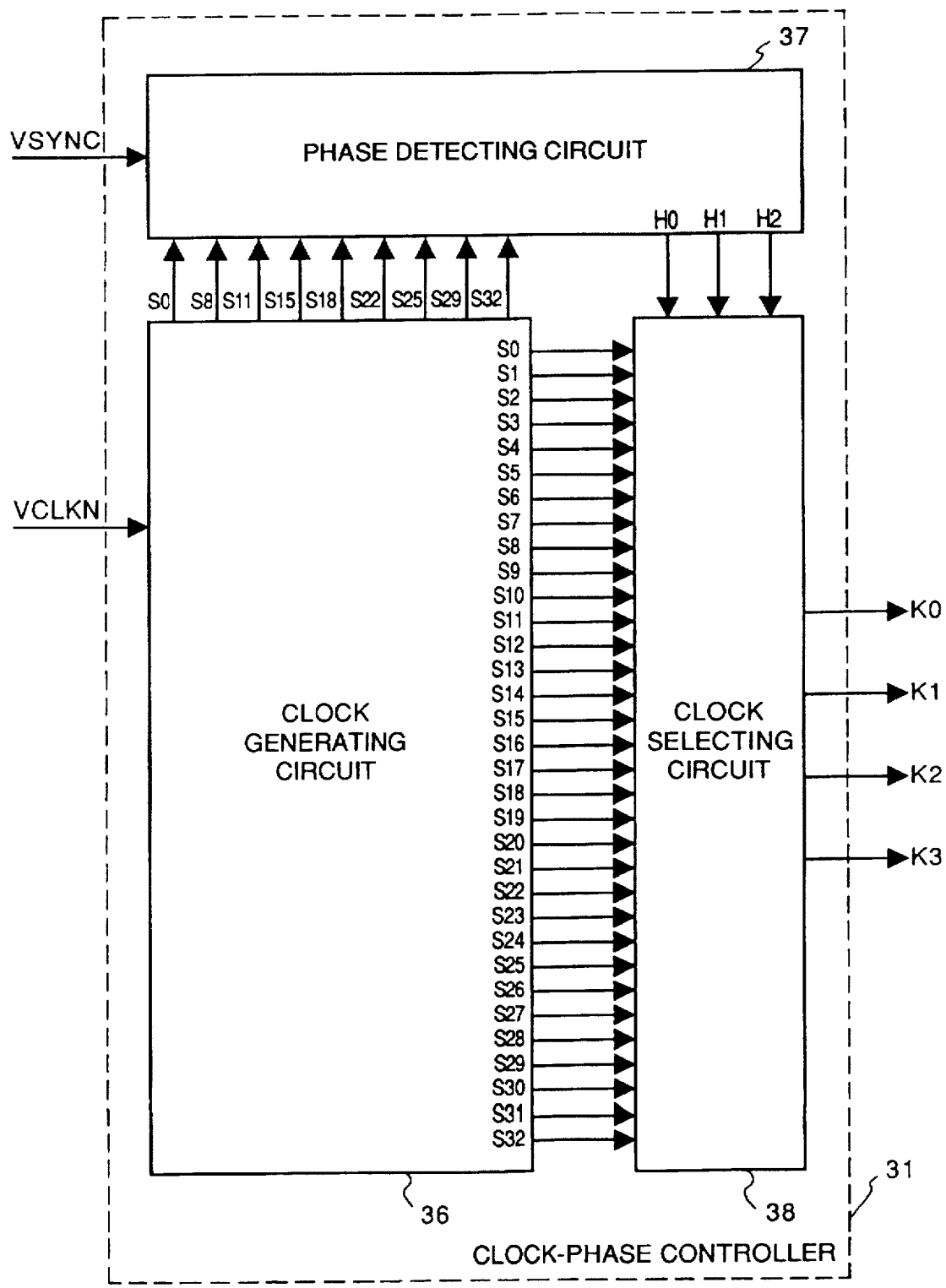
FIG. 9 is a block diagram showing the construction of the clock-phase controller of FIG. 7.

FIG. 9 is a block diagram showing the construction of the clock-phase controller 31.

Figure 10:
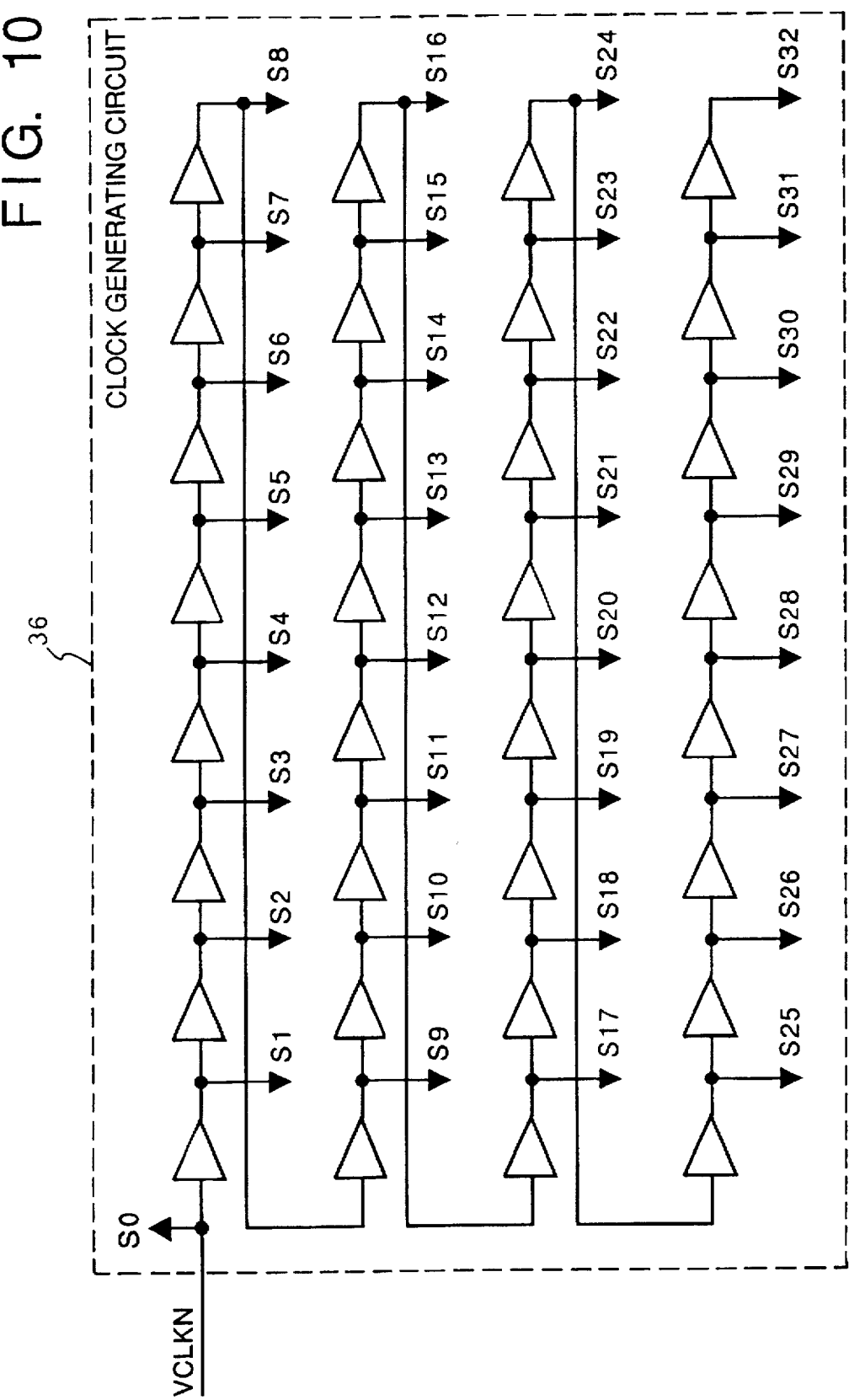
FIG. 10 is a block diagram showing the construction of a clock generating circuit in FIG. 9.

As shown in FIG. 9, the clock-phase controller includes a clock generating circuit 36, the detailed construction of which is illustrated in FIG. 10. The clock generating circuit 36 passes the input signal VCLKN through a delay circuit network comprising a plurality of gates and extracts the outputs of these gates to generate clock signals S1~S32 that are each shifted in phase. It should be noted that the clock signal S0 is VLCKN.

In general, the time delay produced by passing a signal through a gate exhibits a considerable variance from one gate to another. In order to obtain a stable delay time, therefore, it is preferred that the group of gates used in the clock generating circuit 36 be constructed on the same IC package. An even more desirable arrangement is to put not only the group of gates but also the circuitry shown in FIG. 10 and the circuitry shown in FIG. 11 in the form of an integrated circuit constructed on the same IC package. Further, the variance in the delay time from one IC package to another is made, say, 0.6~1.8 ns in terms of the delay time per gate. A variance in delay time on this order generally can be achieved with an inexpensive CMOS gate array. Furthermore, in this embodiment, the variance in delay time is adjusted automatically to obtain the clocks K0~K3 each successively delayed in phase by 90°.

Figure 11:
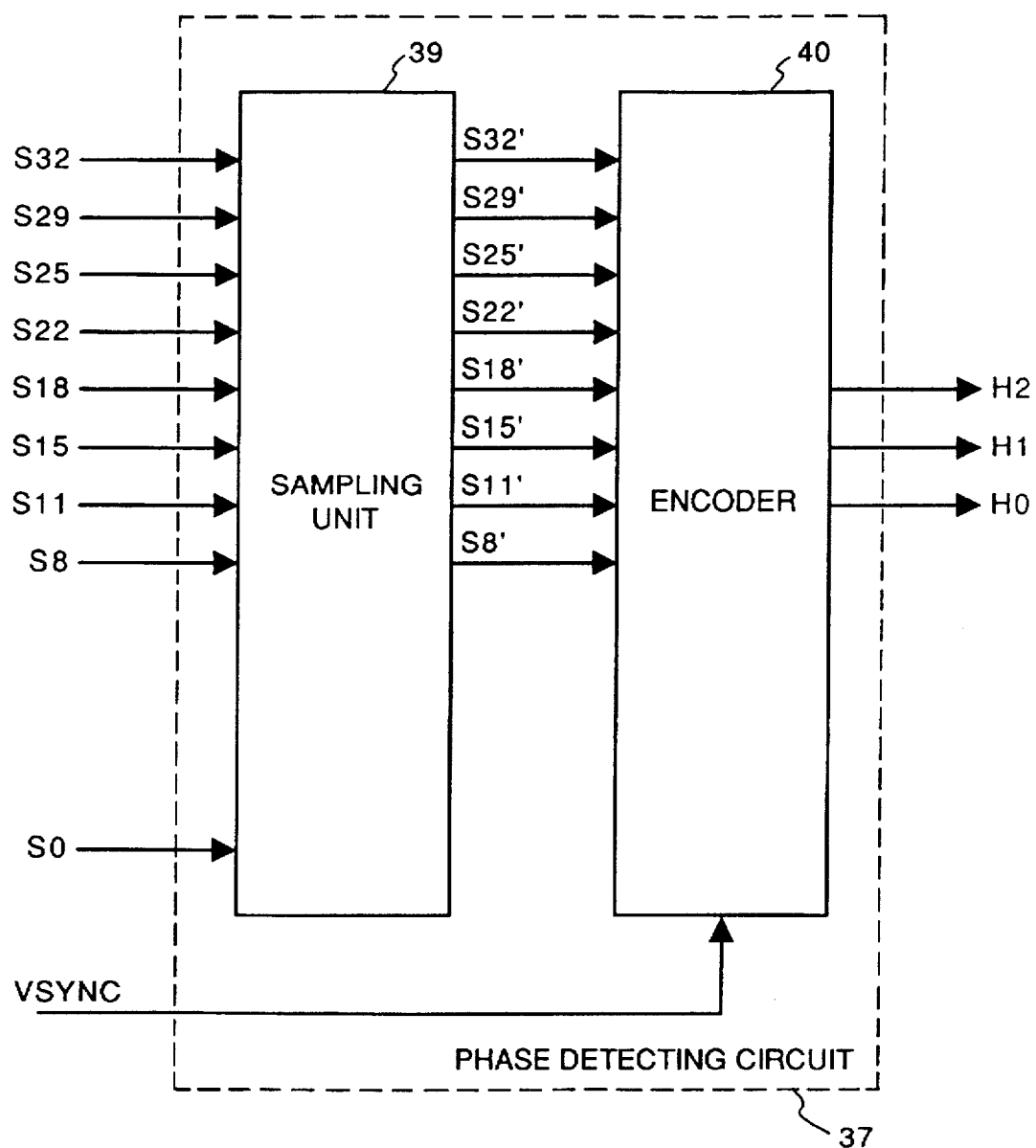
FIG. 11 is a block diagram showing the construction of a phase detecting circuit in FIG. 9.

The clock-phase controller 31 in FIG. 9 further includes a phase detecting circuit 37, the detailed construction of which is shown in FIG. 11. Here numeral 39 denotes a sampling unit whose inputs are the clock S0 (e.g., a signal having a frequency of 57.6 MHz and a period of 17.4 ns) and the clocks S8, S11, S15, S18, S22, S25, S29, S32, which have eight different phases, from the clock generating circuit 36. The sampling unit 39 samples the other clocks at the leading edge of the clock S0 and outputs sampling data S8', S11', S15', S18', S22', S25', S29', S32'.

The phase detecting circuit in FIG. 11 further includes an encoder 40 for latching the sampling data at the leading edge of the signal VSYNC and outputting signals H0~H2 that conform to the data latched. It should be noted that though the example here is one in which the sampling data is latched by the signal VSYNC, latching may be performed at the leading edge of the signal BD.

The clock-phase controller 31 in FIG. 9 further includes a clock selecting circuit 38 to which the signals H0~H2 output by the encoder 40 are input. The clock selecting circuit 38 outputs signals, which have been selected from the clocks S1~S32 in dependence upon the signals H0~H2, as the clocks K1~K3. As mentioned above, the clock K0 has the same phase as the signal VCLKN, and therefore the clock S0 is output as the clock K0.

More specifically, upon obtaining the clocks that are successively delayed in phase by 90°, the clock-phase controller 31 selects the optimum clocks, by means of the clock selecting circuit 38, from the clocks S1~S32 based upon the sampling results from the sampling unit 39.

FIG. 12 is a diagram showing the relationship among the sampling data, the signals H0~H2 and the selected clocks.

In the case of the combination 1201 shown in FIG. 12, namely in a case where S8, S15, S18, S22, S25, S32 are "L", "H", "H", "L", ""L", "H", respectively, the signals H0, H1, H2 are "H", "L", "L", respectively. It should be noted that while examples of only two sets of sampling data are shown in FIG. 12 and other sets are omitted, decisions are made in the same manner in other cases as well.

Figure 13:
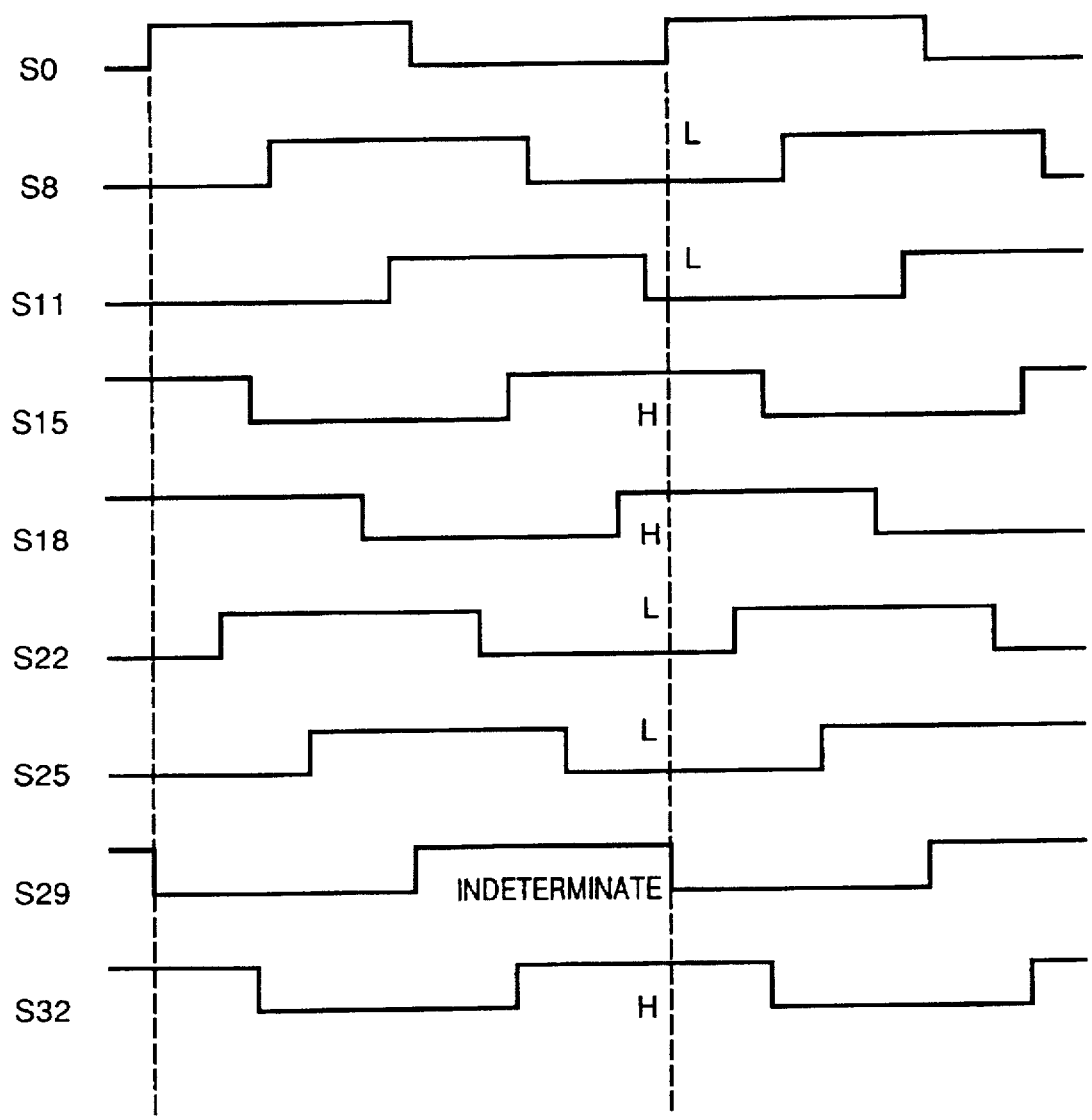
FIGS. 13 and 14 are timing charts showing examples of clocks selected based upon the signals H0–H2 in FIG. 9.
Figure 14:
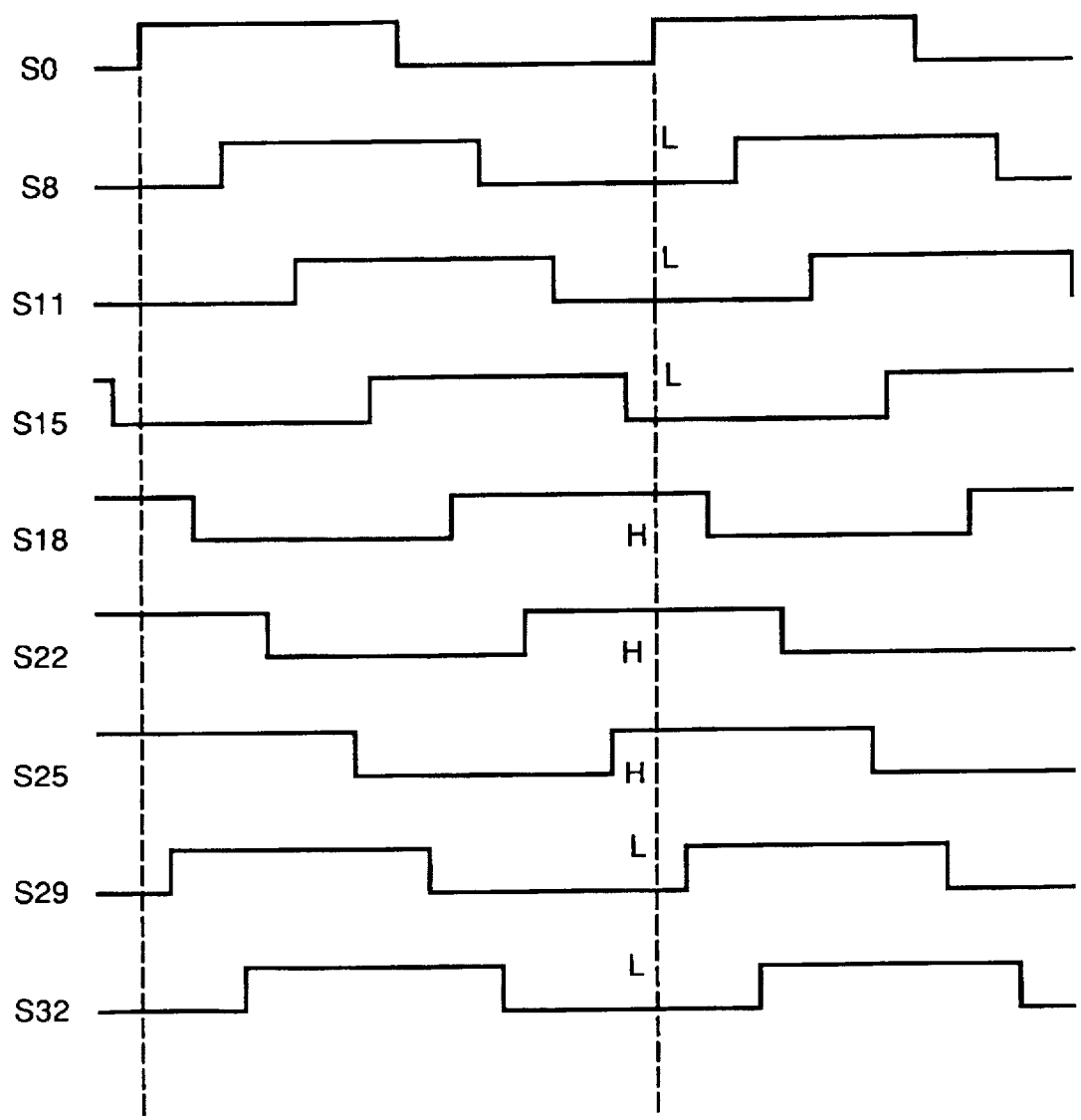

The combination 1201 shown in FIG. 12 is for a case where the clocks are related as shown in FIG. 13. On the basis of the signals H0, Hi, H2, the clock selecting circuit 38 selects clock S16 as clock K3, clock S11 as clock K2 and clock S5 as clock K1. The combination 1202 shown in FIG. 12 is for a case where the clocks are related as shown in FIG. 14. On the basis of the signals H0, Hi, H2, the clock selecting circuit 38 selects clock S21 as clock K3, clock S14 as clock K2 and clock S7 as clock K1.

Figure 15:
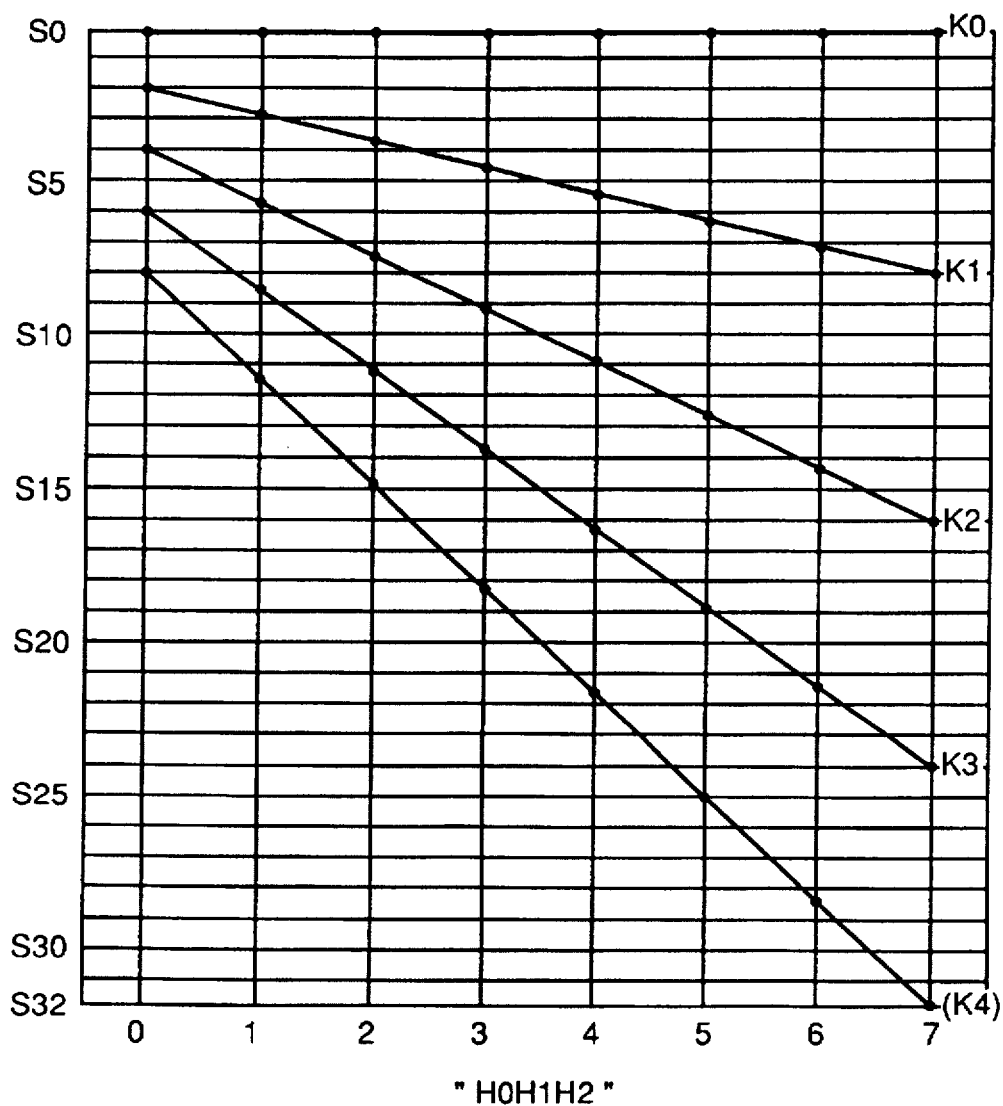
FIG. 15 is a diagram showing the relationship between the signals H0–H2 and four clocks K0–K3 in FIG. 9.

FIG. 15 is a diagram showing the relationship between the signals H0~H2 and four clocks K0~K3 in FIG. 9. The horizontal axis in FIG. 15 represents "H0H1H2" in the form of a decimal number. Thus, as shown in FIG. 15, the four clocks K0, K1, K2, K3, the phases of which are each successively delayed by one-quarter of the period of the signal VCLKN, can be obtained.

The above-described control performed by the clock-phase controller 31 is carried out whenever the signal VSYNC (or the signal BD) is applied thereto. Accordingly, a fluctuation due to disparity in gate delay time from one gate to another or a variation in gate delay time caused by an environmental change such as a change in temperature, as well as a fluctuation brought about by some other cause related to the passage of time, is corrected for so as to obtain the four clocks K0-K4 whose phase differences are stable at all times.

In the description given here, an example is illustrated in which the clocks K0-K3 are obtained using the leading edge of the signal VCLKN as a reference. However, a signal obtained by inverting the signal VCLKN can be adopted as the clock K2. In such case, however, the duty ratio of the signal VCLKN will be required to be 50%.

Further, in the foregoing description and drawings, an example is illustrated in which use is made of four clocks whose phases are obtained by splitting the signal VCLKN into four parts. However, this does not impose a limitation upon the invention. For example, eight clocks whose phases are obtained by splitting the signal VCLKN into eight parts may be used, as well as 16 clocks whose phases are obtained by splitting the signal VCLKN into 16 parts.

With reference again to FIG. 7, the set signal generating circuit 32 receives the data SD0-SD5 and the clocks K0-K3 as input signals and generates a set signal S based upon logic described below. Similarly, the reset signal generating circuit 33 receives the data SD0-SD5 and the clocks K0-K3 as input signals and generates a reset signal R based upon logic described below.

Numeral 34 denotes a flip-flop (F/Fc) the output Q of which is set by the set signal S output by the set signal generating circuit 32. The output Q is reset by the reset signal R output by the reset signal generating circuit 33. The output Q serves as the image signal VD0M.

Figure 16:
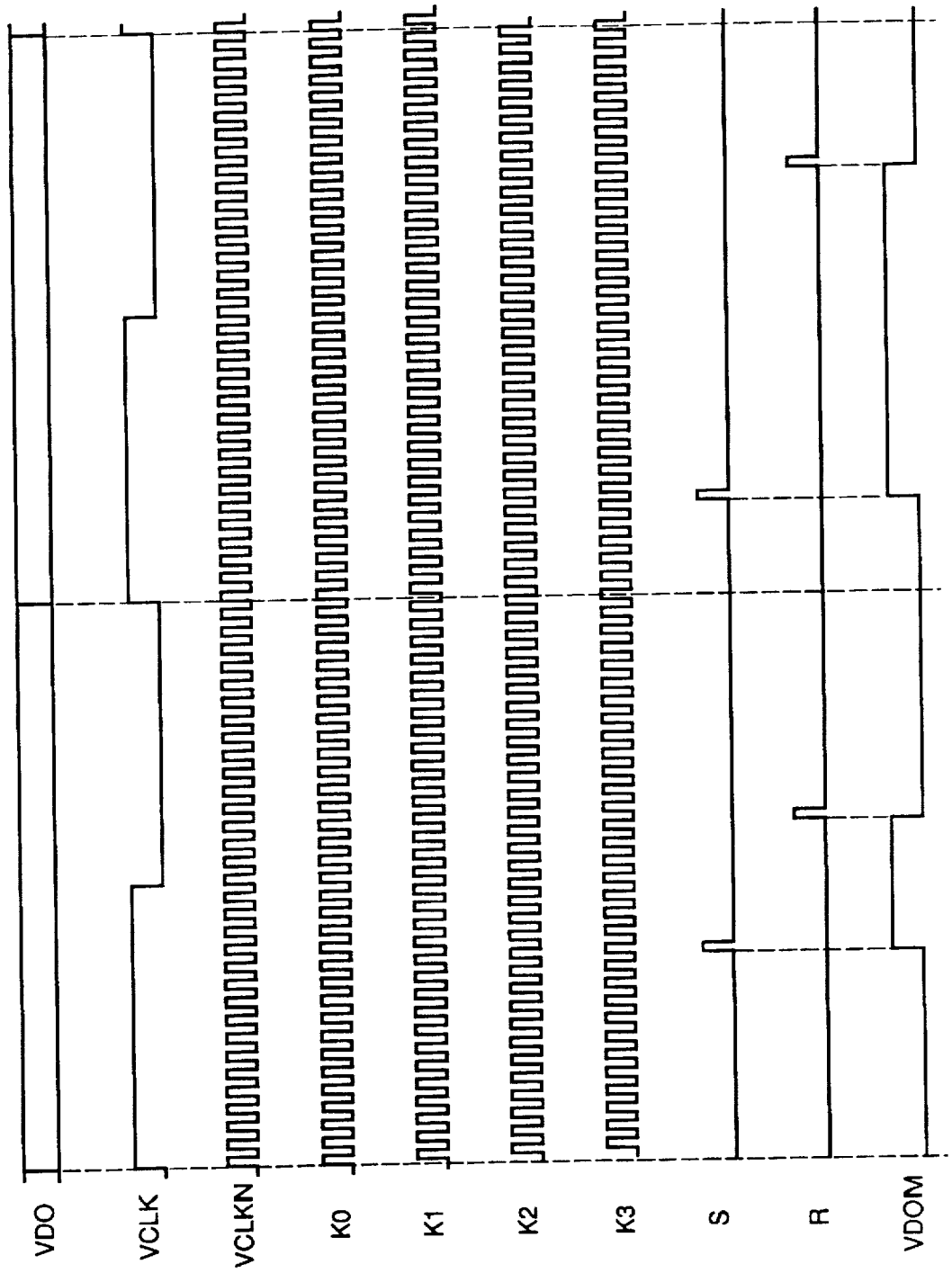
FIG. 16 is a timing chart associated with the VDO signal processor of FIG. 7.

FIG. 16 is a timing chart associated with the VD0 signal processor 101.

In FIG. 16, the signal VCLK is obtained by frequency-dividing the signal VCLKN by 32 using a controller, not shown.

The image signal VD0 is inputted to the latch circuit 25 and latched in synchronism with signal VCLK. The data latched in the latch circuit 25 enters the address terminals A0-A5 of the LUT 26 so that the stored data D0-D5 within the LUT 26 addressed by the image signal VD0 is delivered by the LUT. Since the data that enters the address terminal A6 of LUT 26 is inverted whenever the signal BD enters, the outputs D0 D5 of the LUT 26 are just as would be delivered alternately by two look-up tables. In the foregoing description and in FIG. 7, the image data is composed of six bits (e.g., D0-D5). However, this does not impose a limitation upon the invention. By way of example, the image data may consist of eight bits.

The LUT 26 functions as a so-called γ-corrector that corrects the image data in conformity with the output characteristic of the engine 100.

The data latches a28 and b29 that function as a double buffer with respect to the image data D0-D5 compensate for the access speed of the LUT 26. That is, though the element such as the ROM constituting the LUT 26 generally has an access speed of 80-150 ns, the double buffer comprising the data latches a28 and b29 has a much higher readout access speed on the order of, say, 1-2 ns. Accordingly, if data read out of the LUT 26 is written in one data latch while data is read out of the other data latch, the apparent access speed can be raised.

Figure 17:
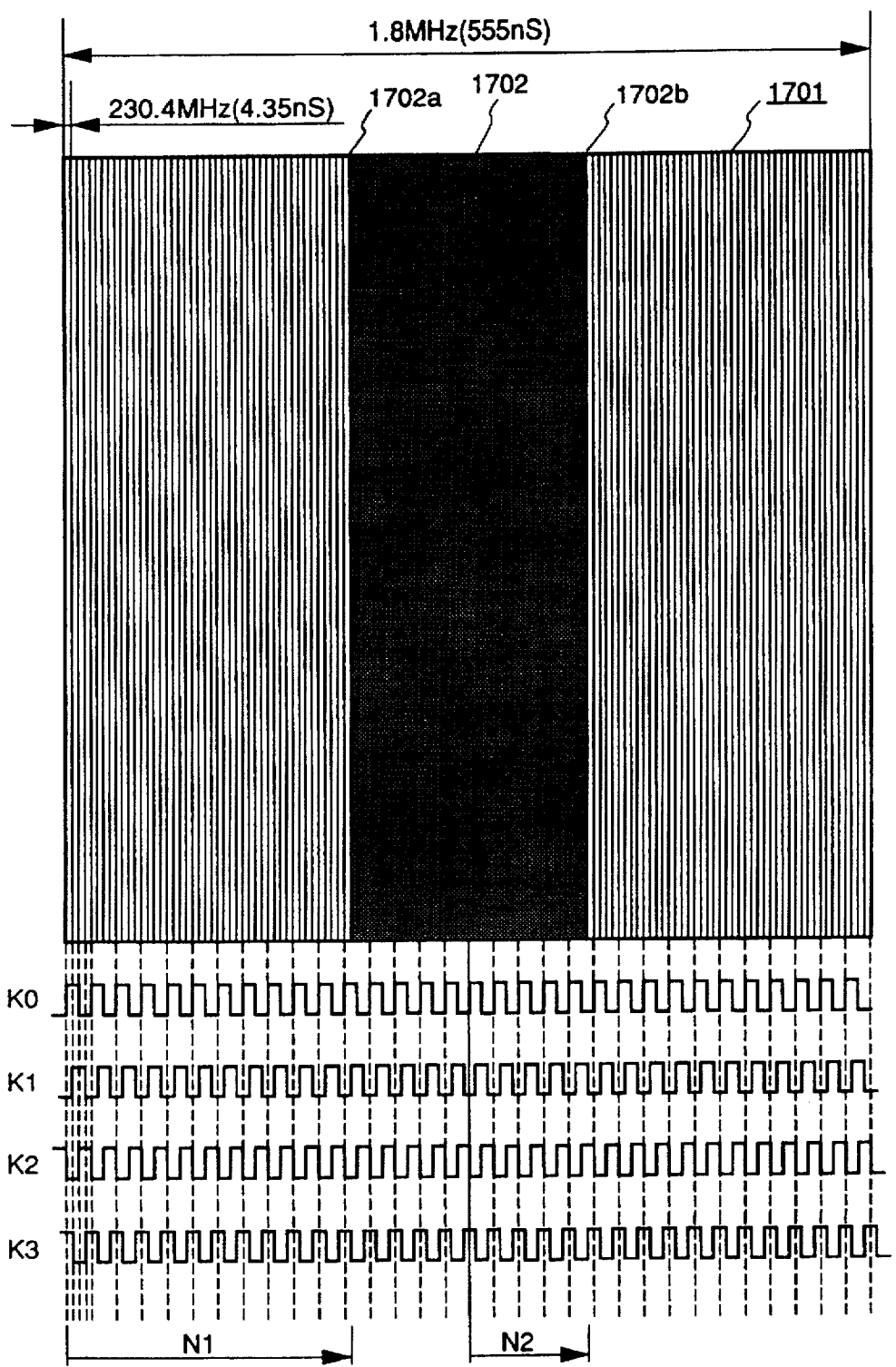
FIGS. 17 through 21 are diagrams showing examples of output pixels according to the embodiment.

The data D0'-D5' output by the double buffer is inputted to the decoder 30 shown in FIG. 7 as data representing the density of one pixel 1701 of 300 dpi illustrated in FIG. 17. In order to output pixel area 1702 (FIG. 17) proportional to the density indicated by the input data D0'-D5', the decoder 30 outputs the signals SD and RD, which designate an output starting point 1702a and output end point 1702b of the pixel area 1702. It is assumed here that the output starting point 1702a is to the left of the center of pixel 1701 and that the output end point 1702b is to the left of the center of pixel 1701. In other words, the decoder 30 outputs the signals SD and RD in such a manner that the output area broadens from the center of the pixel 1701 as the density indicated by D0'-D5' rises from low to high.

In the present embodiment, the signals SD and RD output by the decoder 30 may be set in such a manner that the output area grows from the left end or right end of the pixel 1701 rather than from the center of the pixel 1701. Furthermore, the output area within pixel 1701 is not limited to a single area. For example, a plurality of mutually independent output areas can be set within the pixel 1701.

The two higher order bits (SD5, SD4) of the signal SD output by decoder 30 designate one of the clocks K0-K3, and the four lower bits (SD3-SD0) of the signal SD represent a count value N1. More specifically, a position obtained by counting N1 pulses of the clock, which has been selected by SD5, SD4, from the left end of pixel 1701 is the output starting point 1702a, and the decoder 30 outputs the set signal S at the moment N1 of the clock pulses have been counted.

Similarly, the two higher order bits (RD5, RD4) of the signal RD output by the decoder 30 designate one of the clocks K0-K3, and the four lower bits (RD3-RD0) of the signal RD represent a count value N2. More specifically, a position obtained by counting N2 pulses of the clock, which has been selected by RD5, RD4, from approximately the center of pixel 1701 is the output end point 1702b, and the decoder 30 outputs the reset signal R at the moment N2 of the clock pulses have been counted.

Table 1 below illustrates the relationship between SD5, SD4 (or RD5, RD4) and the selected clocks.

TABLE 1

| SD5 (RD5 | SD4 RD4) | SELECTED CLOCK |
| --- | --- | --- |
| 0 | 0 | K0 |
| 0 | 1 | K1 |
| 1 | 0 | K2 |
| 1 | 1 | K3 |

The F/Fc 34 sets the image signal VD0M to the "H" level at the leading edge of the set signal S applied thereto and to the "L" level at the leading edge of the reset signal R applied thereto.

Thus, as set forth above, the VD0 signal processor 101 produces the image signal VD0M that outputs a partial region within the pixel 1701, and the engine 100 fires the laser in response to the "H" level of the image signal VD0M and extinguishes the laser in response to the "L" level of the image signal VD0M, thereby outputting a half-tone image in single-pixel units of 300 dpi.

Thus, in accordance with this embodiment, the image signal VD0M, which is the result of pulse-width controlling the image signal VD0 by a digital technique, is supplied to the engine 100, whereby the engine is caused to output a half-tone image.

Specific Method of Producing Half-Tone Image Output

The method through which the half-tone image is output will now be described in detail taking the output pixel of FIG. 17 as an example. The example illustrated in FIG. 17 is one in which the signal SD is "011100" and the signal RD is "100101". Accordingly, the set signal generating circuit 32 selects the clock signal K1 and counts 12 of these clock pulses on the basis of signal SD, and the reset signal generating circuit 33 selects the clock signal K2 and counts five of these clock pulses on the basis of signal RD.

Figure 18:
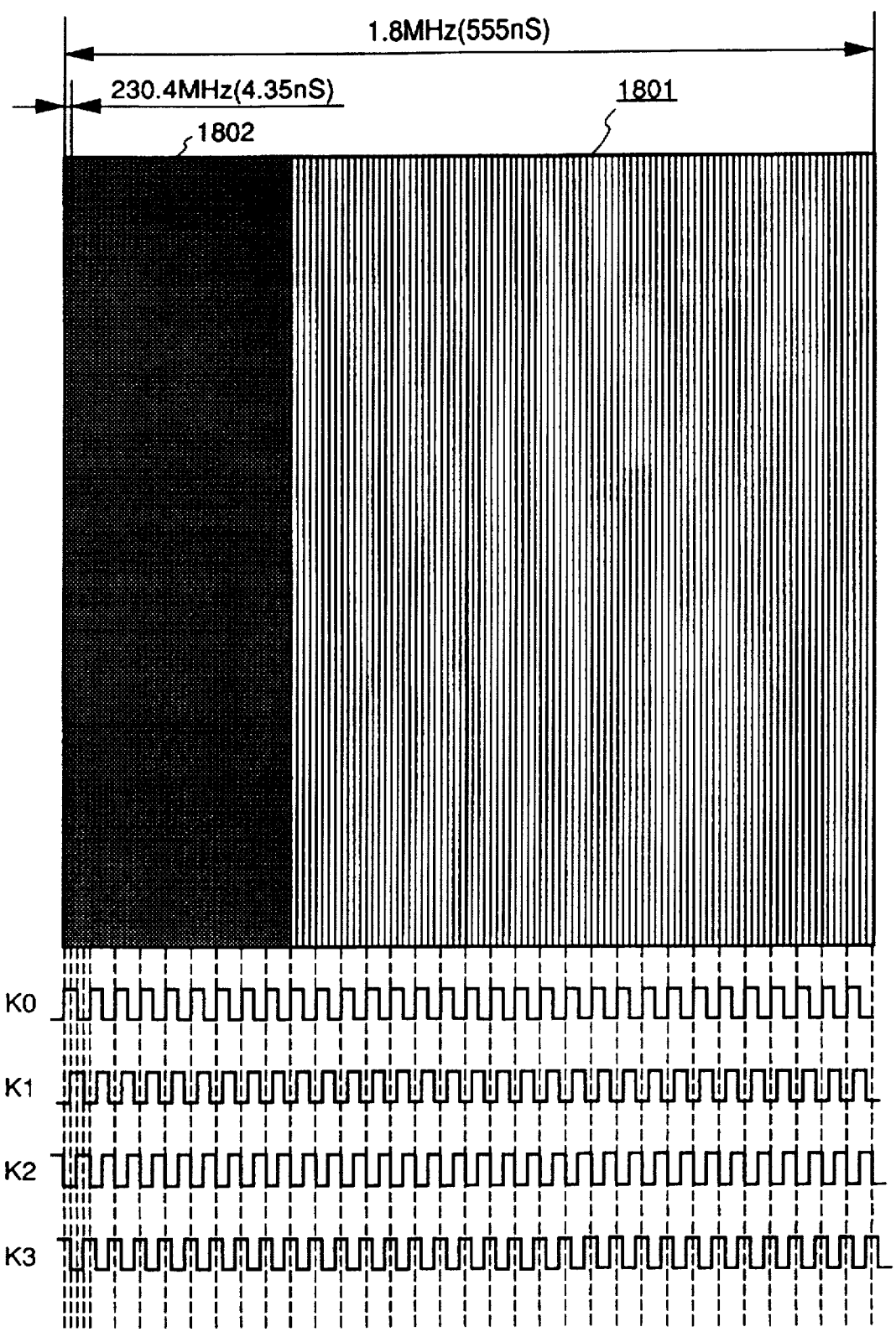
Figure 19A:
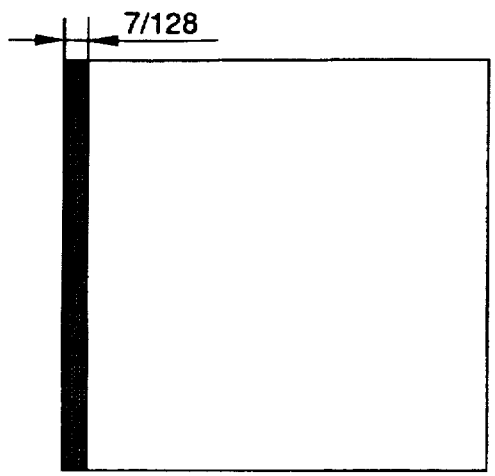
Figure 19D:
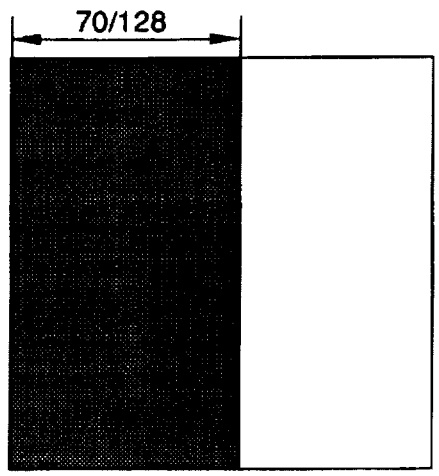
Figure 19B:
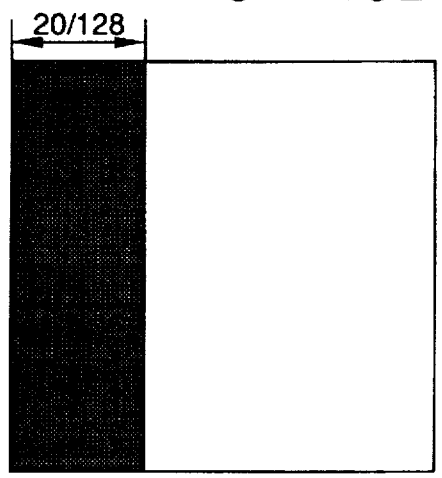
Figure 19E:
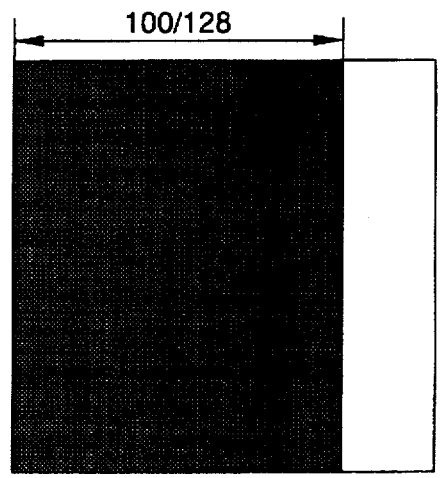
Figure 19C:
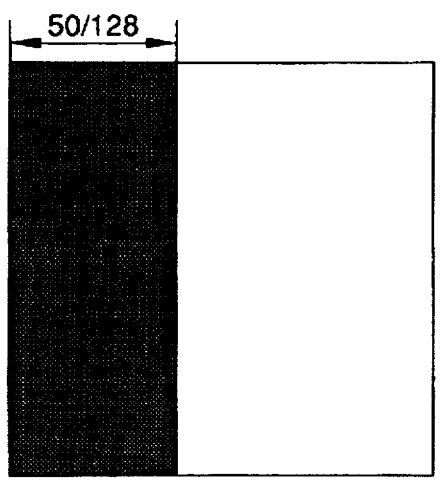
Figure 19F:
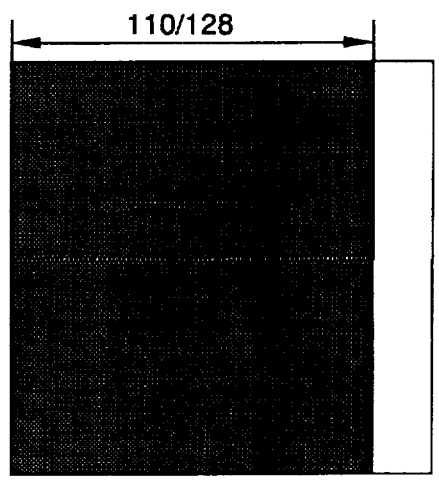
Figure 20:
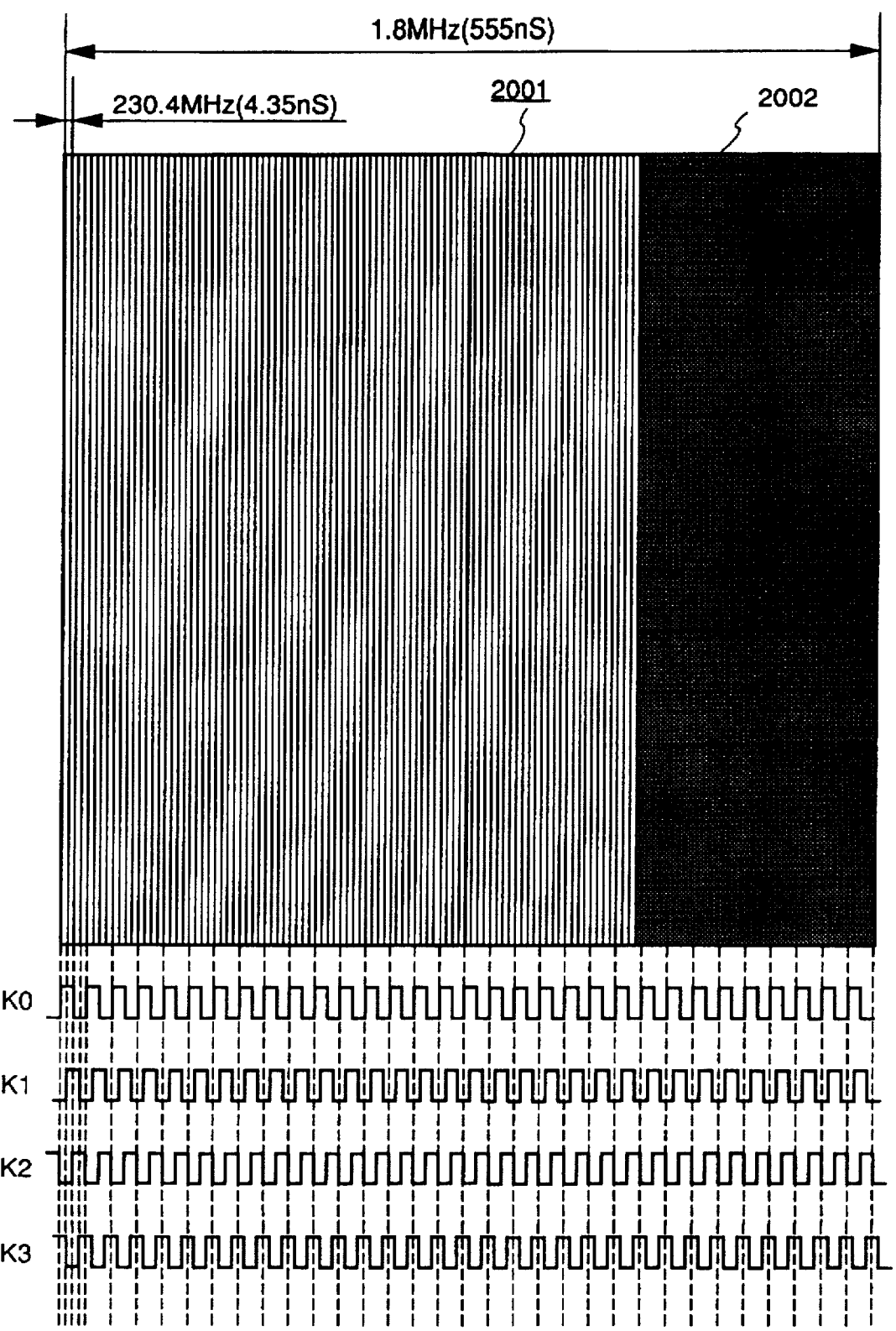
Figure 21A:
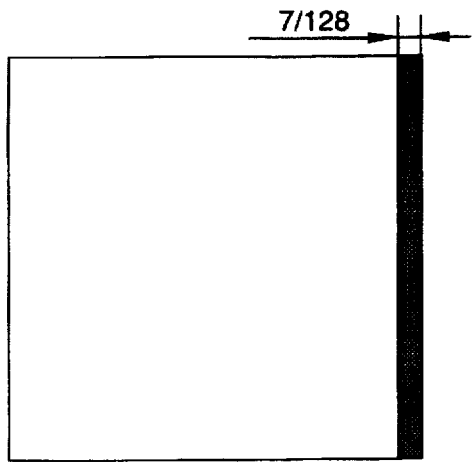
Figure 21D:
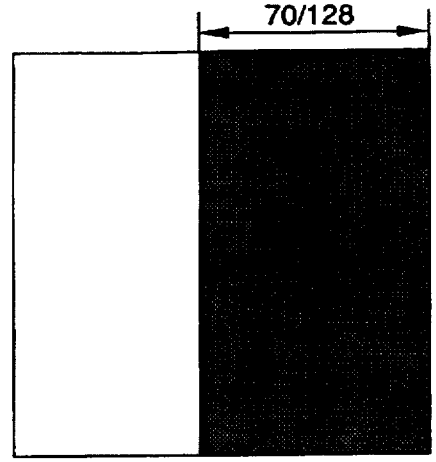
Figure 21B:
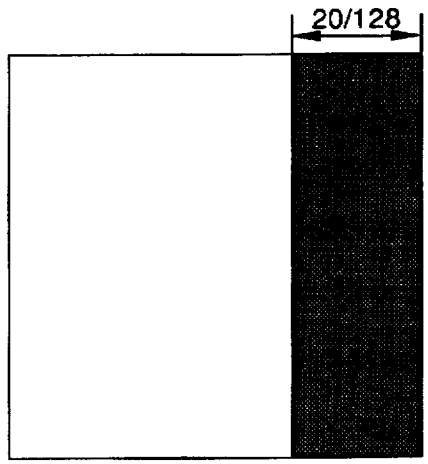
Figure 21E:
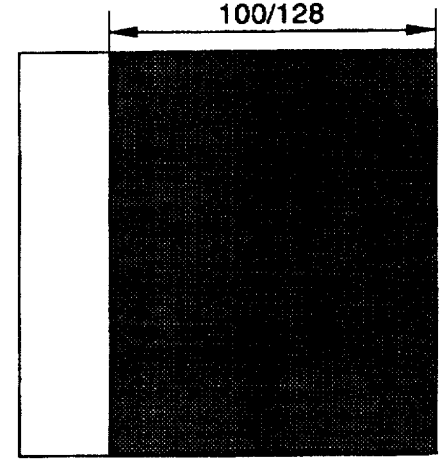
Figure 21C:
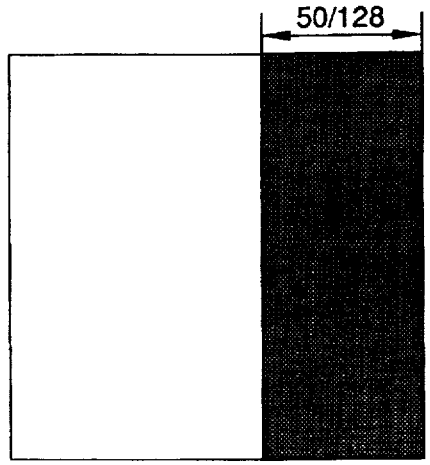
Figure 21F:
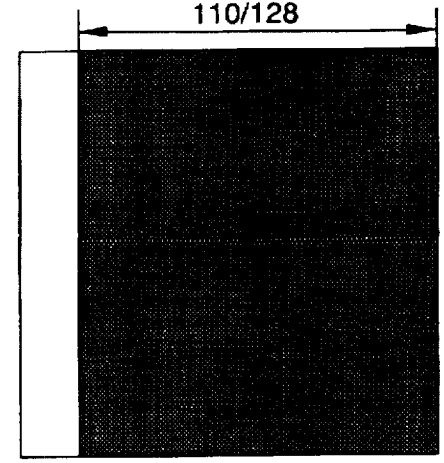

Since the output starting point 1702a and output end point 1702b can thus be designated arbitrarily, a pixel 1802 can be adopted in which the density of a pixel 1801 is made to grow from the left end to the right end, as shown in FIG. 18. By causing the density of one pixel to grow from the left end to the right end, as shown in FIGS. 19A through F, half-tone density can be increased as growth advances from A to F in FIG. 19. Further, a pixel 2002 can be adopted in which the density of a pixel 2001 is made to grow from the right end to the left end, as shown in FIG. 20. By causing the density of one pixel to grow from the right end to the left end, as shown in FIGS. 21A through F, half-tone density can be increased as growth advances from A to F in FIG. 19.

A group of density patterns in which density growth proceeds from the left end to the right end of a pixel, as depicted in FIG. 19, which corresponds to a case where the address terminal A6 is at level "L", are stored in the LUT 26, and a group of density patterns in which density growth proceeds from the right end to the left end of a pixel, as depicted in FIG. 21, which corresponds to a case where the address terminal A6 is at level "H", are stored in the LUT 26.

Figure 22:
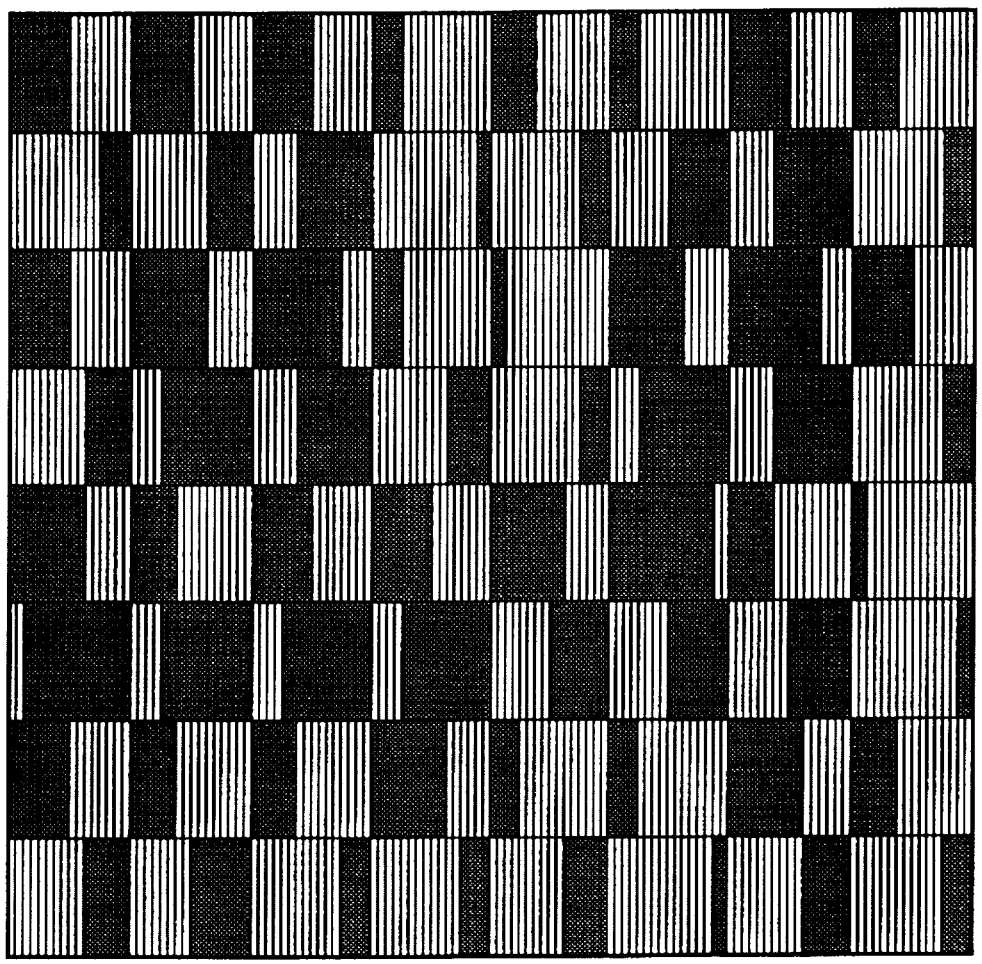
FIG. 22 is a diagram showing an example of the results of outputting a half-tone image according to this embodiment.

More specifically, even if the density level of the image signal is the same, a group of patterns of the kind shown in FIG. 19 and a group of patterns of the kind shown in FIG. 21 can be alternately output so that half-tone image output results shown in FIG. 22 can be obtained.

In the foregoing description and in FIG. 22, it is explained that the pattern groups stored in the LUT 26 are a group of density patterns in which growth proceeds from the left end to the right end of a pixel and a group of density patterns in which growth proceeds from the right end to the left end of a pixel. However, this does not impose a limitation upon the invention. For example, a group of density patterns in which growth proceeds from the left end to the right end of a pixel and a group of density patterns in which growth proceeds leftward and rightward from the center of a pixel may be combined, and a group of density patterns in which growth proceeds from the right end to the left end of a pixel and a group of density patterns in which growth proceeds leftward and rightward from the center of a pixel may be combined.

In the foregoing description and drawings, it is explained that the output starting and end points are designated using the signals SD and RD, each of which is composed of six bits. However, this does not impose a limitation upon the invention. For example, the signals SD and RD can be made eight-bit signals.

Further, if the entire circuit shown in FIG. 7, which includes the circuits of FIGS. 9 and 10, is integrated and constructed as a single chip, signal skew can be reduced and it is possible to raise the accuracy of pulse width. This is useful in terms of improving picture quality.

Thus, in accordance with the present embodiment as described above, pulse-width control of an image signal is carried out by selecting one of a plurality of clocks having different phases and counting the pulses of the selected clock in digital fashion. Accordingly, an image signal having a stable pulse width can be produced, the steps of the pulse width of the image signal can be made finer in comparison with the prior art, and a half-tone image having a high number of tones can be obtained. Furthermore, since the clocks have a frequency at which TTL or CMOS logic is capable of operating, the circuitry can be constructed using inexpensive TTL or CMOS logic in the same manner as in the prior art, and therefore it is easy to integrate the circuitry.

Further, as illustrated in FIG. 22, it is possible to alternately output a group of density patterns in which growth proceeds from the left end to the right end of a pixel and a group of density patterns in which growth proceeds from the right end to the left end of a pixel, a group of density patterns in which growth proceeds from the left end to the right end of a pixel and a group of density patterns in which growth proceeds leftward and rightward from the center of a pixel, or a group of density patterns in which growth proceeds from the right end to the left end of a pixel and a group of density patterns in which growth proceeds leftward and rightward from the center of a pixel. As a result, density growth of half-tone pixels does not take place in a regular or systematic manner, thus making it possible to obtain a high-quality image without conspicuous vertical stripes in the output image.

Second Embodiment

A second embodiment of the invention will now be described. In this embodiment, the recording method according to the present invention is applied to the engine of an LBP having an output density of 600 dpi and an output speed of eight pages/min (in A4 or letter size).

Formation of Half-Tone Image

Figure 23:
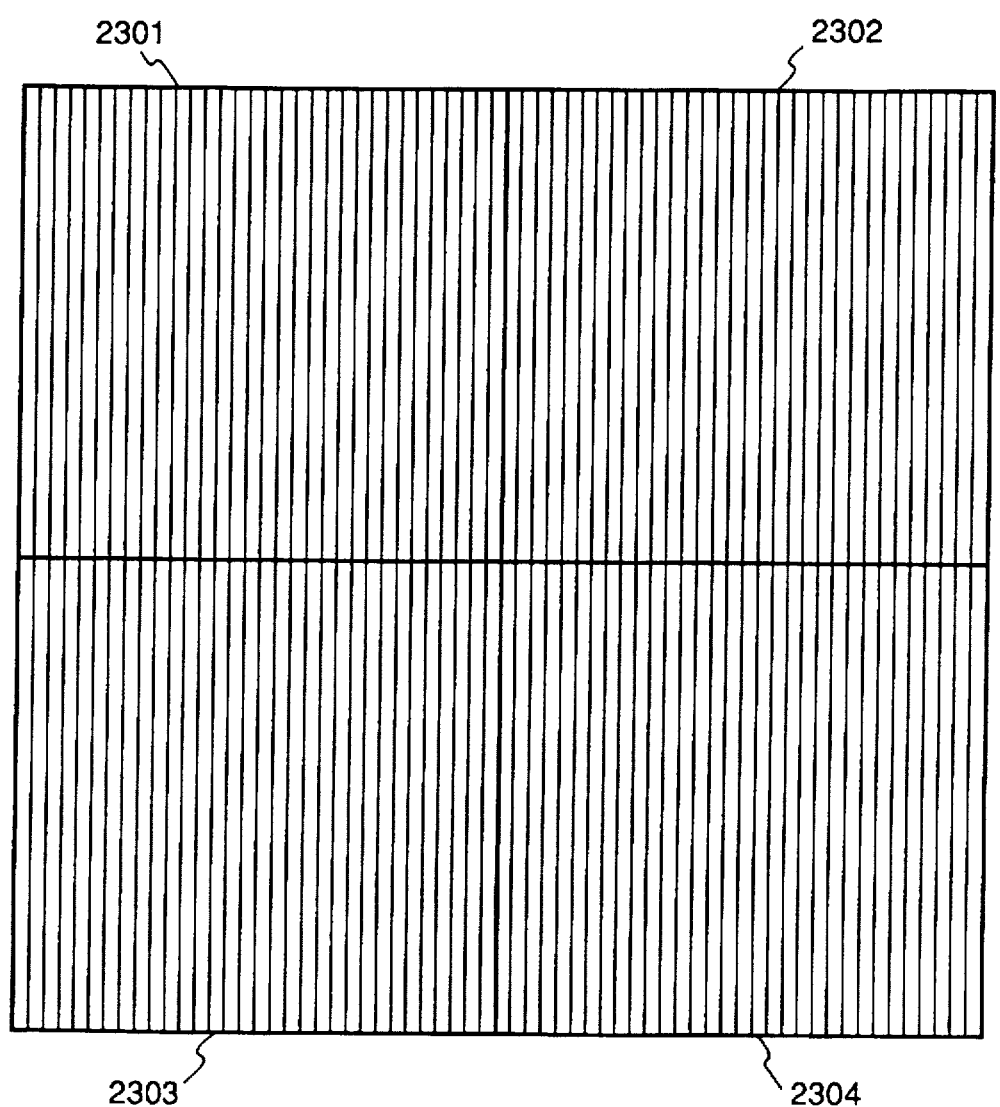
FIG. 23 is a diagram showing the subdivided state of pixels according to a second embodiment of the invention.

FIG. 23 is a diagram showing the subdivided state of a pixel according to the second embodiment of the invention. A total of four pixels 2301~2304, namely two pixels of 600 dpi in each of the main- and sub-scanning directions, is adopted as a unit pixel for half-tone expression, and subdivisions obtained by subdividing each of the pixels 2301~2304 into 32 parts, are provided. A half-tone image of 300 lines and 128 steps is obtained by outputting or not outputting each of the 128 subdivisions of the four-pixel total. Though it is mentioned here that a pixel of 600 dpi is subdivided into 32 parts, this does not impose a limitation upon the embodiment; one pixel can be subdivided any number of subdivisions.

Configuration

Figure 24:
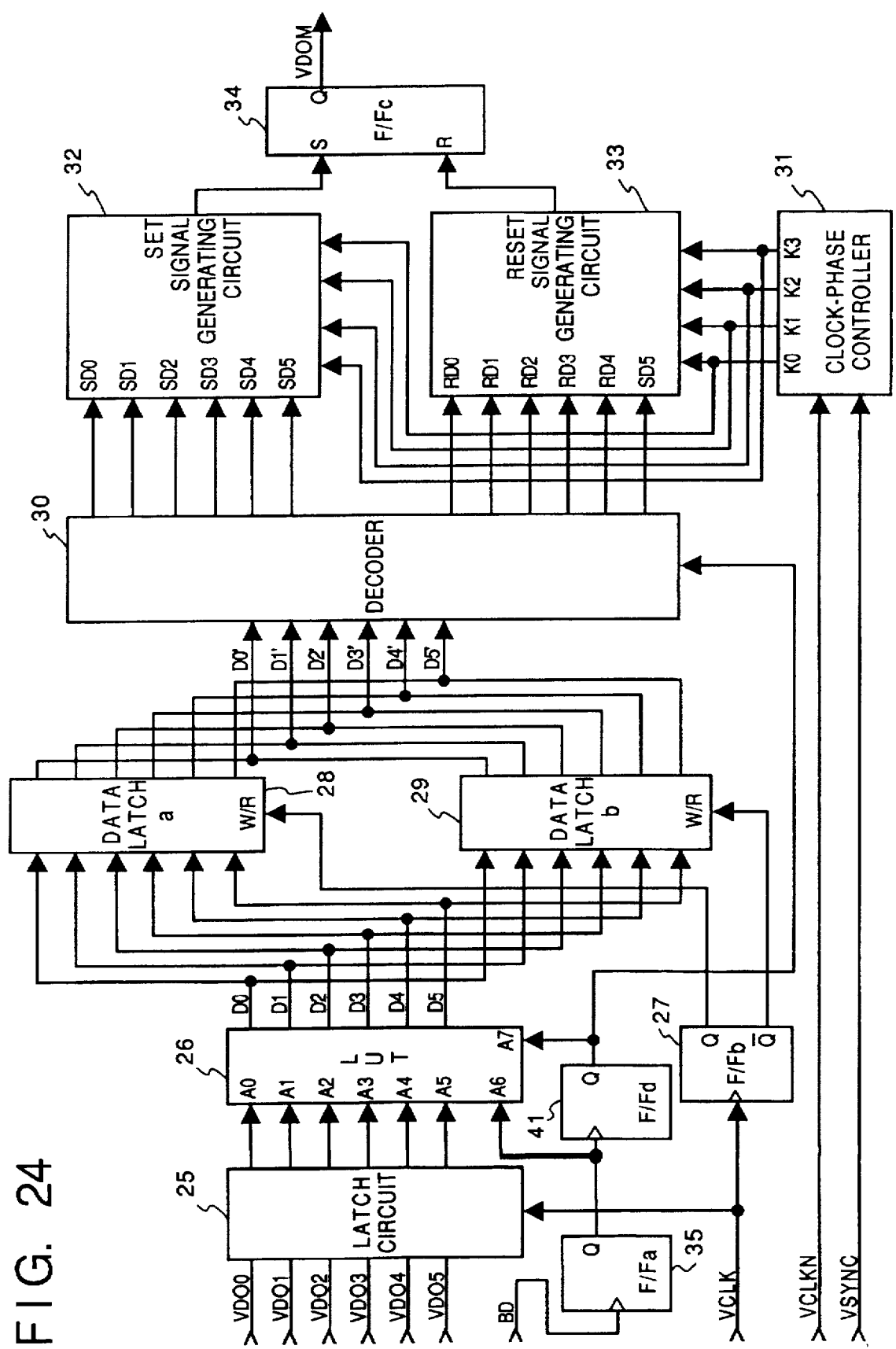
FIG. 24 is a block diagram showing the construction of a VDO signal processor according to the second embodiment.

FIG. 24 is a block diagram showing the construction of the VD0 signal processor 101 according to the second embodiment. Components identical with those in the VD0 signal processor 101 of the first embodiment shown in FIG. 7 are designated by like reference numerals and need not be described again.

The VD0 signal processor 101 of the second embodiment is obtained by additionally providing the VD0 signal processor 101 of the first embodiment with an F/F d41. The F/F d41 frequency-divides, by two, the output of the F/Fa 35, namely the signal obtained by frequency-dividing the signal BD by two. The output of F/Fd 41 is supplied to the address terminal of LUT 26 and to the decoder 30.

Figure 25:
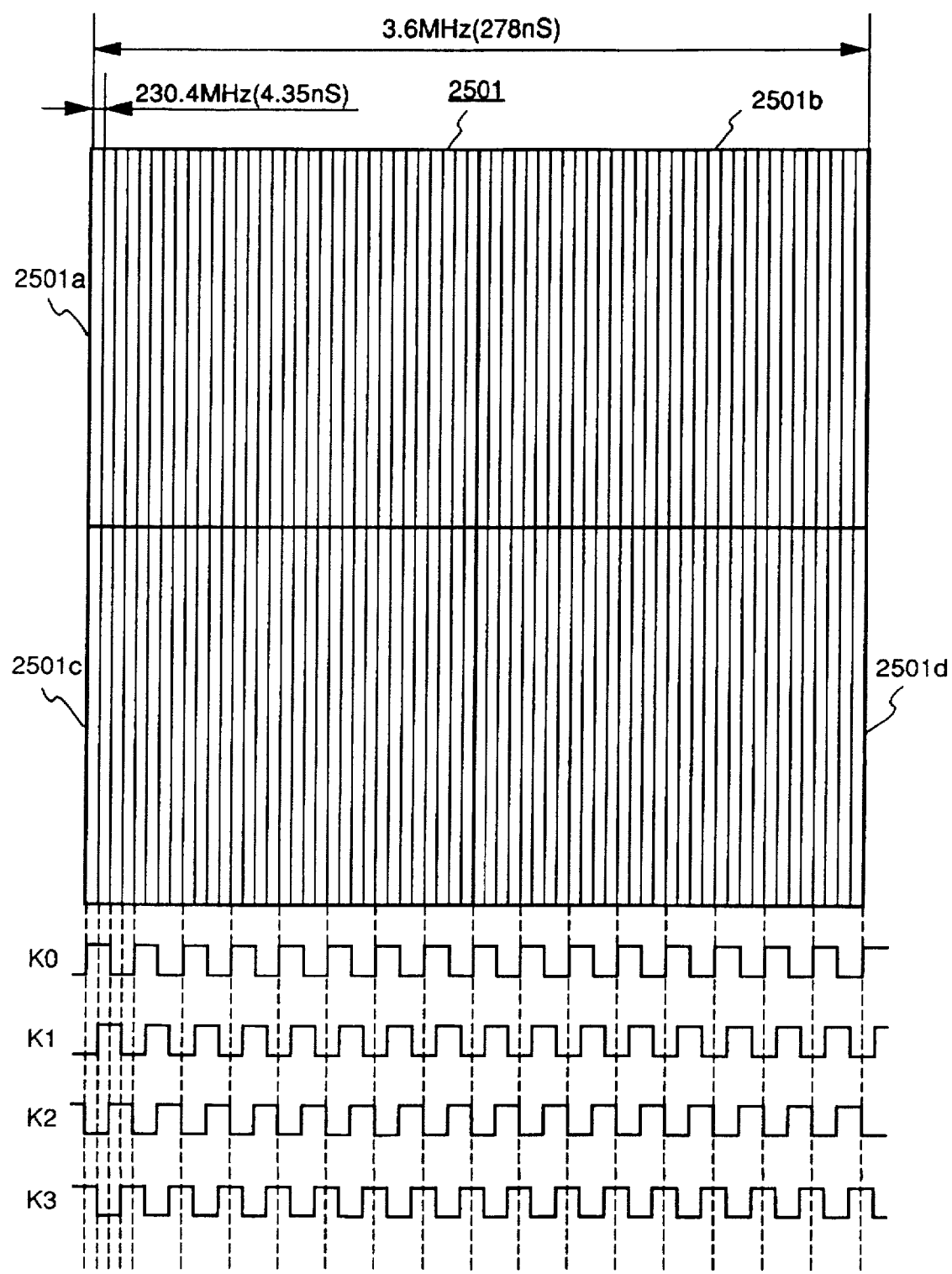
FIG. 25 is a diagram for describing the concept according to which a half-tone image is formed according to the second embodiment.

If its address terminal A7 is "L", the LUT 26 outputs signals representing the density of pixels 2501a, 2501b, which form the upper half of a unit pixel 2501 (FIG. 25) for half-tone expression.

Figure 26:
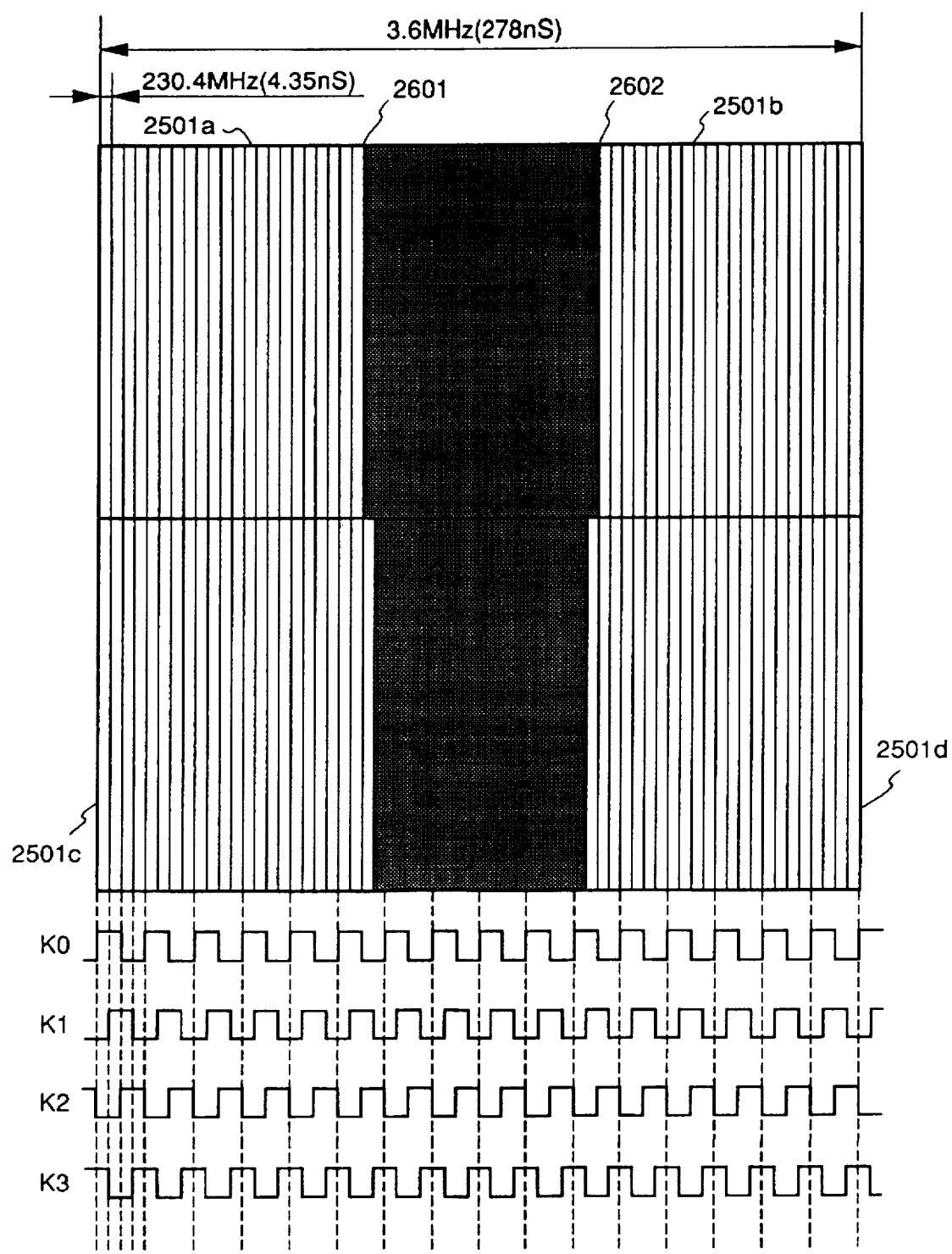
FIGS. 26 through 30 are diagrams showing examples of output pixels according to the second embodiment.

On the basis of the output of LUT 26, the decoder 30 outputs the set signal SD and reset signal RD. As shown in FIG. 26, the set signal SD designates the output starting point 2601 of pixel 2501a, and the reset signal RD designates the output end point 2602 of pixel 2501b.

The set signal generating circuit 32 suitably selects the clocks K0~K3, each successively shifted in phase by 90°, obtained from clock VCLKN having a frequency 16 times that of clock VCLK, which is for a pixel of 300 lines, the period of whereof is twice that of the clock for 600 dpi. The set signal generating circuit 32 counts up the selected clock to the value designated by the set signal SD and then outputs the signal S. Similarly, the reset signal generating circuit 33 suitably selects the clocks K0~K3, counts up the selected clock to the value designated by the reset signal RD and then outputs the signal R.

On the basis of the signal S output by the set signal generating circuit 32 and the signal R output by the reset signal generating circuit 33, the F/Fc 34 outputs a pulse-width controlled image signal VDOM1 corresponding to the pixels 2501a, 2501b.

The engine 100 shown in FIG. 3 outputs an image from the output starting point 2601 to the output end point 2602, shown in FIG. 26, based upon the image signal VDOM1.

If its address terminal A7 is "H", the LUT 26 outputs signals representing the density of pixels 2501c, 2501d, which form the lower half of a unit pixel 2501 (FIG. 25) for half-tone expression.

On the basis of the output of LUT 26, the decoder 30 outputs the set signal SD and reset signal RD. As shown in FIG. 26, the set signal SD designates the output starting point 2603 of pixel 2501c, and the reset signal RD designates the output end point 2604 of pixel 2501d.

The set signal generating circuit 32 suitably selects the clocks K0~K3, counts up the selected clock to the value designated by the set signal SD and then outputs the signal S. Similarly, the reset signal generating circuit 33 suitably selects the clocks K0~K3, counts up the selected clock to the value designated by the reset signal RD and then outputs the signal R.

On the basis of the signal S output by the set signal generating circuit 32 and the signal R output by the reset signal generating circuit 33, the F/Fc 34 outputs a pulse-width controlled image signal VDOM2 corresponding to the pixels 2501c, 2501d.

The engine 100 shown in FIG. 3 outputs an image from the output starting point 2603 to the output end point 2604, shown in FIG. 26, based upon the image signal VDOM2.

Specific Method of Producing Half-Tone Image OutDut The method through which the half-tone image is output will now be described in detail taking the output pixel of FIG. 26 as an example.

The example illustrated in FIG. 26 is one in which the signal SD is "100110" and the signal RD is "110011" with regard to output of the upper half of the 300-line pixel 2501. Accordingly, the set signal generating circuit 32 selects the clock signal K2 and counts six of these clock pulses on the basis of signal SD, and the reset signal generating circuit 33 selects the clock signal K3 and counts three of these clock pulses on the basis of signal RD.

Further, the example illustrated in FIG. 26 is one in which the signal SD is "110110" and the signal RD is "100011" with regard to output of the lower half of the 300-line pixel 2501. Accordingly, the set signal generating circuit 32 selects the clock signal K3 and counts six of these clock pulses on the basis of signal SD, and the reset signal generating circuit 33 selects the clock signal K2 and counts three of these clock pulses on the basis of signal RD.

Thus, the output starting point 2601 and output end point 2602 can be designated arbitrarily.

Figure 27:
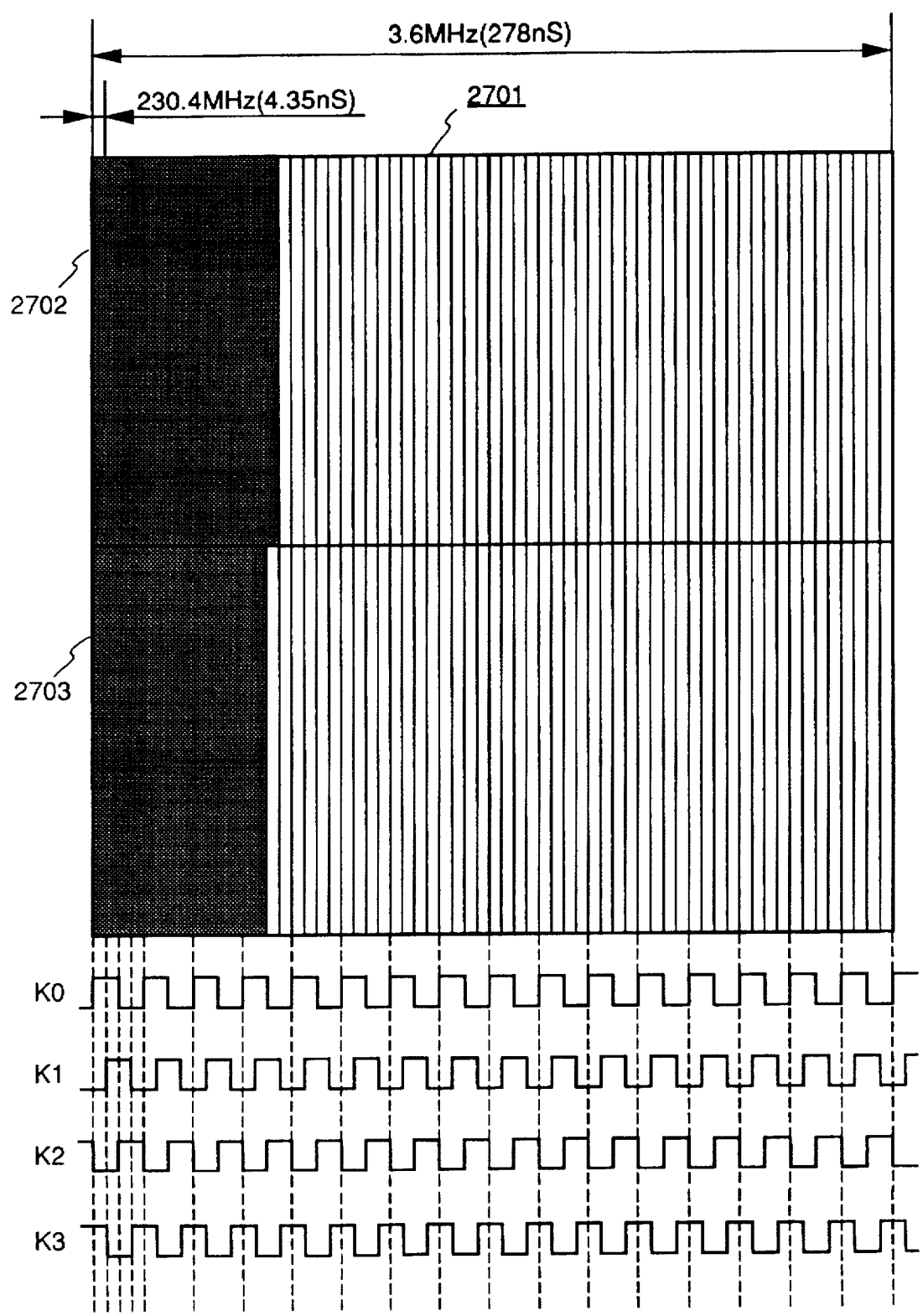
Figure 28A:
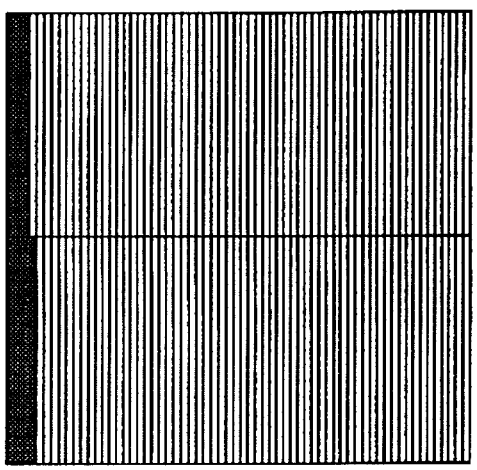
Figure 28D:
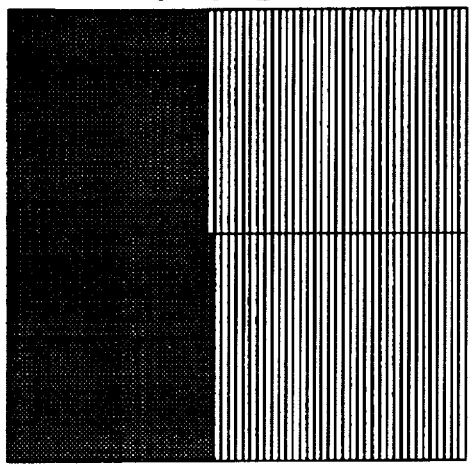
Figure 28B:
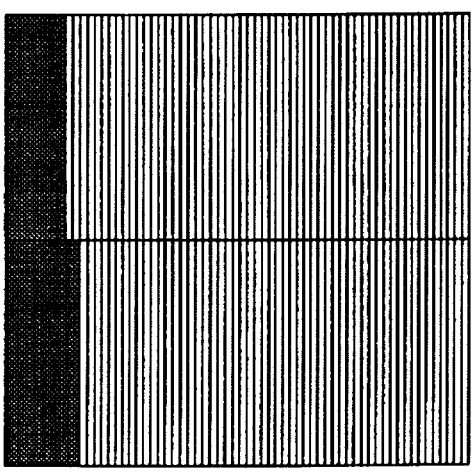
Figure 28E:
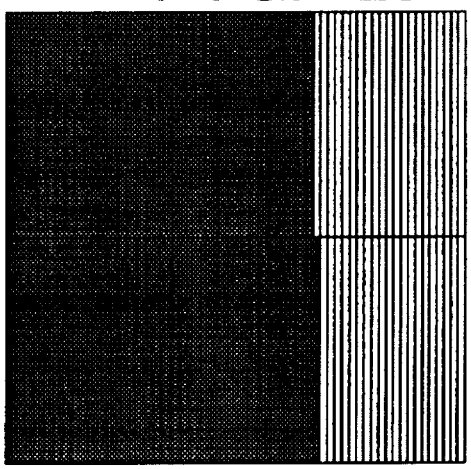
Figure 28C:
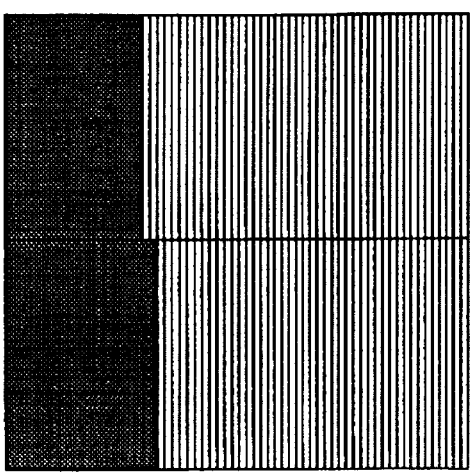
Figure 28F:
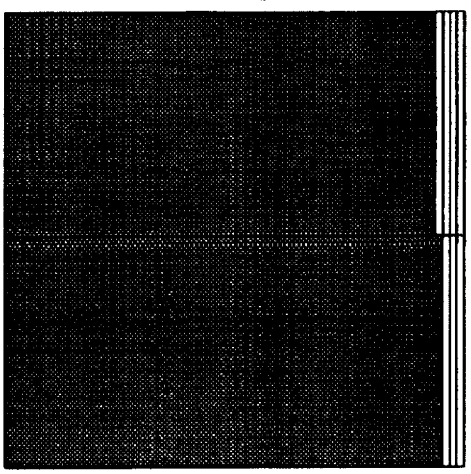

In the foregoing description and FIG. 26, the explanation is based upon an example in which the count regarding the output end point is performed from the center of the unit pixel for half-tone representation. However, this does not impose a limitation upon the invention. For example, as shown in FIG. 27, a pixel 2703 can be adopted in which the density of a unit pixel 2701 is made to grow from the left end to the right end.

Figure 29:
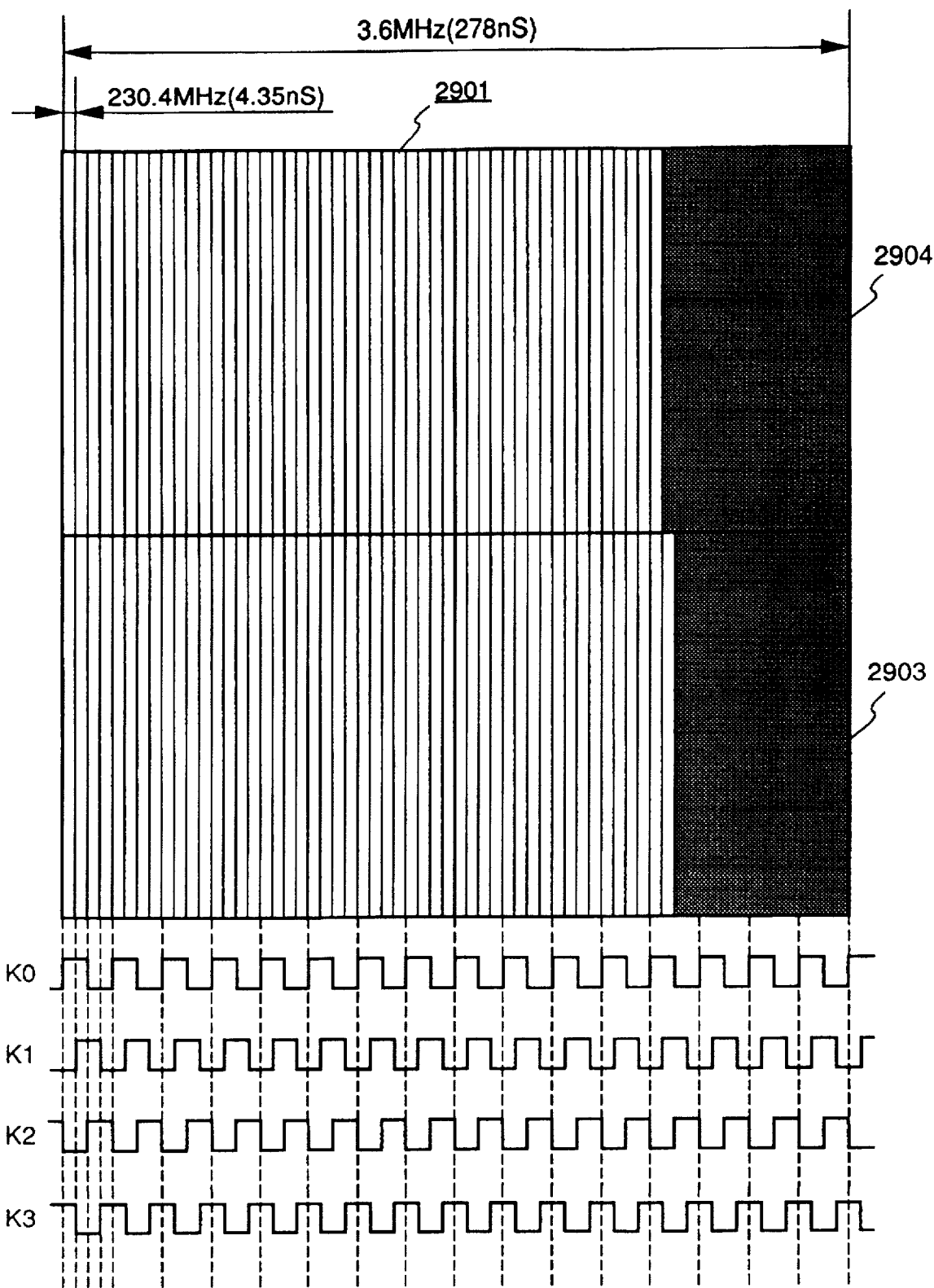
Figure 30A:
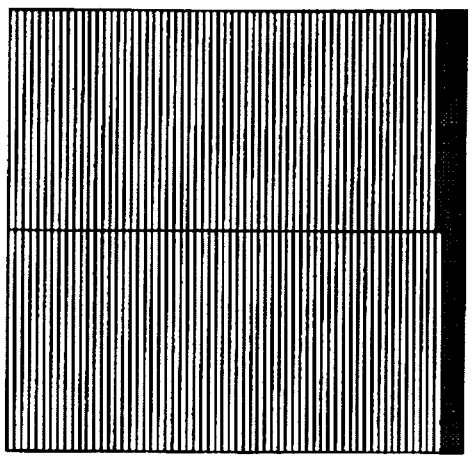
Figure 30D:
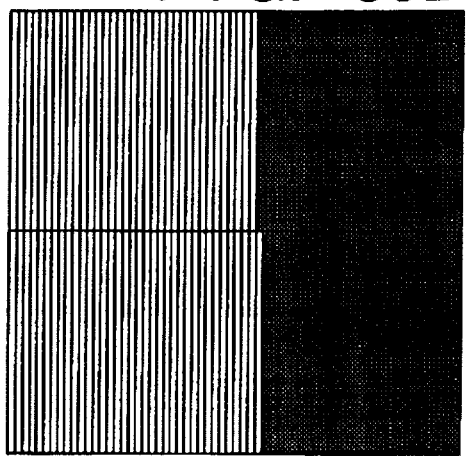
Figure 30B:
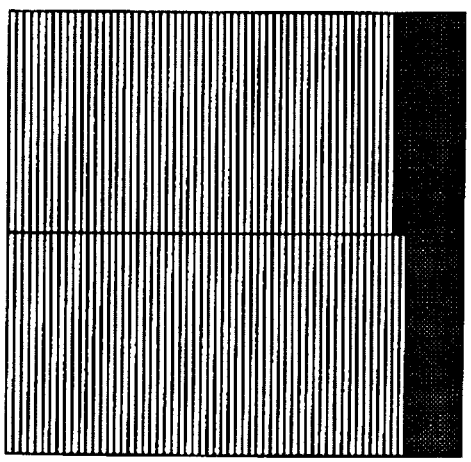
Figure 30E:
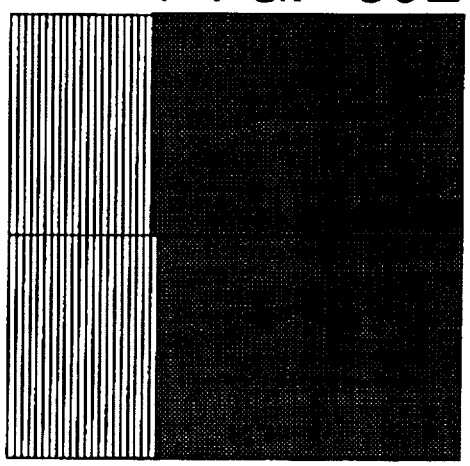
Figure 30C:
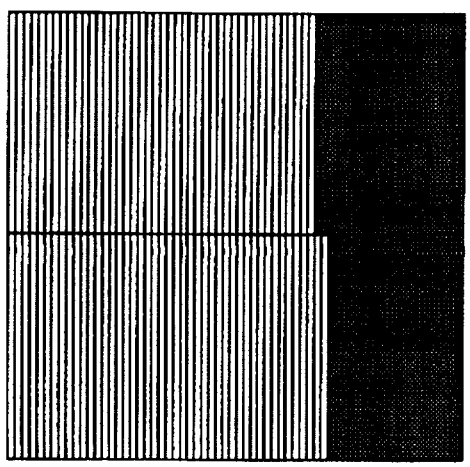
Figure 30F:
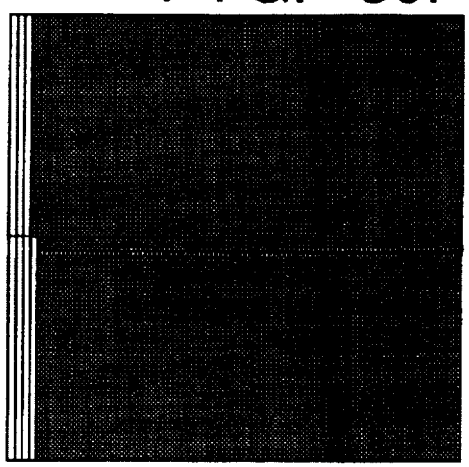

By causing the density of the unit pixel for half-tone representation to grow from the left end to the right end, as shown in FIGS. 28A through F, half-tone density can be increased as growth advances from A to F in FIG. 28. Further, a pixel 2002 can be adopted in which the density of a unit pixel 2901 is made to grow from the right end to the left end, as shown in FIG. 29. By causing the density of the unit pixel for half-tone representation to grow from the right end to the left end, as shown in FIGS. 30A through F, half-tone density can be increased as growth advances from A to F in FIG. 30.

A group of density patterns in which density growth proceeds from the left end to the right end, as shown in FIG. 28, which corresponds to the case where the address terminal A7 is at level "L", and a group of density patterns in which density growth proceeds from the right end to the left end, as shown in FIG. 30, which corresponds to the case where the address terminal A7 is at level "H", are stored in the LUT 26. Even if the density level of the image signal is the same, patterns in which density growth proceeds from the left end to the right end and density patterns in which density growth proceeds from the right end to the left end can be alternately output as shown in FIG. 31, whenever the signal BD enters.

In the foregoing description and drawings, it is explained that the output starting and end points are designated using the signals SD and RD, each of which is composed of six bits. However, this does not impose a limitation upon the invention. For example, the signals SD and RD can be made eight-bit signals.

Further, if the entire circuit shown in FIG. 24 is integrated and constructed as a single chip, signal skew can be reduced and it is possible to raise the accuracy of pulse width. This is useful in terms of improving picture quality.

Figure 32:
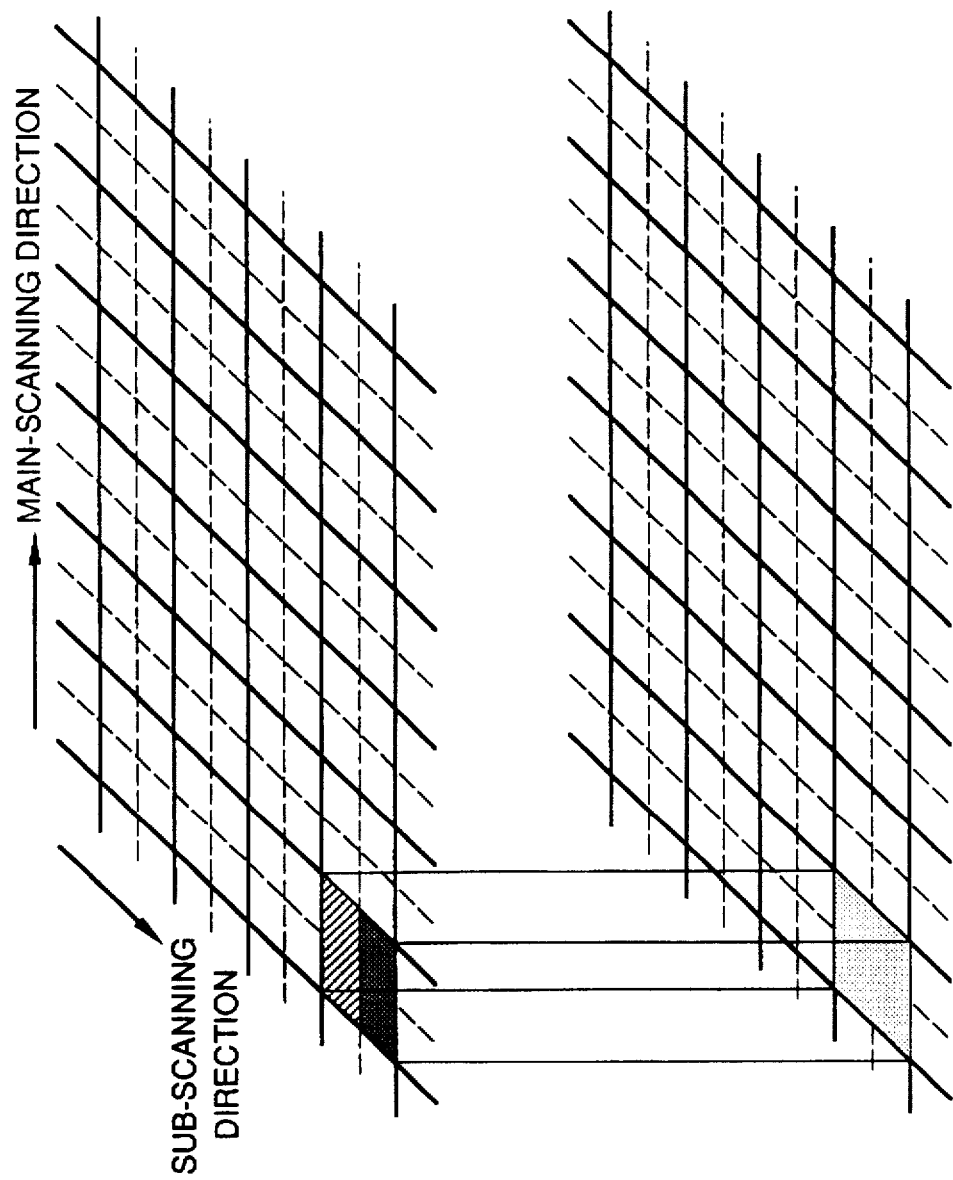
FIG. 32 is a schematic view showing a pair of image patterns stored in a LUT in FIG. 24.

Furthermore, with respect to image data having the same value image pattern that prevails when the address terminal A7 is "L" and image patterns that prevail when the address terminal A7 is "H" are combined and image patterns for which the output starting point 2601 and output end point 2602 as well as the output starting point 2603 and output end point 2604 will be output in pairs are stored in the LUT 26 in advance in such a manner that a half-tone of the 300-line pixel 2501 will be appropriately reproduced. FIG. 32 illustrates this condition in schematic form. In FIG. 32, the areas bounded by the solid lines indicate one pixel of 300 lines (i.e., a unit pixel of half-tone representation), and the areas bounded by the solid lines and dashed lines indicate one pixel of 600 dpi.

Thus, in accordance with the second embodiment as described above, not only are results similar to those of the first embodiment obtained but it is also possible to form a 300-line pixel by outputting the upper half of a 300-line pixel by a first scan and outputting the lower half of the 300-line pixel by a second scan. As a result, as illustrated in FIG. 31, density growth of half-tone pixels does not take place in a regular or systematic manner, thus making it possible to obtain a high-quality image without conspicuous vertical stripes in the output image.

Improvement upon Pitch Irregularity

The effects of the present invention in terms of improving upon pitch irregularity will be described next.

Figure 33:
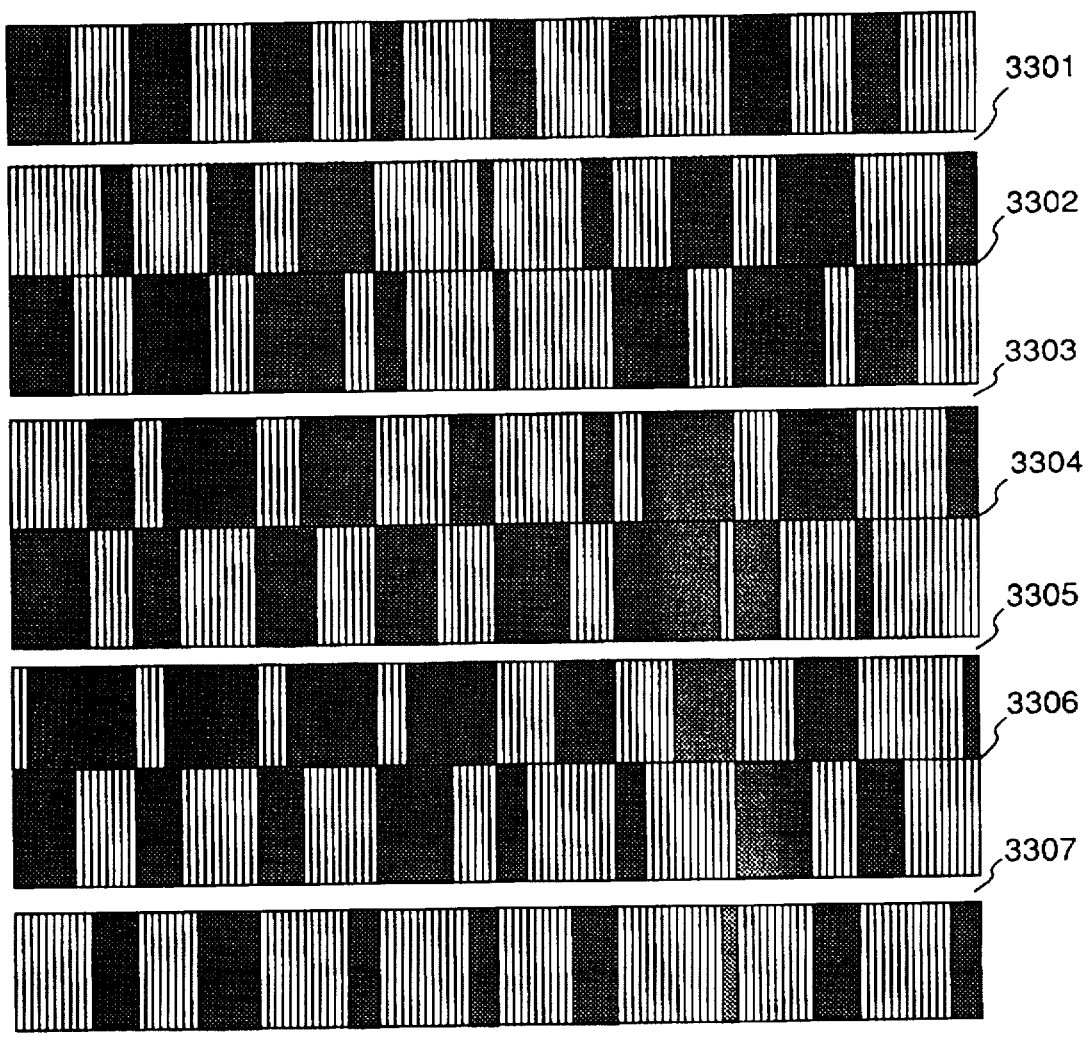
FIG. 33 is a diagram showing an example of pitch irregularity that develops in an output image according to the first embodiment.

As mentioned earlier in this specification, pitch irregularity in the prior art causes horizontal white stripes or lines to appear between scans of the output image, as illustrated in FIGS. 51 through 54. FIG. 33 is a diagram showing an example of pitch irregularity that develops in an output image according to the first embodiment, and FIG. 34 is a diagram showing an example of pitch irregularity that develops in an output image according to the second embodiment.

In FIG. 33, 3301, 3303, 3305, 3307 denote white stripes due to pitch irregularity, and 3302, 3304, 3306 denote portions where upper and lower lines overlap each other due to pitch irregularity. Similarly, in FIG. 34, 3401, 3403, 3405, 3406 denote white stripes due to pitch irregularity, and 3402, 3404, 3407 denote portions where upper and lower lines overlap each other due to pitch irregularity. The intervals between these white stripes and overlapping portions are not constant but widen and narrow irregularly.

Figure 34:
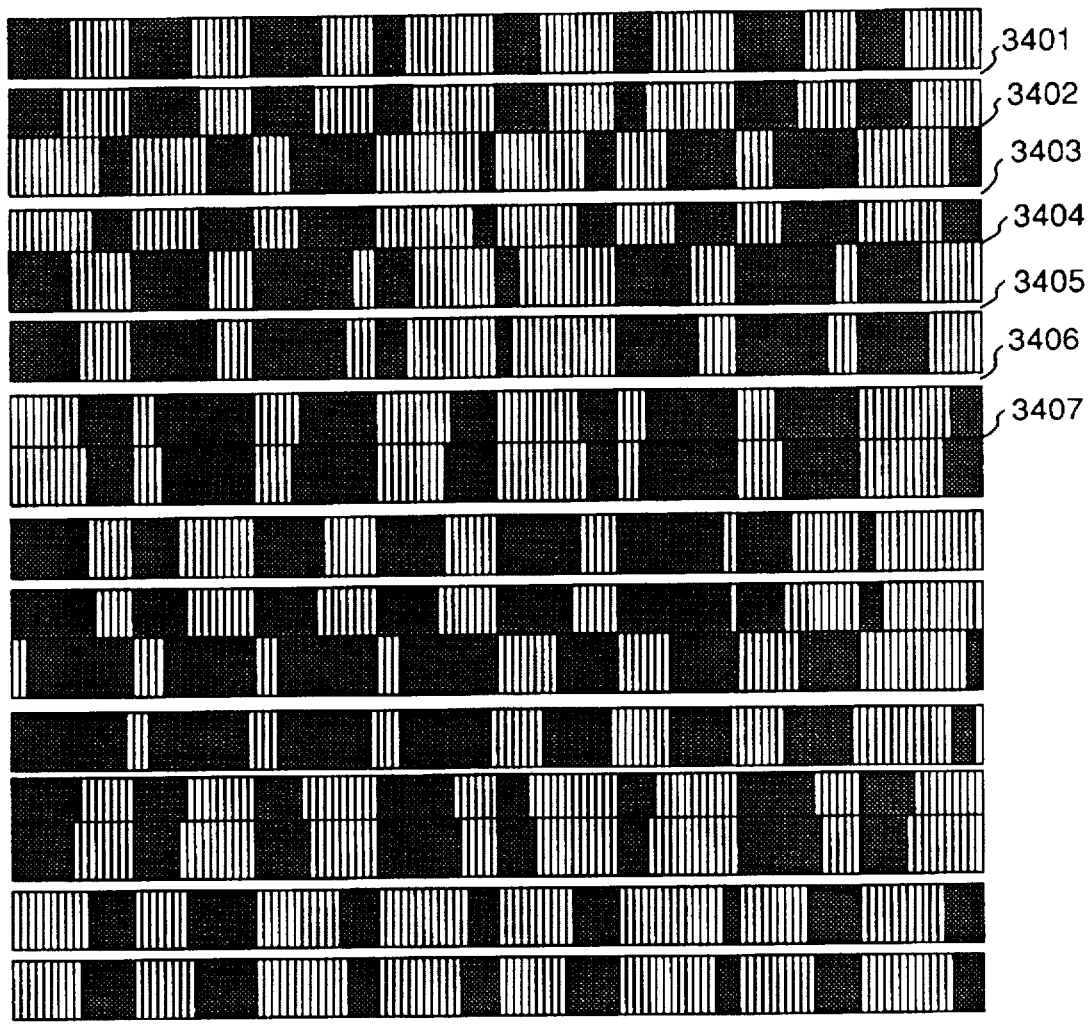
FIG. 34 is a diagram showing an example of pitch irregularity that develops in an output image according to the second embodiment.

If FIGS. 33 and 34 are compared with FIGS. 51 through 54 of the prior art, it will be appreciated that the white stripes in FIGS. 33 and 34 appear less conspicuous. The reason for this is that as a result of the randomness endowed upon the output images themselves according to feature of this invention, an effect that reduces the methodical nature of pitch irregularity is produced.

In both the first and second embodiments described above, the output position of each pixel constituting the image output is intentionally made random, whereas the position is more regular in the prior art. As a result, orderly white stripes or lines caused by pitch irregularity are prevented from becoming conspicuous.

Third Embodiment

In the first and second embodiments, a technique for changing the output position of each pixel is described. Described next will be a method in which output density of each pixel is endowed with randomness, thereby making it possible to improve upon a decline in picture quality owing to pitch irregularity ascribable to the polygon mirror and photosensitive drum.

Configuration

Figure 35:
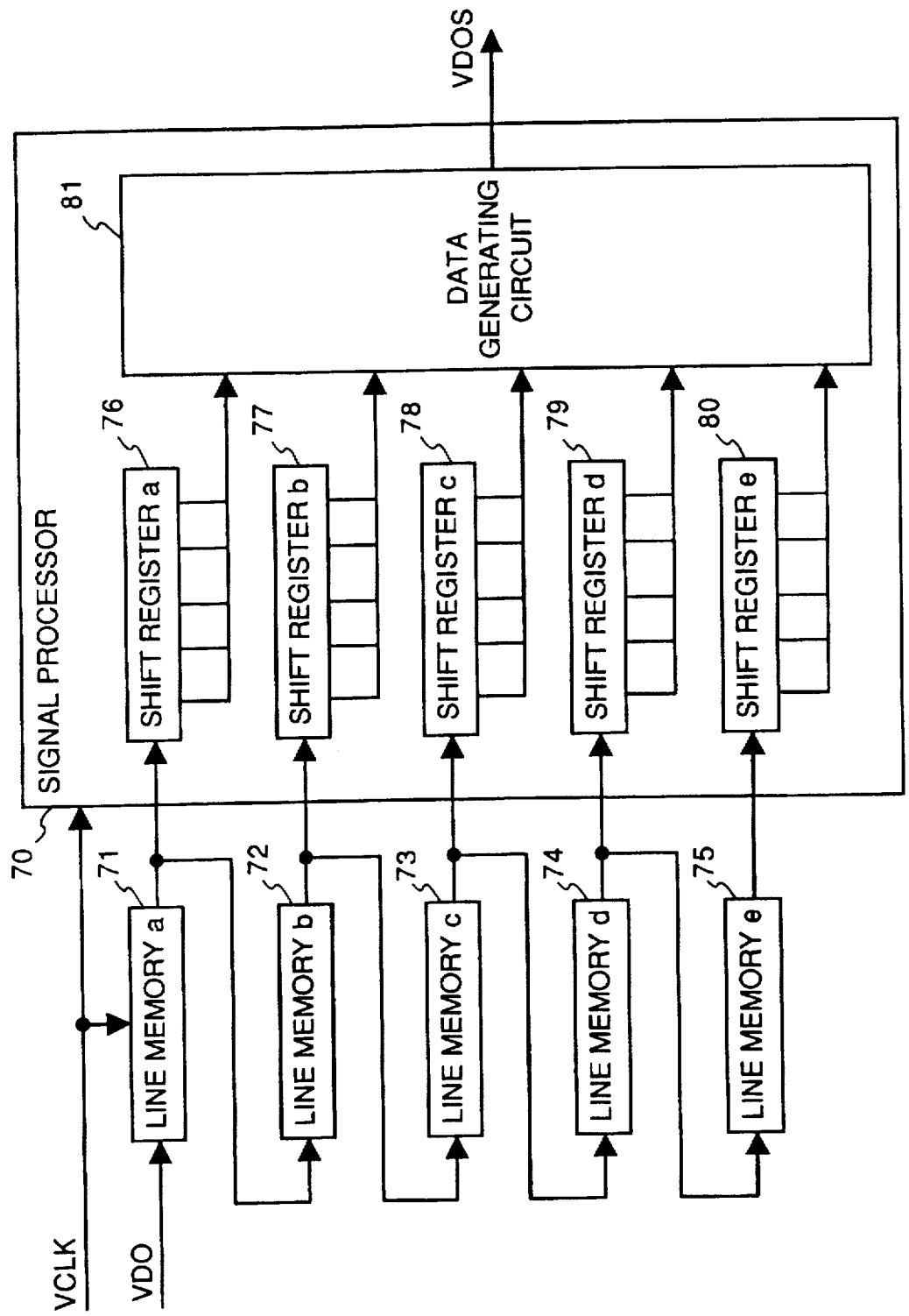
FIG. 35 is a block diagram showing the construction of a circuit that improves upon pitch irregularity in a third embodiment of the present invention.

FIG. 35 is a block diagram showing the construction of a circuit that improves upon pitch irregularity in a third embodiment of the present invention.

In FIG. 35, numeral 70 denotes a signal processor comprising shift registers a through e, namely 76 through 80, and a data generating unit 81. Numerals 71 through 75 denote line memories a through e. Line memory 71 receives the eight-bit parallel image signal VDO as an input from the controller 200, shown in FIG. 3, in synchronism with the clock VCLK. The line memory 71 stores one main-scan of image data and successively transfers the image signal VDO to the line memory 72 and shift register 76.

Similarly, the line memory 72 stores image data input from the line memory 71 and successively transfers the image signal VDO to the line memory 73 and shift register 77. The line memory 73 stores the image data input from the line memory 72 and successively transfers the image signal VDO to the line memory 74 and shift register 78. The line memory 74 stores the image data input from the line memory 73 and successively transfers the image signal VDO to the line memory 75 and shift register 79. The line memory 75 stores the image data input from the line memory 74 and successively transfers the image signal VDO to the shift register 80.

The shift registers 76 through 80 operate as a window register of a total of 25 pixels, namely five pixels in the main-scanning direction and five pixels in the sub-scanning direction. Furthermore, each item of pixel data stored in the shift registers 76~80 has a length of eight bits.

Numeral 81 denotes a data generating circuit, the details of which are described next.

Operation of Data Generating Circuit 81

FIG. 36A is a diagram schematically illustrating each item of pixel data stored in the registers 76~80, and FIG. 36B is a diagram for describing the operation of the data generating circuit 81.

In FIGS. 36A and B, pixel data $1a$~$1e$ is stored in shift register 76; pixel data $2a$~$2e$ in shift register 77; pixel data $3a$~$3e$ in shift register 78; pixel data $4a$~$4e$ in shift register 79; and pixel data $5a$~$5e$ in shift register 80.

The data generating circuit 81 refers to or calculates 25 pixels of data $1a$~$5e$ to form eight-bit pixel data 1A~5E and outputs pixel data 3C of the pixel of interest as an image signal VDOS. The image signal VDOS output by the data generating circuit 81 enters the VDO signal processor 101, shown in FIG. 3, along with the clock VCLK.

The method of forming the image data 1A~5E will now be described. At a certain timing, the data generating circuit 81 decides pixel data 1A so as to satisfy the condition expressed by the following equation, by way of example:

$$(1a + 1b + 1c + 1d + 1e) + (2a + 2b + 2c + 2d + 2e) +$$
$$(3a + 3b + 3c + 3d + 3e) + (4a + 4b + 4c + 4d + 4e) +$$
$$(5a + 5b + 5c + 5d + 5e) = (1A + 1B + 1C + 1D + 1E) +$$
$$(2A + 2B + 2C + 2D + 2E) + (3A + 3B + 3C + 3D + 3E) +$$
$$(4A + 4B + 4C + 4D + 4E) + (5A + 5B + 5C + 5D + 5E).$$

At the next timing instant, the data generating circuit 81 decides pixel data 1B, which is obtained by a one-pixel shift in the main-scanning direction within the window, according to a condition similar to those of pixel data 1A. Pixel data 1C 5E is then decided in a similar manner.

As a result, the data generating circuit 81 converts the pixel data $1a$ to pixel data 1A of $(1a+\alpha)$; the pixel data $1b$ to pixel data 1B of $(1b+\beta)$; the pixel data $1c$ to pixel data 1C of $(1d+\gamma)$; the pixel data $1d$ to pixel data 1D of $(1d+\delta)$; and the pixel data $1e$ to pixel data of 1E $(1e+\epsilon)$.

Similarly, the data generating circuit 81 converts the pixel data $2a$ to pixel data 2A of $(2a+\alpha)$; the pixel data $2b$ to pixel data 2B of $(2b+\eta)$; the pixel data $2c$ to pixel data 2C of $(2d+\Theta)$; the pixel data $2d$ to pixel data 2D of $(2d+\kappa)$; and the pixel data $2e$ to pixel data 2E of $(2e+\lambda)$.

Though the details are omitted, pixel data $3a$~$4e$ is similarly converted to pixel data 3A~4E by the data generating circuit 81.

Similarly, the data generating circuit 81 converts the pixel data $5a$ to pixel data 5A of $(5a+\mu)$; the pixel data $5b$ to pixel data 5B of $(5b+\nu)$; the pixel data $5c$ to pixel data 5C of $(5c+\rho)$; the pixel data $5d$ to pixel data 5D of $(5d+\sigma)$; and the pixel data $5e$ to pixel data 5E of $(5e+\tau)$ In the foregoing, α–τ are constants that are related as follows:

$$\alpha+\beta+\gamma+\delta+\epsilon+\zeta+72 +\Theta+\kappa+\lambda+ \ldots +\mu+\nu+\rho+\sigma+\tau=0$$

or $$\alpha+\beta+\gamma+\delta+\epsilon+\zeta+72 +\Theta+\kappa+\lambda+ \ldots +\mu+\nu+\rho+\sigma+\tau\approx 0$$

Accordingly, through the pixel data 1A 5E is converted to data different from the original pixel data 1a ~5e, the original data is preserved as an image area comprising a plurality of pixels. It should be noted that the total of α~τ may be decided so as to be larger than a predetermined value Ψ (≠0) so that a finer image can be output. Further, the data conversion based upon the data generating circuit 81 may be performed by a look-up table using a ROM or RAM, etc., or by computation using a CPU or the like. Moreover, though the center pixel in the window of FIG. 36B is described as being the pixel of interest, this does not impose a limitation upon the invention and any pixel contained in the same area can be adopted as the pixel of interest.

Window Size

Figure 37:
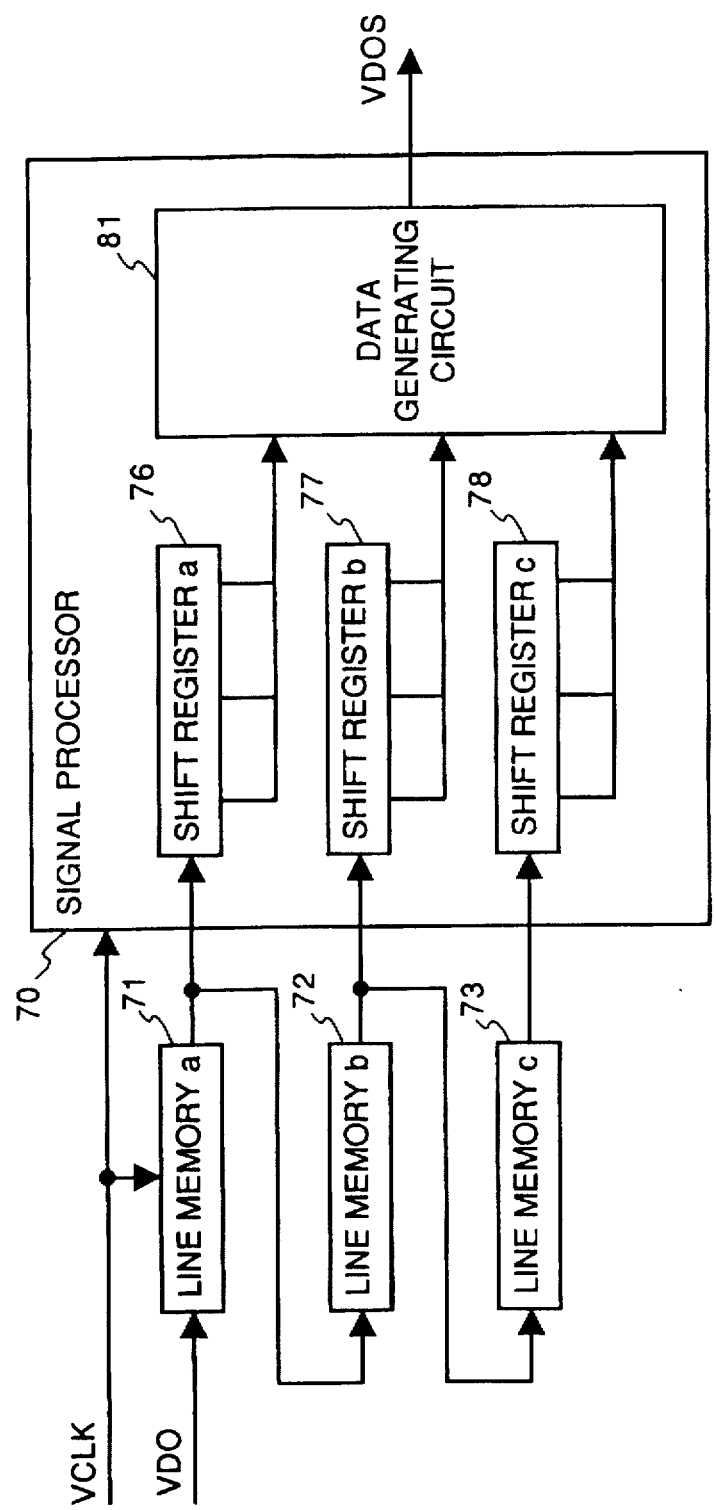
FIG. 37 is a block diagram showing another construction of a circuit that improves upon pitch irregularity in the third embodiment.

The window area according to this invention is not limited to the aforementioned 5×5 pixels. For example, a window area of 3×3 pixels shown in FIG. 38 can be adopted using a circuit for improving upon pitch irregularity of the kind shown in FIG. 37, and even windows areas of 1×2 pixels, 2×1 pixels, 2×2 pixels, 2×3 pixels, 3×2 pixels, 4×4 pixels, 4×5 pixels, 6×6 pixels, 8×8 pixels, 9×9 pixels, etc., are within the scope of the invention.

When the window area is reduced in size, a decline in resolution is suppressed but the effects of the improvement upon pitch irregularity diminish. Accordingly, if the size of the window area is changed or the logic of the conversion algorithm is altered in conformity with the magnitude of pitch irregularity in the engine 100 shown in FIG. 3, finer images having a higher picture quality can be obtained with the engine 100. In a case where the resolution of the engine 100 is changed over by a command from the controller 200 shown in FIG. 3, finer images having a higher picture quality can be obtained by changing to the optimum window area and conversion algorithm in conformity with each of the 240 dpi, 300 dpi and 600 dpi modes. Further, an arrangement may be adopted in which a plurality of window areas and a plurality of conversion algorithms are prepared in advance and the user freely selects the window area and conversion algorithm in dependence upon the output image. The present embodiment may be so adapted that the selection is made in conformity with a change in the environment, such as a change in temperature.

Improvement upon Pitch Irregularity

Figure 39:
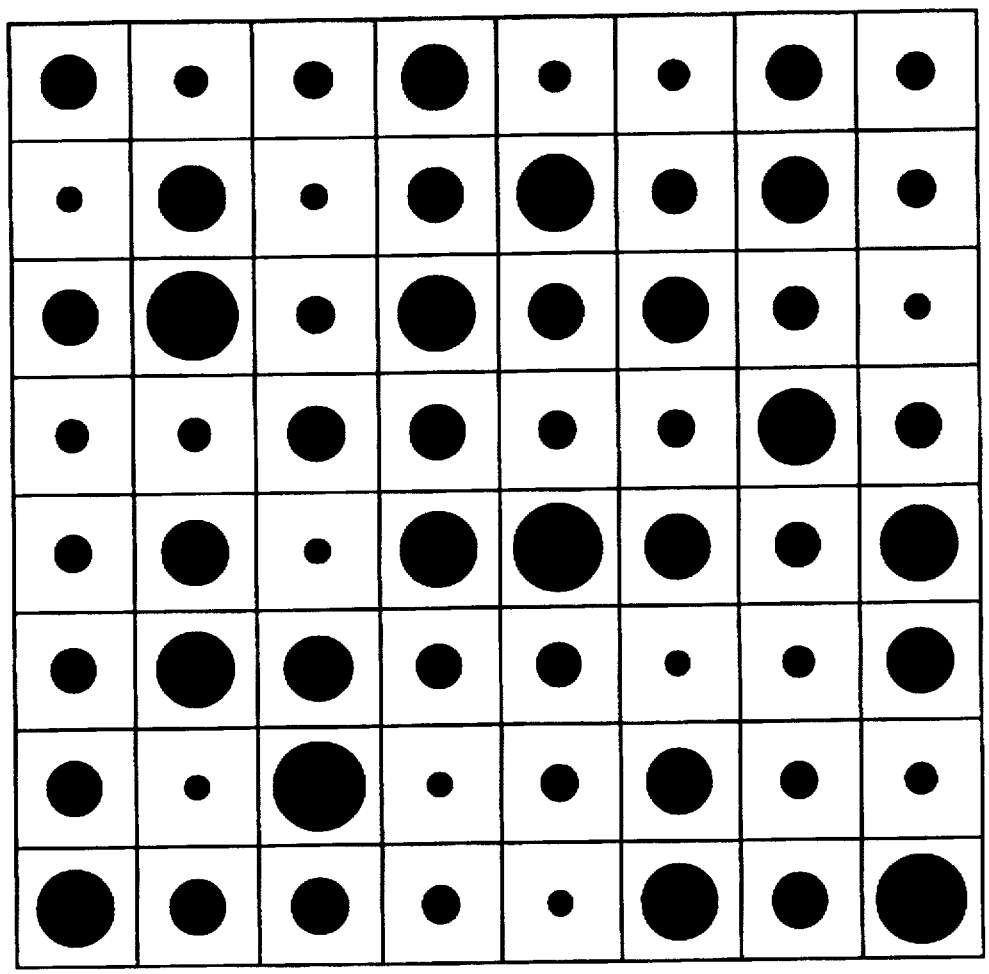
FIG. 39 is a schematic view illustrating an example (300 dpi) of image output according to the third embodiment.
Figure 40:
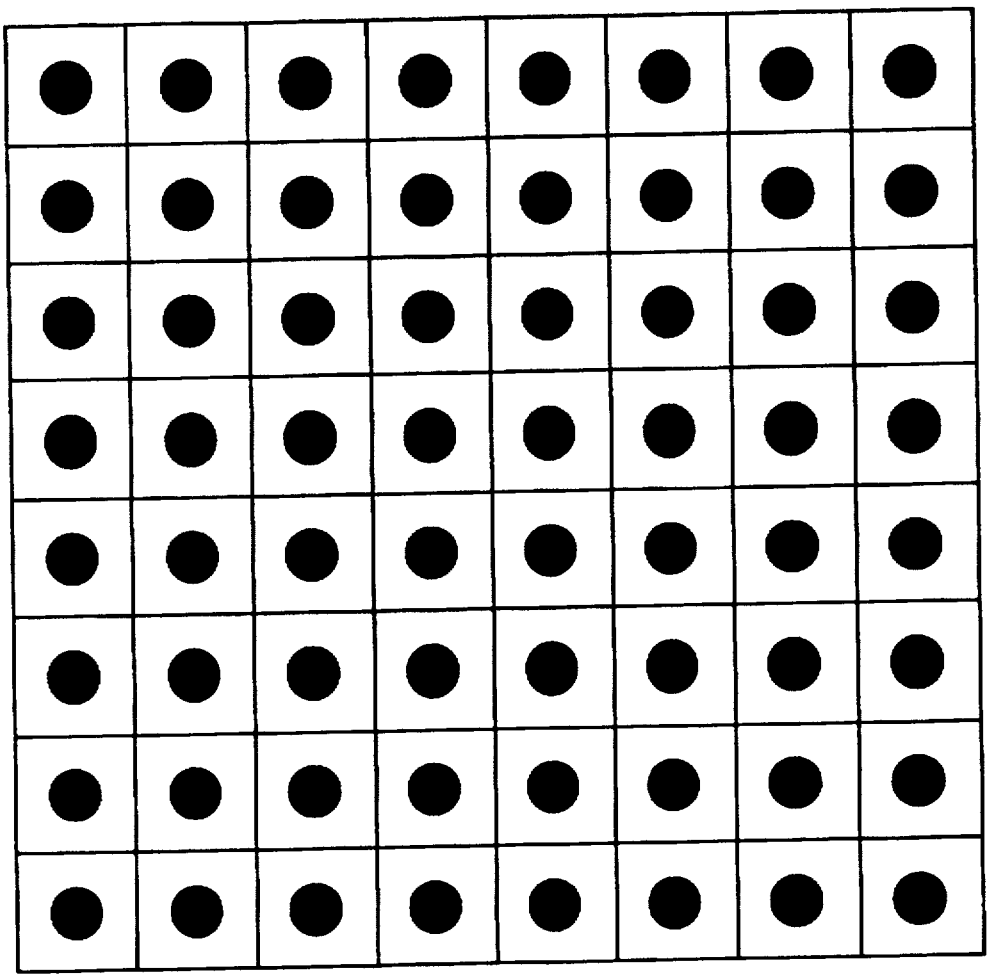
FIG. 40 is a schematic view illustrating an example (300 dpi) of image output according to the prior art.

FIG. 39 is a schematic view illustrating an example of image output according to the third embodiment, and FIG. 40 is a schematic view illustrating an example of image output according to the prior art. FIGS. 39 and 40 are for a case in which a 300-line half-tone image of uniform density is output by 300 dpi engine. The examples of the output images in both FIGS. 39 and 40 are for a case in which there is no pitch irregularity. In the image output of this embodiment, as shown in FIG. 39, the density of each pixel is endowed with randomness and the original density is preserved in terms of the image area.

Figure 41:
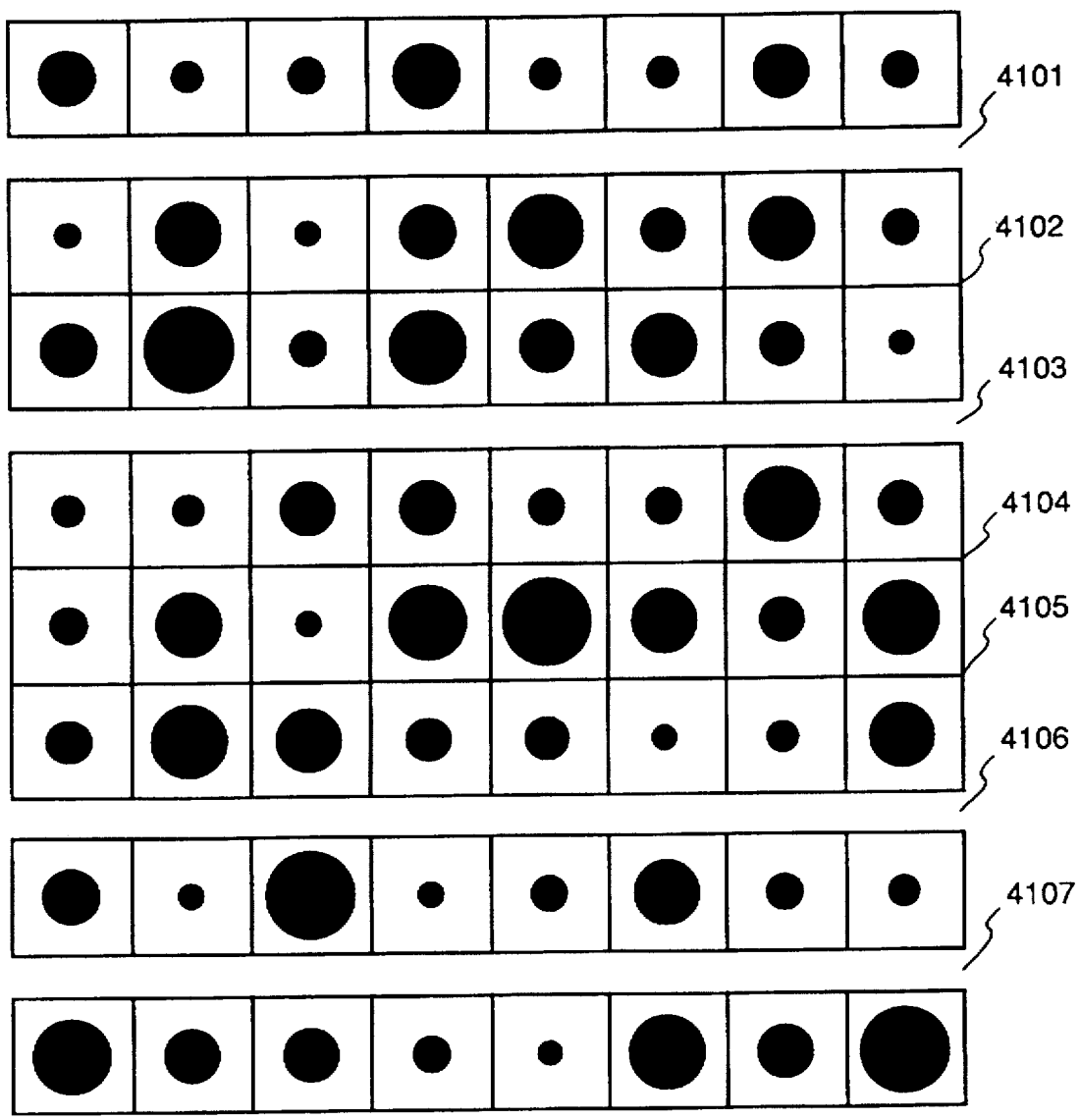
FIG. 41 is a schematic view illustrating an example of a case in which pitch irregularity develops in an output image (300 dpi) according to the third embodiment.
Figure 42:
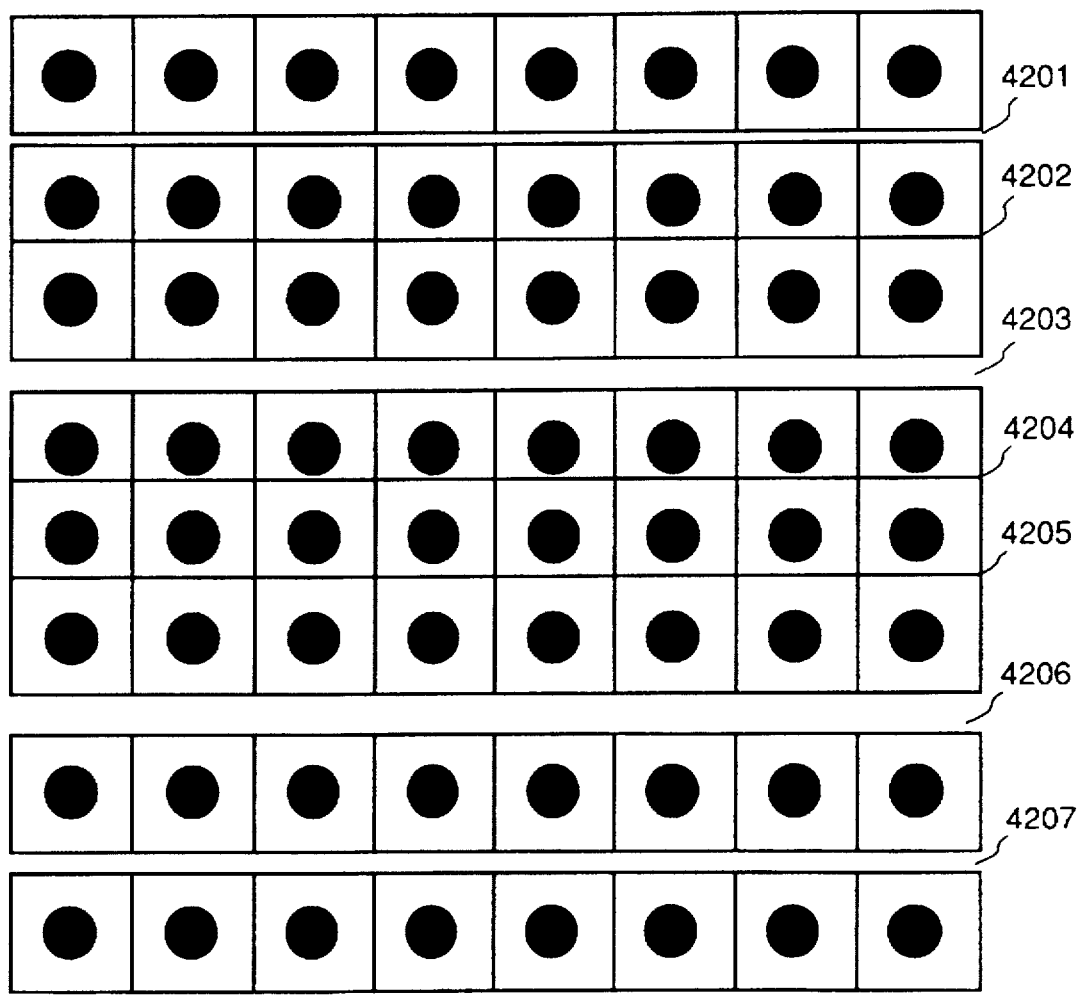
FIG. 42 is a schematic view illustrating an example of a case in which pitch irregularity develops in an output image (300 dpi) according to the prior art.

FIG. 41 is a schematic view of image output according to the third embodiment, and FIG. 42 is a schematic view of image output according to the prior art. The examples of the output images in both FIGS. 41 and 42 are for a case in which pitch irregularity has occurred.

In FIG. 41, reference numerals 4101, 4103, 4106, 4107 denote white stripes due to pitch irregularity, and 4102, 4104, 4105 denote portions where upper and lower lines overlap each other due to pitch irregularity. Similarly, in FIG. 42, reference numerals 4201, 4203, 4206, 4207 denote white stripes due to pitch irregularity, and 4202, 4204, 4205 denote portions where upper and lower lines overlap each other due to pitch irregularity. The intervals between these white stripes and overlapping portions are not constant but widen and narrow irregularly.

If FIG. 41 of this embodiment and FIG. 42 of the prior art are compared, it will be appreciated that the white stripes in FIG. 41 are less noticeable. The reason for this is that the white stripes in the main-scanning direction resulting from pitch irregularity in the output image according to this embodiment are less conspicuous than in the output image according to the prior art.

Figure 43:
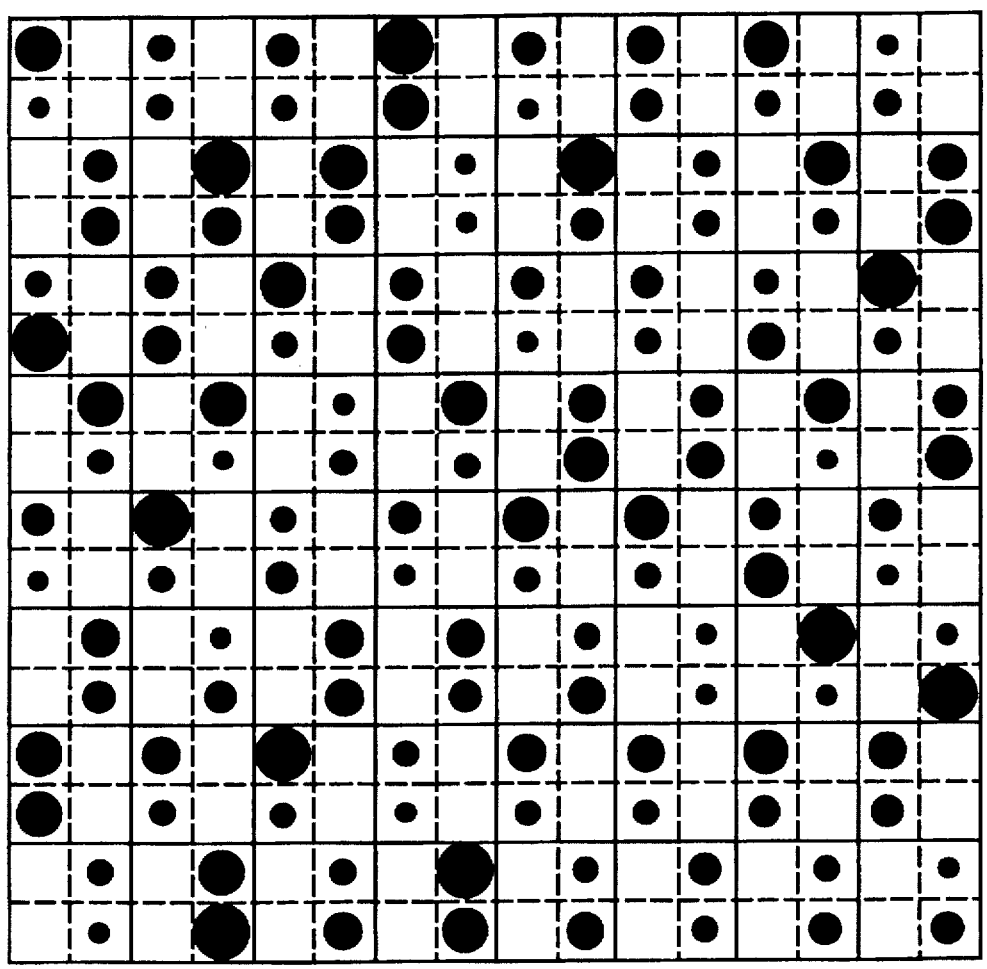
FIG. 43 is a schematic view illustrating an example of image output (600 dpi) according to the third embodiment.
Figure 44:
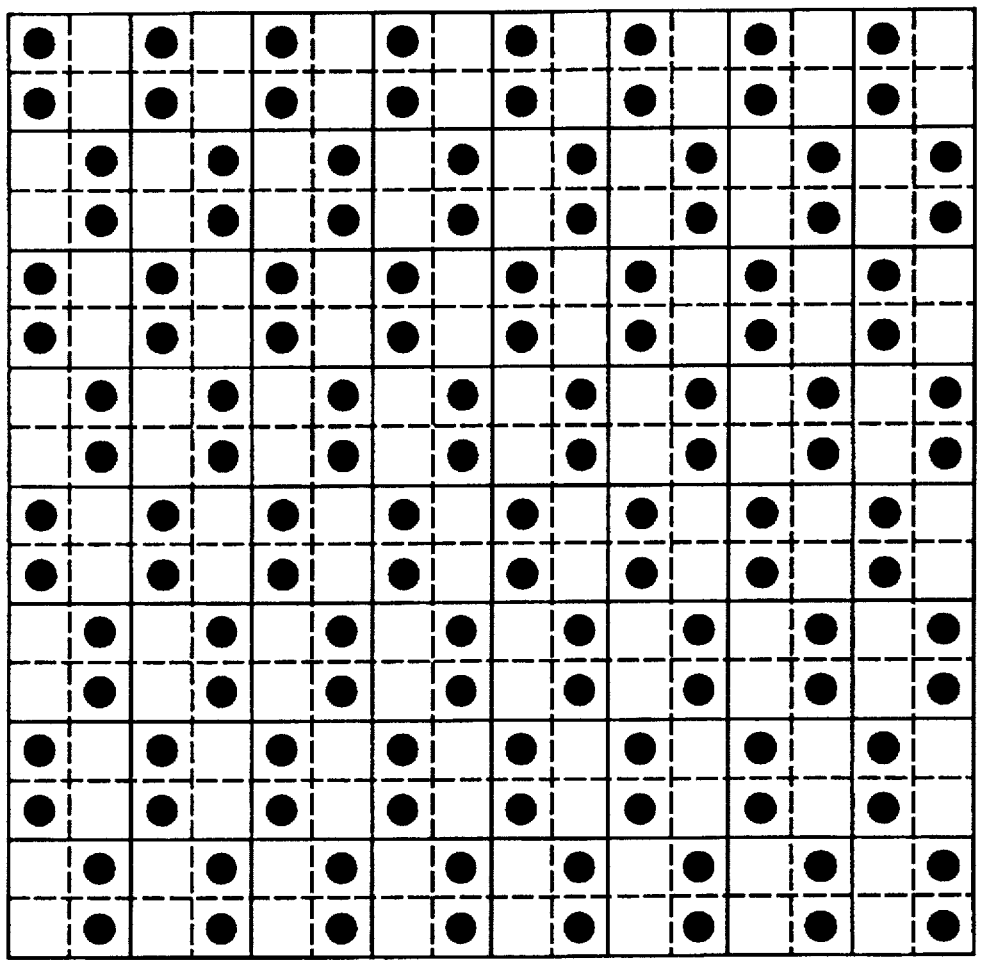
FIG. 44 is a schematic view illustrating an example of image output (600 dpi) according to the prior art.

FIG. 43 is a schematic view illustrating an example of image output according to the third embodiment, and FIG. 44 is a schematic view illustrating an example of image output according to the prior art. FIGS. 43 and 44 are for a case in which a 300-line half-tone image of uniform density is output by 600 dpi engine. The examples of the output images in both FIGS. 43 and 44 are for a case in which there is no pitch irregularity. In the image output of this embodiment, as shown in FIG. 43, the density of each pixel is endowed with randomness and the original density is preserved in terms of the image area.

Figure 45:
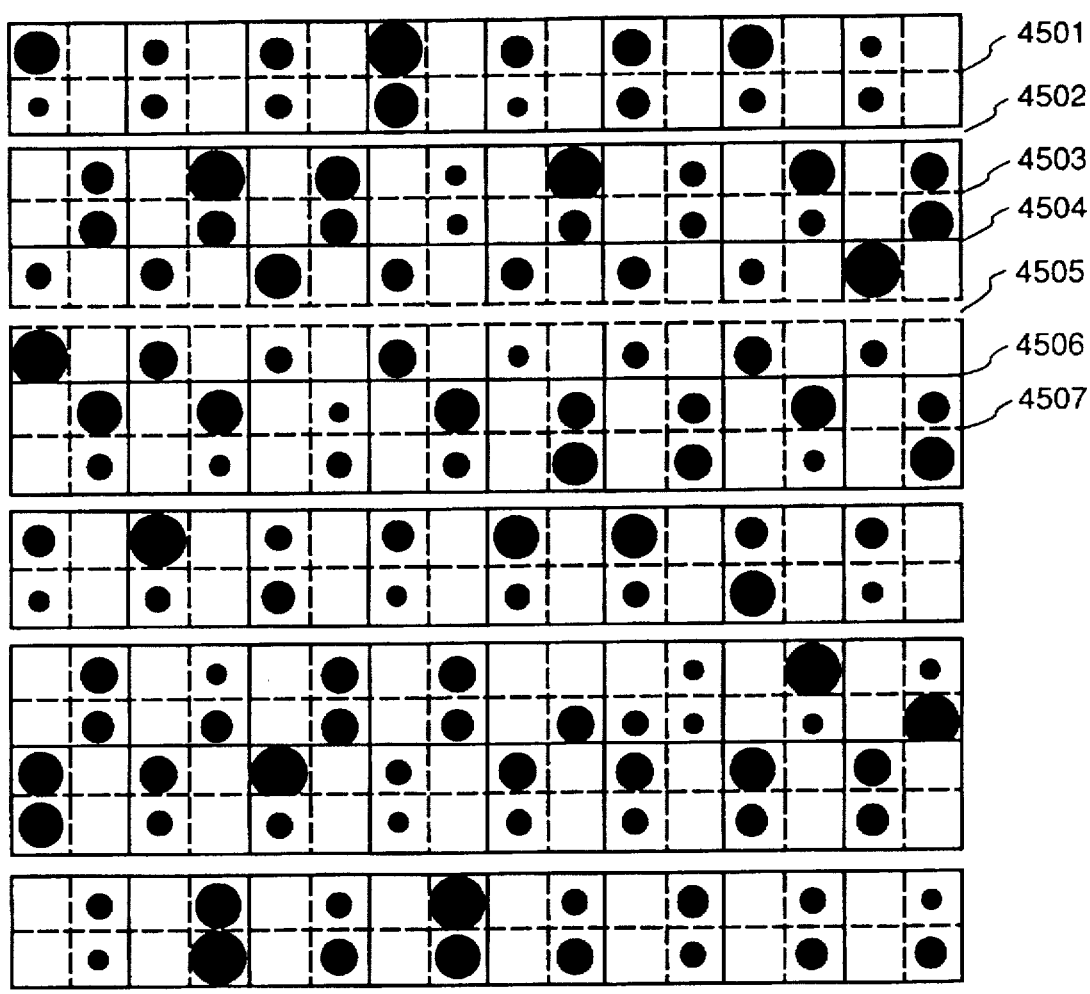
FIG. 45 is a schematic view illustrating an example of a case in which pitch irregularity develops in an output image (600 dpi) according to the third embodiment.
Figure 46:
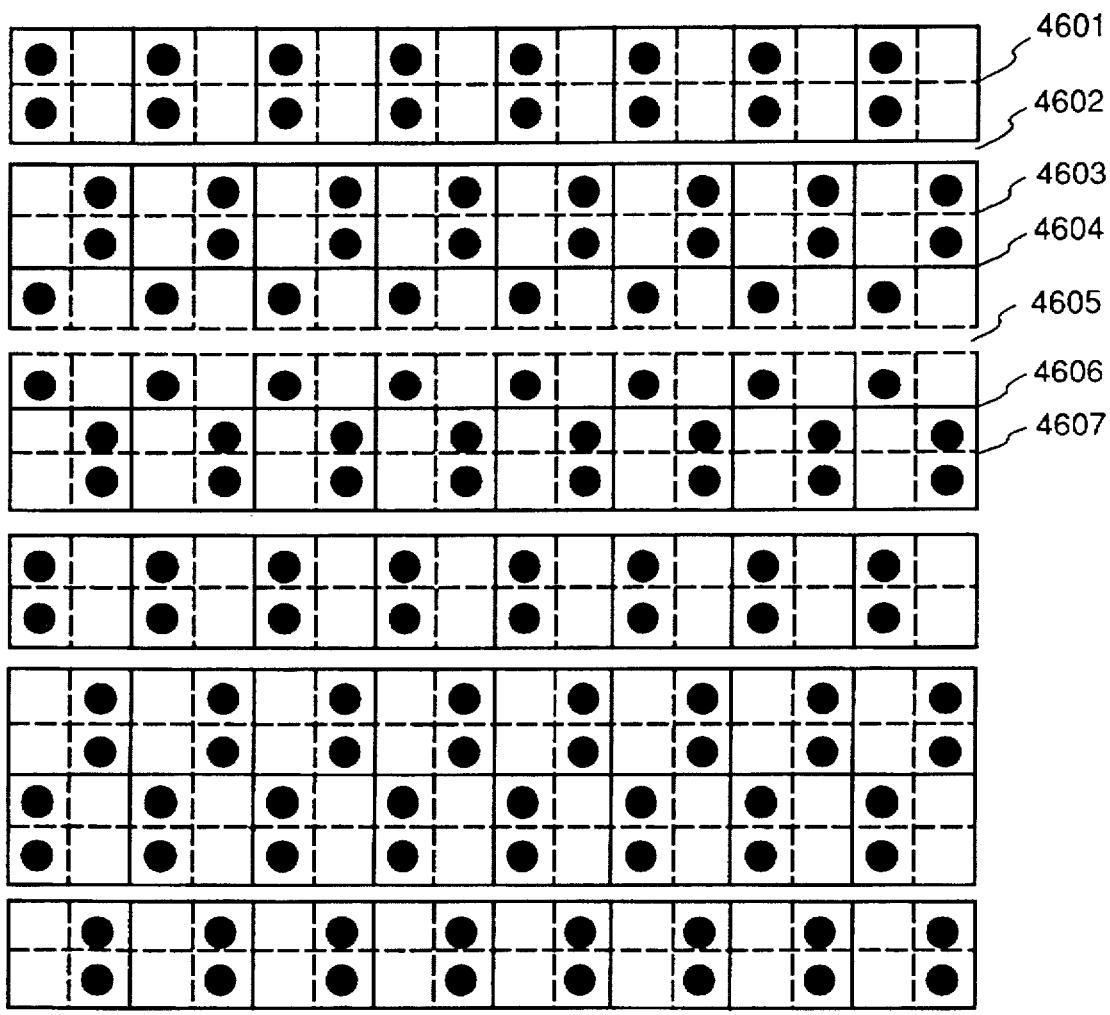
FIG. 46 is a schematic view illustrating an example of a case in which pitch irregularity develops in an output image (600 dpi) according to the prior art.
Figure 47:
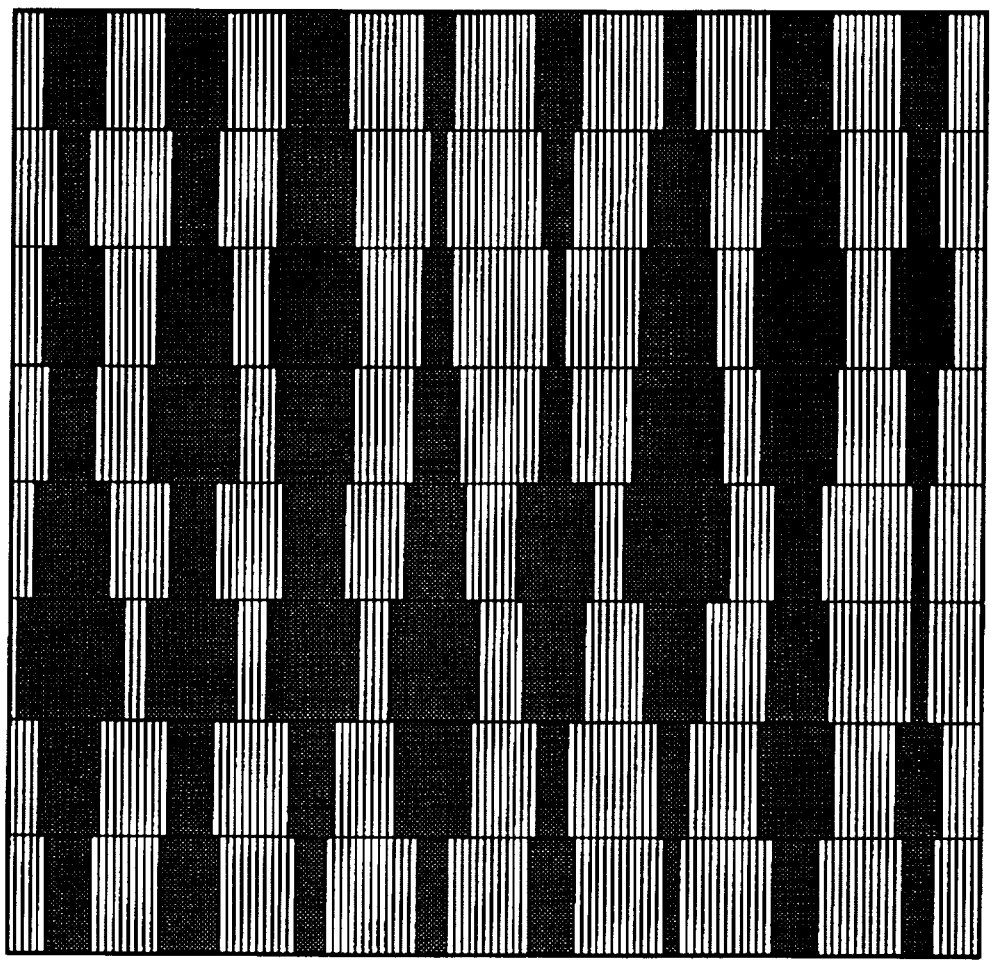
FIGS. 47 through 50 are diagrams showing examples of the results of outputting a half-tone image according to the prior art.
Figure 48:
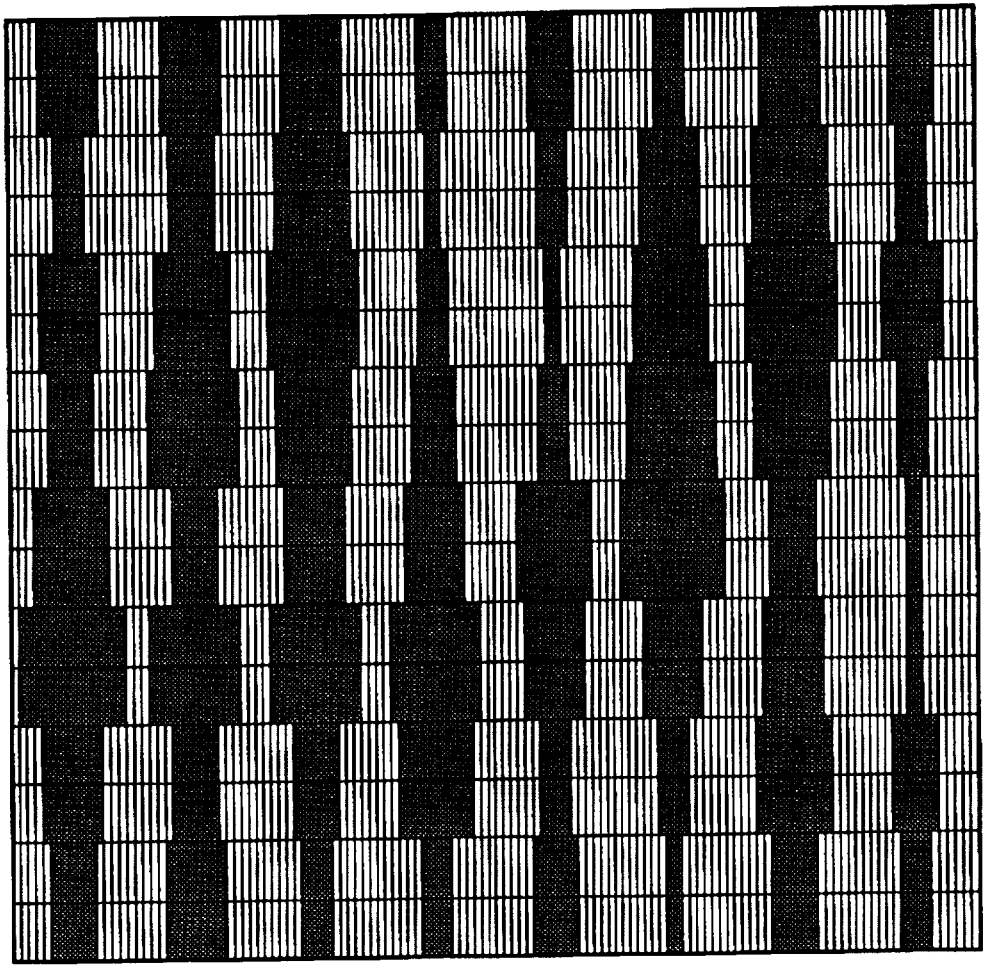
Figure 49:
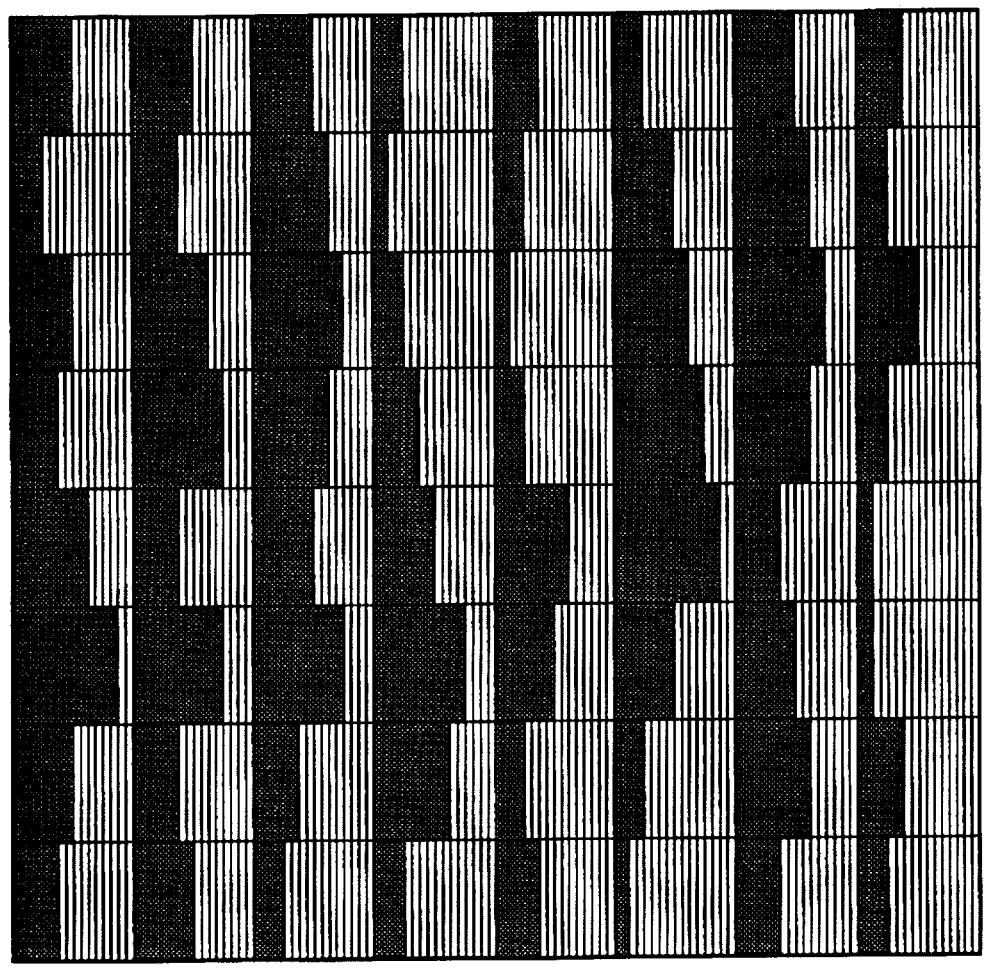
Figure 50:
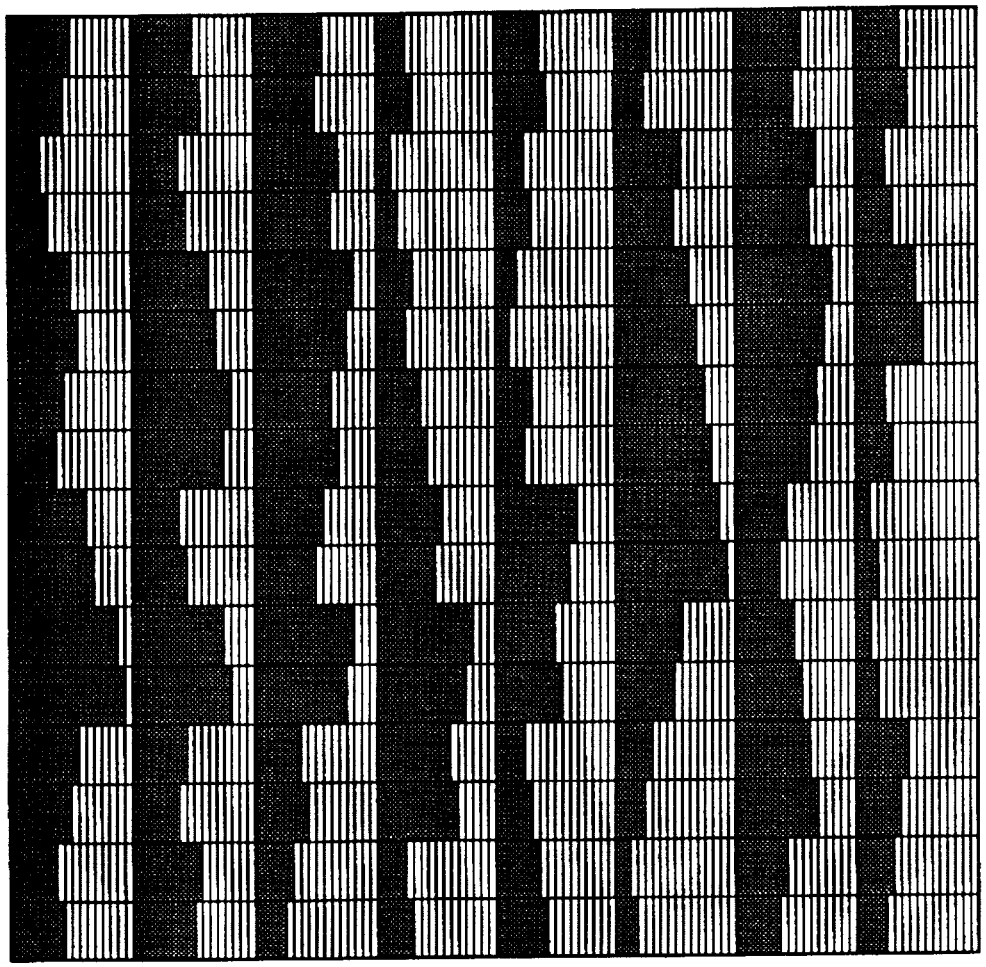
Figure 51:
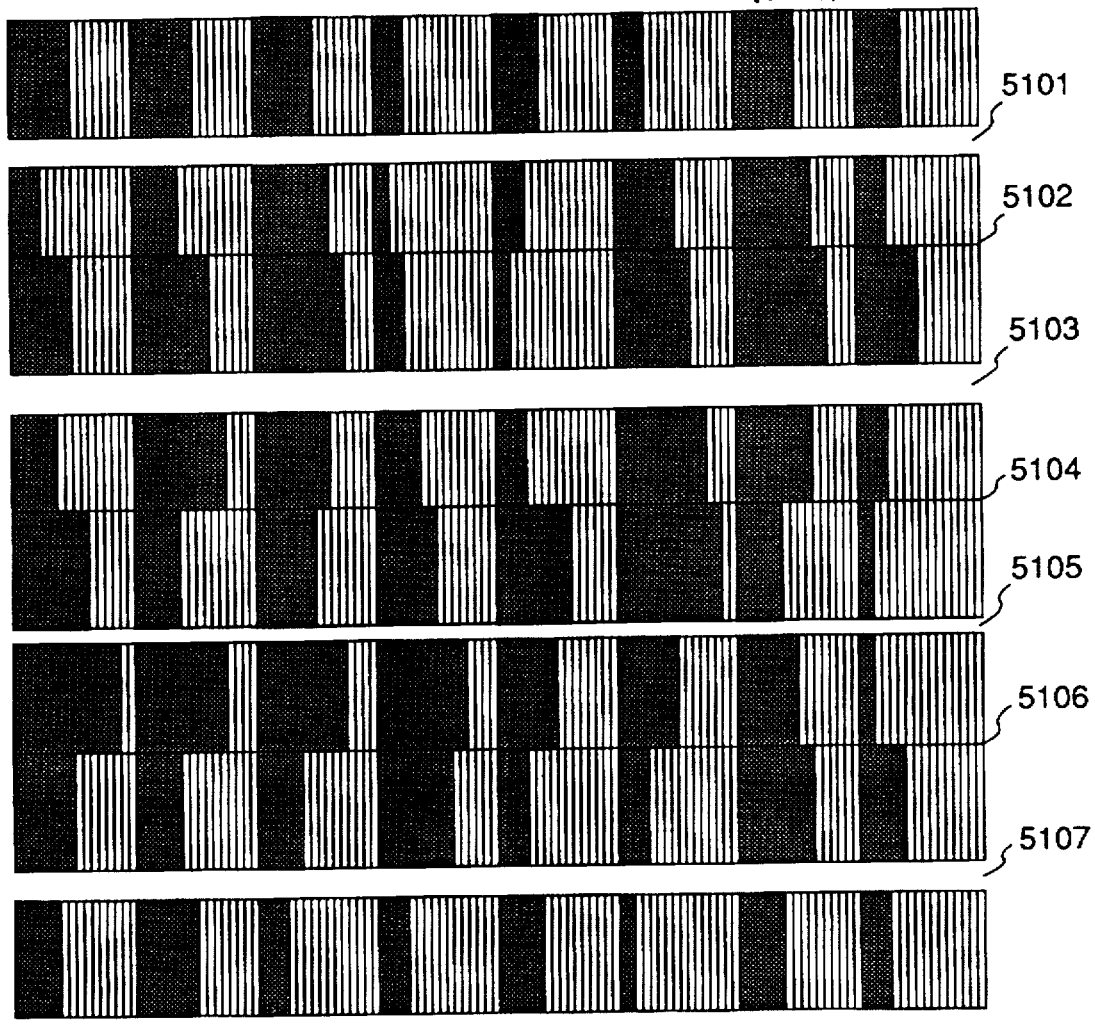
FIGS. 51 through 54 are schematic views illustrating examples of a case in which pitch irregularity develops in a half-tone output image according to the prior art.
Figure 52:
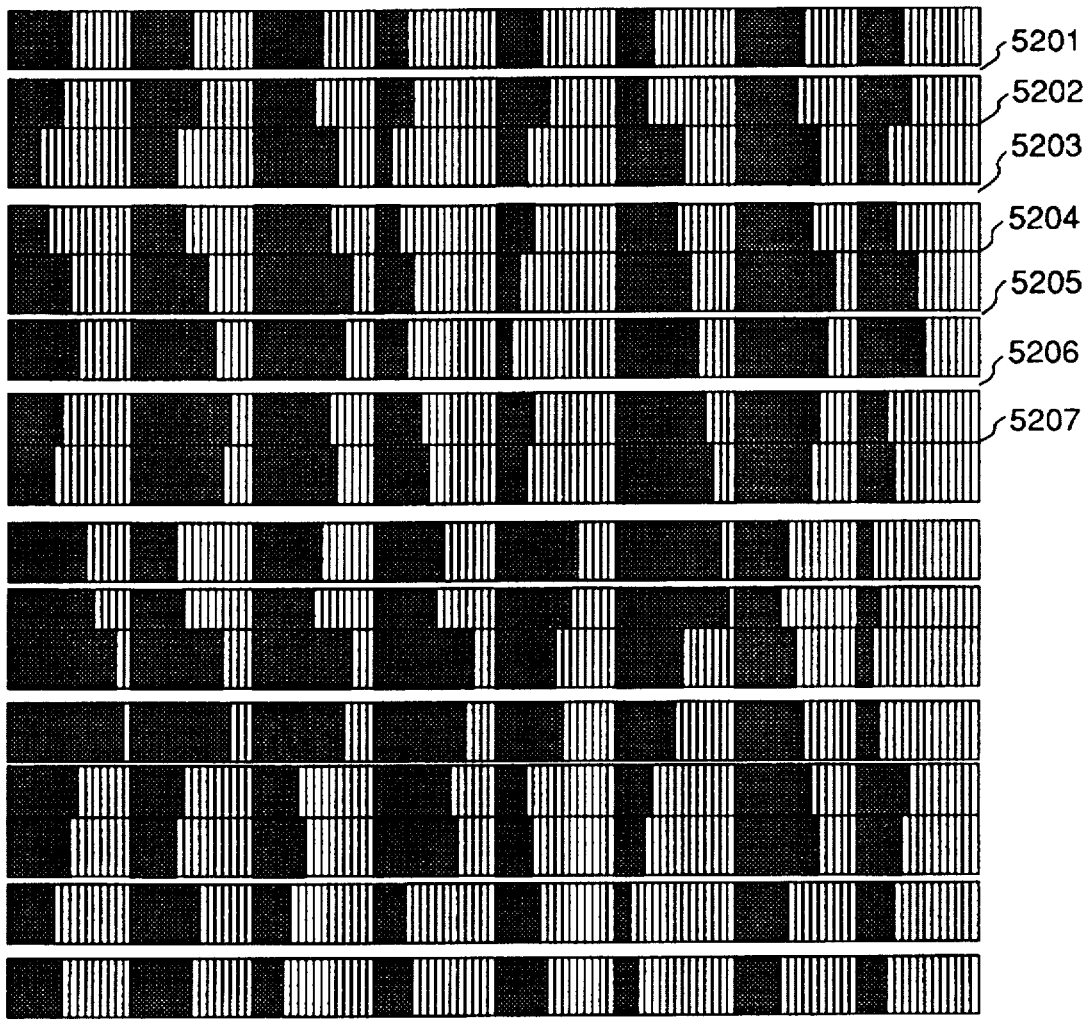
Figure 53:
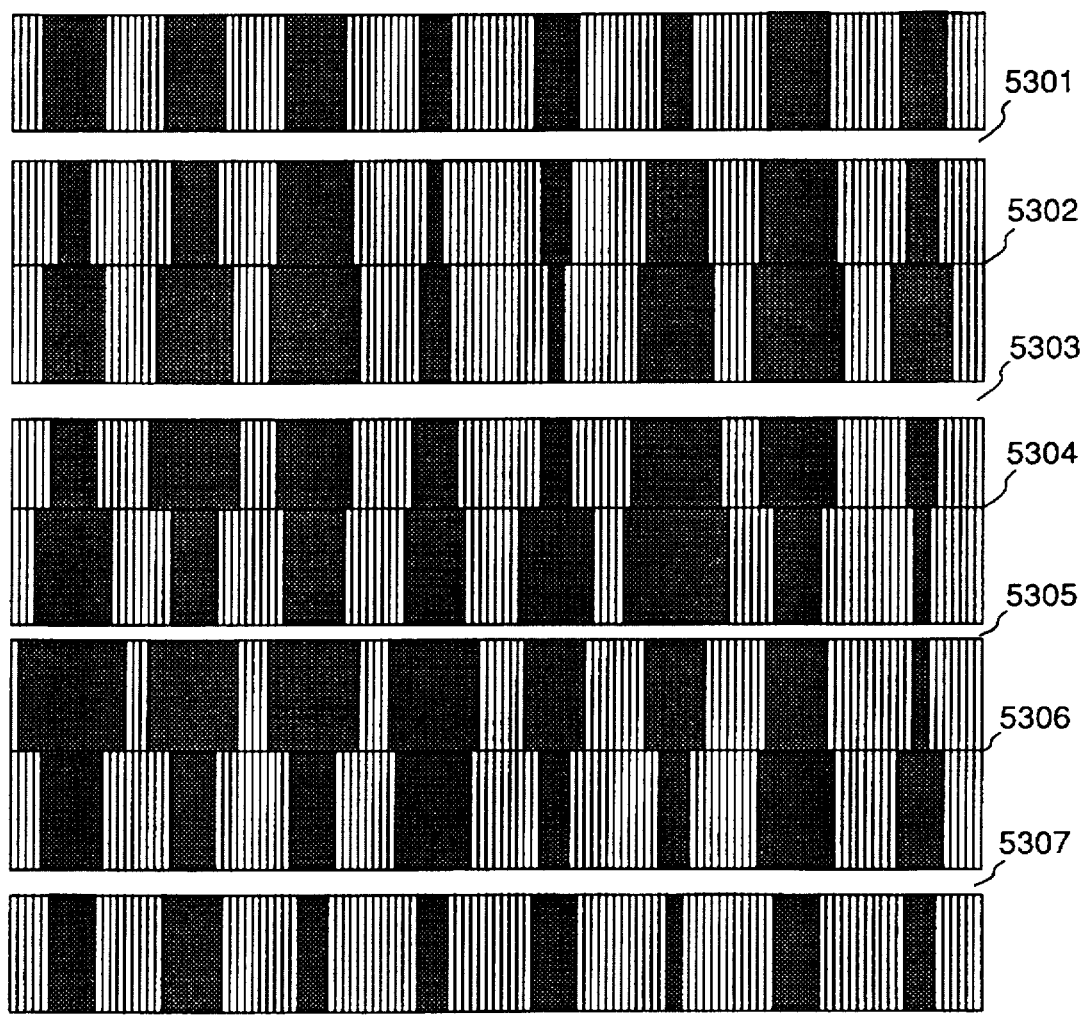
Figure 54:
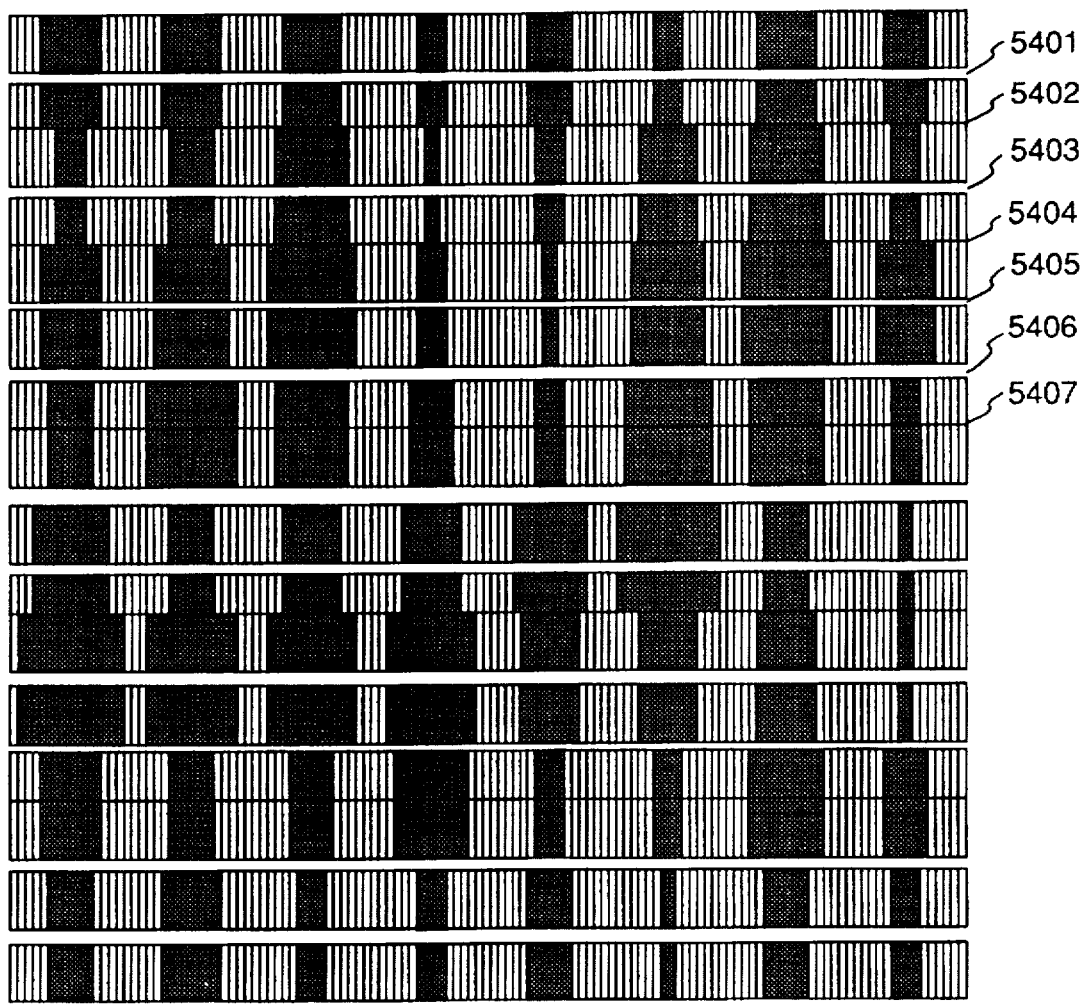

FIG. 45 is a schematic view of image output according to the third embodiment, and FIG. 46 is a schematic view of image output according to the prior art. The examples of the output images in both FIGS. 45 and 46 are for a case in which pitch irregularity has occurred.

In FIG. 45, reference numerals 4502, 4505 denote white stripes due to pitch irregularity, and 4501, 4503, 4504, 4506, 4507 denote portions where upper and lower lines overlap each other due to pitch irregularity. Similarly, in FIG. 46, 4602, 4605 denote white stripes due to pitch irregularity, and 4601, 4603, 4604, 4606, 4607 denote portions where upper and lower lines overlap each other due to pitch irregularity. The intervals between these white stripes and overlapping portions are not constant but widen and narrow irregularly.

If FIG. 45 of this embodiment and FIG. 46 of the prior art are compared, it will be appreciated that the white stripes in FIG. 45 are less noticeable. The reason for this is that the white stripes in the main-scanning direction resulting from pitch irregularity in the output image according to this embodiment are less conspicuous than in the output image according to the prior art.

In this embodiment, it is permissible to adopt an arrangement in which a mode for performing processing to improve upon pitch irregularity and a mode for delivering an output as is without performing this processing are set and one of these modes is selected depending upon the user's preference. In such case, a desirable arrangement is one in which the mode for performing processing to improve upon pitch irregularity is set as the default.

It should be noted that this embodiment is not limited to a case in which output of a half-tone image is performed by pulse-width modulation. The present invention is applicable also to a case in which output of a half-tone image is performed by controlling the luminous intensity of the laser.

Further, in a case where the window area is part of pitch black portion as a result of referring to the data within the window area, the black area can be output in a high picture quality if the data conversion in the processing for improving upon pitch irregularity is inhibited.

It is permissible to change over the algorithm of the processing for improving upon pitch irregularity or the execution/non-execution of the same processing in dependence upon the mean value of referential data within the window area. Specifically, since pitch irregularity is not readily conspicuous in portions of high or low density in the image output, pitch irregularity will be conspicuous in portions of intermediate density unless the processing for improving upon pitch irregularity is executed. Therefore, finer images having improved picture quality can be obtained by performing the processing that improves upon pitch irregularity.

Effects

In accordance with the embodiment as described above, the density of each output pixel is endowed with randomness, thereby eliminating the conspicuousness of white stripes in the main-scanning direction caused by pitch irregularity ascribable to the polygon mirror and photosensitive drum. This makes it possible to reduce a decline in picture quality.

Combinations with the Art in Earlier Applications

The applicant has previously filed the following patent applications for related art:

Japanese Patent Application Laid-Open No. 2-145361
Japanese Patent Application Laid-Open No. 2-155760
Japanese Patent Application Laid-Open No. 2-155669

By combining the present invention with the art of these previously filed applications, it is possible to obtain an image output of even higher quality.

(1) Japanese Patent Application Laid-Open No. 2-145361 discloses art in which a multivalued signal representing a half-tone image and a binary signal representing a character or graphic are separately processed, after which the two resulting signals are combined. The processing of this invention for improving upon pitch irregularity may be applied to the multivalued image signal. Since the binary image signal is not susceptible to the effects of pitch irregularity, this signal is not subjected to the processing for improving upon pitch irregularity. The two resulting signals may then be combined and output. If such an expedient is adopted, a decline in picture quality in the half-tone image due to pitch irregularity is improved upon, while the binary image is capable of being delivered without any change in its resolution. The result is an output of much improved quality.

(2) Japanese Patent Application Laid-Open No. 2-155760 discloses art in which the image of a picture and the image of a character or graphic are discriminated and separated from a multivalued signal input. A signal in binary representation is discriminated and extracted from the multivalued image signal. The processing for improving upon pitch irregularity according to this invention may be applied to the multivalued image signal, but this processing is not applied to the signal in binary representation. The resulting signals may then be combined and output. If this expedient is adopted, an output of much improved quality can be obtained as in (1) above.

(3) Japanese Patent Application Laid-Open No. 2-155669 discloses art in which a multivalued signal input is converted into a high-density multivalued signal of improved resolution, as well as art the contours of characters or graphics are smoothened with regard to binary signals representing characters and graphics. An arrangement may be adopted in which the multivalued signal input is converted into a high-density multivalued signal of improved resolution, after which the signal resulting from conversion is subjected to the processing for improving upon pitch irregularity according to this invention. This makes it possible to obtain an output of much improved picture quality. Further, an arrangement may be adopted in which the contour smoothing processing is applied to an input binary image signal or a binary image signal extracted from a multivalued image signal, and the multivalued image signal is subjected to the processing for improving upon pitch irregularity according to this invention. This will make it possible to raise the quality of both the half-tone image and binary image.

An output image can be improved in quality even if the present invention is applied to an ink-jet printer.

In accordance with the present invention, as described above, there are provided a half-tone image recording apparatus and method through which a black area of a pixel is caused to grow in proportion to image density, wherein the direction of growth of the black area is changed over alternately every recording line so that the growth direction of the density of each pixel forming the half-tone image is made irregular or random, whereby a half-tone image having excellent picture quality can be recorded without conspicuous vertical stripes and without conspicuous white stripes being formed in the main-scanning direction owing to pitch irregularity.

In accordance with the present invention, one of a plurality of second clocks, the frequency of which is N times that of a first clock and the phases of which are successively shifted by 90°, and which are in synchronism with a first clock that is for transferring the image signal, is selected. The selected second clock is counted in dependence upon the image density to obtain start and end timings of formation of the black area of a pixel forming the half-tone image. As a result, the circuitry of the image recording apparatus for recording high-quality half-tone images can be constructed from ordinary logic such as TTL or CMOS logic.

Further, in accordance with the present invention, the data of a plurality of pixels that include a pixel of interest forming a half-tone image is converted in such a manner that the total sums of the data of the plurality of pixels will coincide before and after the conversion, after which the data of the pixel of interest after conversion is recorded so that the density of each pixel forming the half-tone image will be rendered irregular. As a result, it becomes possible to record a high-quality half-tone image without conspicuous white stripes being caused in the main-scanning direction by pitch irregularity.

As many apparently widely different embodiments of the present invention can be made without departing from the spirit and scope thereof, it is to be understood that the invention is not limited to the specific embodiments thereof except as defined in the appended claims.

What is claimed is:

1. An image recording apparatus comprising:
  input means for inputting digital image data in which one pixel is represented by a plurality of bit data;
  data conversion means for outputting digital data indicative of a recording-start position and digital data indicative of a recording-end position once for each pixel, based on the digital image data input by said input means; and
  recording means for recording an image in accordance with the digital data output by said data conversion means,
  wherein said data conversion means outputs each of the digital data indicative of the recording-start position and the digital data indicative of the recording-end position once for said each pixel, and controls a first value of the digital data indicative of the recording-start position and a second value of the digital data indicative of the recording-end position so as to change a solid black-area growing direction within one pixel in the image recorded by said recording means, and wherein said recording means records the solid black area having an area fixed by the recording-start and recording-end positions, as one pixel of the image.

2. The image recording apparatus according to claim 1, wherein said data conversion means controls said first value of the digital data and said second value of the digital data so as to change the solid black-area growing direction within one pixel alternately by recording line.

3. The image recording apparatus according to claim 1, further comprising generation means for generating a plurality of clocks having phases shifted by a predetermined amount from each other, wherein said recording means records the image in accordance with the digital data output by said data conversion means and the plurality of clocks generated by said generation means.

4. The image recording apparatus according to claim 3, wherein said generation means generates the plurality of clocks by passing one reference clock to a delay-circuit network comprising a plurality of gates, and the delay-circuit network is constituted as one IC package.

5. An image recording apparatus comprising:

input means for inputting image density data indicative of image density;

setting means for setting an area having a plurality of pixels, in the image density data input by said input means;

addition means for adding a plurality of data having different values to respective image density data of the plurality of pixels within the area set by said setting means, and for outputting image density data indicative of the addition; and recording means for controlling a dot diameter, based on the image density data output by said addition means, and recording an images, wherein a sum of the values of the plurality of data added to the respective image density data of the plurality of pixels by said addition means is zero, thus a sum of the image density data of the plurality of pixels within the area and the sum of the image density data within the area output by said addition means correspond with each other.

6. The image recording apparatus according to claim 5, wherein if the area set by said setting means is a black area, said addition means does not add the plurality of data having different values to the image density data input by said input means.

7. The image recording apparatus according to claim 5, wherein if the area set by said setting means is a low-density area or a high-density area, said addition means does not add the plurality of data having different values to the image density data input by said input means, and wherein if the area set by setting means is an intermediate-density area, said addition means adds the plurality of data having different values to the image density data input by said input means.

8. An image recording apparatus comprising:

input means for inputting image data;

recording means for recording an image based on the image data input by said input means; and pitch-irregularity improvement means for improving degradation of image quality due to pitch irregularity upon recording the image by said recording means, wherein if the image data input by said input means is low-density data or high-density data, said pitch-irregularity improvement means does not perform pitch-irregularity improvement processing, while if the image data is intermediate-density data, said pitch-irregularity improvement means performs pitch-irregularity improvement processing.

9. An image recording apparatus comprising:

input means for inputting image data;

recording means for recording an image based on the image data input by said input means; and pitch-irregularity improvement means for improving degradation of image quality due to pitch irregularity upon recording of the image by said recording means, wherein if the image data input by said input means is binary image data representing a character or figure, said pitch-irregularity improvement means does not perform pitch-irregularity improvement processing, while if the image data is multi-value image data representing a half-tone image, said pitch-irregularity improvement means performs pitch-irregularity improvement processing.

10. An image recording method comprising:

an inputting step of inputting digital image data in which one pixel is represented by a plurality of bit data;

a data conversion step of outputting digital data indicative of a recording-start position and digital data indicative of a recording-end position once for each pixel, based on the input digital image data; and a recording step of recording an image on a recording device in accordance with the output digital data, wherein said data conversion step outputs each of the digital data indicative of the recording-start position and the digital data indicative of the recording-end position once for said each pixel, and controls a first value of the digital data indicative of the recording-start position and a second value of the digital data indicative of the recording-end position so as to change a solid black-area growing direction within one pixel in the recorded image, and wherein said recording step records the solid black-area having an area fixed by the recording-start and recording-end positions, as one pixel of the image.

11. An image recording method comprising the steps of:

inputting image density data indicative of image density;

setting an area having a plurality of pixels, in the input image density data;

adding a plurality of data having different values to respective image density data of the plurality of pixels within the set area; and controlling a dot diameter for image recording, based on image density data indicative of the addition and recording an image, summing of the values of the plurality of data added to the respective image density data of the plurality of pixels in said addition step resulting in a zero value wherein summing of the image density data of the plurality of pixels within the area and summing of the image density data within the area output by said addition means corresponds with each other.

* * * * *

UNITED STATES PATENT AND TRADEMARK OFFICE
CERTIFICATE OF CORRECTION

PATENT NO. : 5,760,811

DATED : June 2, 1998

INVENTOR(S) : Kaoru Seto, et al.

It is certified that error appears in the above-identified patent and that said Letters Patent is hereby corrected as shown below:

On the Cover Page

Under "Foreign Documents Cited", the second reference to "359463   3/1990   European Pat. Off." should be deleted.

COLUMN 2

Line 37, change "52," to --52, reference numerals--.

COLUMN 3

Line 4, change "of the" to --of a--; and
line 14, change "at" to --are--.

COLUMN 5

Line 23, change "HO" to --H0--.

COLUMN 7

Line 57, change "thermister" to -- thermistor--.

UNITED STATES PATENT AND TRADEMARK OFFICE
CERTIFICATE OF CORRECTION

PATENT NO. : 5,760,811

DATED : June 2, 1998

INVENTOR(S) : Kaoru Seto, et al.

It is certified that error appears in the above-identified patent and that said Letters Patent is hereby corrected as shown below:

COLUMN 8

Line 3, change "secuence" to --sequence--.

COLUMN 9

Line 2, change "outputted" to --output--.

COLUMN 11

Line 25, change "VCK" to --VCLK--; and
line 52, change "90'from" to --90° from--.

COLUMN 12

Lines 58 and 63, change "Hi" to --H1--.

COLUMN 13

Line 55, change "D0 D5" to --D0 ~ D5--.

UNITED STATES PATENT AND TRADEMARK OFFICE
CERTIFICATE OF CORRECTION

PATENT NO. : 5,760,811

DATED : June 2, 1998

INVENTOR(S) : Kaoru Seto, et al.

It is certified that error appears in the above-identified patent and that said Letters Patent is hereby corrected as shown below:

COLUMN 14

Line 59, change "VD0M" to --VDOM--;
line 64, change "VD0" to --VDO--; and
lines 65 and 67, change "VD0M" to --VDOM--.

COLUMN 15

Lines 2 and 5, change "VD0M" to --VDOM--;
line 6, change "VD0" to --VDO--.

COLUMN 16

Lines 55, 56, 60 and 61, change "VD0" to --VDO--;
line 62, change "F/F d41" to --F/Fd 41-- and change "F/F" to --F/Fd--; and
line 63, change "d41 to --41--.

COLUMN 17

Line 14, change "of whereof" to --whereof--; and
line 53, change "OutDut" to --Output--.

UNITED STATES PATENT AND TRADEMARK OFFICE
CERTIFICATE OF CORRECTION

PATENT NO. : 5,760,811

DATED : June 2, 1998

INVENTOR(S) : Kaoru Seto, et al.

It is certified that error appears in the above-identified patent and that said Letters Patent is hereby corrected as shown below:

COLUMN 19

Line 21, change "33," to --33, reference numerals--; and
line 24, change "34," to --34, reference numerals--;

COLUMN 20

Line 48, change "1C 5E" to --1C ~ 5E--.

COLUMN 21

Line 1, change "α~τare" to --α ~ τ are--;
lines 3 and 8, change "72" to --η--;
line 9, change "1A 5E" to --1A ~ 5E--; and
line 13, change "α~τmay" to --α ~ τ may--.

UNITED STATES PATENT AND TRADEMARK OFFICE
CERTIFICATE OF CORRECTION

PATENT NO. : 5,760,811

DATED : June 2, 1998

INVENTOR(S) : Kaoru Seto, et al.

It is certified that error appears in the above-identified patent and that said Letters Patent is hereby corrected as shown below:

COLUMN 22

Line 37, change "46," to --46, reference numerals--;

Signed and Sealed this

Fourth Day of January, 2000

Attest:

Attesting Officer

Acting Commissioner of Patents and Trademarks